(12) United States Patent
Carr et al.

(10) Patent No.: US 7,881,948 B2
(45) Date of Patent: Feb. 1, 2011

(54) METHOD AND SYSTEM FOR PLATINUM DATABASE

(75) Inventors: Rick Carr, Manassas, VA (US);
Elizabeth Davis, Rockville, MD (US);
Michael Delgaudio, Davidsonville, MD (US); Patrick Halladay, Rockville, MD (US); Heather McAvey, Bethesda, MD (US); Elizabeth Moon, Gaithersburg, MD (US); Margaret O'Sullivan, Gaithersburg, MD (US); Gregg Petch, Gaithersburg, MD (US)

(73) Assignee: Metropolitan Regional Information Systems, Inc., Rockville, MD (US)

( * ) Notice: Subject to any disclaimer, the term of this patent is extended or adjusted under 35 U.S.C. 154(b) by 0 days.

(21) Appl. No.: 12/017,787

(22) Filed: Jan. 22, 2008

(65) Prior Publication Data

US 2008/0183598 A1    Jul. 31, 2008

Related U.S. Application Data

(63) Continuation of application No. 10/117,083, filed on Apr. 8, 2002, now Pat. No. 7,346,519.

(60) Provisional application No. 60/282,547, filed on Apr. 10, 2001.

(51) Int. Cl.
*G06Q 10/00* (2006.01)
(52) U.S. Cl. .......................... 705/1.1; 705/26
(58) Field of Classification Search .................. 705/1.1, 705/26
See application file for complete search history.

(56) References Cited

U.S. PATENT DOCUMENTS

| 4,870,576 | A  | * | 9/1989  | Tornetta .......................... 705/1     |
| 5,032,989 | A  | * | 7/1991  | Tornetta .......................... 705/1     |
| 5,754,850 | A  | * | 5/1998  | Janssen .................... 707/104.1        |
| 5,781,773 | A  | * | 7/1998  | Vanderpool et al. .......... 707/100          |
| 5,794,216 | A  |   | 8/1998  | Brown                                         |
| 5,852,810 | A  | * | 12/1998 | Sotiroff et al. ................. 705/27      |
| 6,038,668 | A  | * | 3/2000  | Chipman et al. ............... 726/30         |
| 6,253,208 | B1 | * | 6/2001  | Wittgreffe et al. ......... 707/104.1         |
| 6,292,894 | B1 | * | 9/2001  | Chipman et al. ............. 713/168          |
| 6,446,060 | B1 | * | 9/2002  | Bergman et al. ................ 707/3         |
| 6,484,176 | B1 | * | 11/2002 | Sealand et al. ................. 707/10       |

(Continued)

*Primary Examiner*—Jagdish N Patel
*Assistant Examiner*—Sara Chandler
(74) *Attorney, Agent, or Firm*—Finnegan, Henderson, Farabow, Garrett & Dunner, LLP

(57) ABSTRACT

A method and system for providing real estate information to users, tailored to requirements and fields relating to the location of the property. A single repository, such as a database or database farm, is used with middle tier software on servers on a network, such as the Internet, to provide information to users via user terminals coupled to the network, for particular properties, and to receive information for properties for addition to the database. Information and fields specific to locations are input to the system via a system operator. User terminals utilize either downloaded software to interact with the middle tier, or a network browser. In one variation, the middle tier software is based upon an open standard, such as an open Application Program Interface standard, so as to allow access for a variety of terminal types and software.

4 Claims, 58 Drawing Sheets

U.S. PATENT DOCUMENTS

| | | | |
|---|---|---|---|
| 6,519,618 B1 * | 2/2003 | Snyder | 707/104.1 |
| 6,605,121 B1 * | 8/2003 | Roderick | 715/207 |
| 6,633,875 B2 | 10/2003 | Brady | |
| 6,704,745 B2 * | 3/2004 | Della-Libera et al. | 707/103 R |
| 6,751,596 B1 * | 6/2004 | Hastings | 705/10 |
| 6,871,140 B1 * | 3/2005 | Florance et al. | 701/207 |
| 6,883,002 B2 * | 4/2005 | Faudman | 707/10 |
| 7,076,448 B1 * | 7/2006 | Snyder | 705/26 |
| 2001/0047282 A1 * | 11/2001 | Raveis, Jr. | 705/7 |
| 2002/0103780 A1 * | 8/2002 | Bird et al. | 707/1 |
| 2002/0124006 A1 * | 9/2002 | Parnell et al. | 707/102 |
| 2002/0133476 A1 * | 9/2002 | Reinhardt | 707/1 |
| 2002/0138485 A1 * | 9/2002 | Faudman | 707/9 |
| 2003/0083957 A1 * | 5/2003 | Olefson | 705/27 |
| 2004/0073508 A1 | 4/2004 | Foster et al. | |

\* cited by examiner

| Attribute Name | Attribute Value |
|---|---|
| Bedrooms | 2 |
| Full Baths | 2 |
| Half Baths | 1 |
| Acres | 3 |
| Appliances | Dishwasher, Cooking Range |

FIG. 2

| Property | Description | Value |
|---|---|---|
| column_id | unique numeric id | 100 |
| column_name | unique name | ListPrice |
| column_type | type of data that is valid for the column | currency |
| table_name | physical table where the column is located | Listing |
| virtual_yn | Yes/no indicating whether the column is stored as virtual data | N |
| picklist_yn | Yes/no indicating if the column includes a definitive list of options (in picklist_item) | N |
| mulit-valued_yn | yes/no to indicate if multiple selections for this logical column are allowed | N |
| queryable_yn | yes/no indicating whether the column should be optimized for query purposes | Y |
| track_changes_yn | yes/no indicating whether changes to the column should be tracked for query purposes | Y |
| type_yn | yes/no as to whether the column indicates the type of row, if different types of rows are stored in the same table | N |
| sequence_yn | yes/no, whether the column indicates the order for how rows in the same table should be viewed | N |
| max_sequence_rows | maximum number of rows a sub-table can include for a given listing | blank |

FIG. 5

| uid | listing_uid | structure_type | area | length | width |
|---|---|---|---|---|---|
| 123001 | 123000 | Main Level | 2400 | | |
| 123002 | 123000 | Master Bedroom | | 20 | 24 |
| 123003 | 123000 | Kitchen | | 25 | 12 |
| 123004 | 123000 | Dining Room | | 25 | 12 |
| 123005 | 123000 | Living Room | | 20 | 24 |
| 123006 | 123000 | Bedroom | | 15 | 12 |

FIG. 9

| parent_uid | column_id | column_value |
|---|---|---|
| 123000 (listing) | 2001 (MilesFromVolcano) | 25 |
| 123002 (master bedroom) | 2002 (LanaiYN) | Y |
| 123003 (kitchen) | 2002 (LanaiYN) | N |
| 123004 (dining room) | 2002 (LanaiYN) | N |
| 123005 (living room) | 2002 (LanaiYN) | N |
| 123006 (bedroom) | 2002 (LanaiYN) | N |

FIG. 12

| locale_id | column_id |
|---|---|
| 1 (Core) | 1000 (ListDate) |
| 1 (Core) | 1001 (ListPrice) |
| 2 (United States) | 1002 (ZipCode) |
| 101 (Hawaii) | 2001 (MilesFromVolcano) |
| 101 (Hawaii) | 2002 (LanaiYn) |

FIG. 16

| party_role_id | party_id | role_id | parent_party_id |
|---|---|---|---|
| 439883 | 32734 (Mary Smith) | 1 (Subscriber to) | 10000 (Platinum) |
| 439884 | 32734 (Mary Smith) | 2 (Member of) | 10231 (GCAR) |
| 439885 | 32734 (Mary Smith) | 5 (Agent for) | 10123 (Johnson Realty) |

FIG. 18

| Input Group | Attribute Name | Properties |
|---|---|---|
| Condo | Condo Fee Amount | Datatype- Currency; Rule- One selection required |
| Condo | Condo Fee Frequency | Datatype- Picklist; Rule- One selection optional |
| Condo | Condo Fee Includes | Datatype- Picklist; Rule- Multiple selections optional |

FIG. 19

| input_group_id | input_group_name | control_attribute | control_value |
|---|---|---|---|
| 101 | Condo | Ownership Type | 1 |

FIG. 22

| column_id | picklist_id | item_name | sort_order | input_group_id |
|---|---|---|---|---|
| 53 (Home Type) | 100230 | Detached | 1 | 1 (All properties) |
| 53 (Home Type) | 100230 | Attached | 2 | 1 (All properties) |
| 53 (Home Type) | 100230 | Mobile Home | 3 | 1 (All properties) |
| 53 (Home Type) | 100230 | Low Rise | 1 | 101 (Condo) |
| 53 (Home Type) | 100230 | Mid Rise | 2 | 101 (Condo) |
| 53 (Home Type) | 100230 | High Rise | 3 | 101 (Condo) |

FIG. 23

| stage_id | attribute_id | attribute_value |
|---|---|---|
| 100007823 | 1 (Locale Id) | 101 (Hawaii) |
| 100007823 | 1000 (ListDate) | '19-SEP-2001' |
| 100007823 | 1001 (ListDate) | 200000 |
| 100007823 | 1002 (ZipCode) | 20850 |
| 100007823 | 2001 (MilesFromVolcano) | 25 |
| 100007823 | 2002 (LanaiYN) | N |

FIG. 24

| Group | Dependency | Description |
|---|---|---|
| Main | None | details of the listing, such as listing date expiration date, status, offer price |
| Address | None | location of property, by street address or unstructured address |
| Location | None | coordinates, latitude, longitude, and/or url for map source(s) |
| Legal Description | None | legal description as recorded by the taxing jurisdiction; includes lot, block and section, tax id, assessments, etc. |
| Lot Description | Land included | dimensions, use, status, and details of the land (does not apply to condos or coops), trivial outbuildings like sheds |
| Main Structure | Improvement included | dimensions, bedrooms, baths, levels, parking and many other details for main structure |
| Floor Plan | Improvement included | dimensions, bedrooms, baths, levels for levels and rooms inside the main structure |
| Personal Parties | None | parties with personal interest in the listing, such as owners, occupants, showing contacts |
| Loans | Property is for sale | existing and/or offered financing held by a personal party |
| Professional Parties | None | parties with a professional interest in the listing, such as listing agent(s), selling agent(s), and brokers |
| Compensation | None | commissions and/or bonuses offered to professional parties |
| Open House | None | date, time and details of open houses, held by professional parties |
| Images | None | photos, maps or other images stored for a listing |
| Internet Links | None | links to internet or Intranet sites relating to a listing |
| Notes | None | Long text description(s) and/or driving directions |
| Schools | None | school district and/or high, middle, elementary schools |
| HOA | property located within jurisdiction of an HOA | HOA fee, frequency, contact information, community rules and amenities |
| Condo | ownership is condo | condo fee, frequency, contact information, community rule and amenities |
| Coop | ownership is coop | coop fee, frequency, contact information, community rules and amenities, underlying mortgage |
| Ground Rent | ownership is ground rent | annual and capitalized value of ground rent, terms |
| Multi Family | class is multi family | income and expenses, rent-able units |
| Commercial | class is commercial | CAM, vacancy factor, more detailed square footage |
| Water Oriented | property is on or near body of water | waterfront, water access, name, frontage, exposure, dock |
| Farm | property is a farm | more details on the acreage, barns and outbuildings |
| Vacation Home | property is a vacation home | vacation community information including # units, buildings, type of vacation property |
| Rental | property is for rent | rental fees and details, security deposit, rented price, date |
| Sale | property is for sale | contract details, earnest money deposit, new loan information, seller subsidy, contingencies, contract, settlement date(s) |

FIG. 20

| stage_id | object_type | stage_type | party | date_created | date_modified |
|---|---|---|---|---|---|
| 100007823 | Listing | New | Lucy Smith | 19-FEB-2001 | 20-FEB-2001 |

FIG. 26

| stage_id | column_id | column_value |
|---|---|---|
| 100007823 | 1093 (Structure Type) | 1 (Master Bedroom) |
| 100007823 | 1093 (Structure Type) | 2 (Living Room) |
| 100007823 | 1094 (Area) | 24 |
| 100007823 | 1094 (Area) | 58 |

FIG. 27

| column_id | table_id | column_name | type_yn | sequence_yn | max_sequence_rows |
|---|---|---|---|---|---|
| 1093 | 102 (Structure) | Structure Type | Y | N | |
| 1094 | 102 (Structure) | Area | N | N | |

FIG. 29

| attribute_id | attribute_name | object_id | column_id |
|---|---|---|---|
| 3498 | MasterBedroomStructureYN | 1 (Listing) | 1093 |
| 3499 | LivingRoomStructureYN | 1 (Listing) | 1093 |
| 3500 | DiningRoomStructureYN | 1 (Listing) | 1093 |
| 3501 | FamilyRoomStructureYN | 1 (Listing) | 1093 |
| 3502 | MasterBedroomArea | 1 (Listing) | 1094 |
| 3503 | LivingRoomArea | 1 (Listing) | 1094 |
| 3504 | DiningRoomArea | 1 (Listing) | 1094 |
| 3505 | FamilyRoomArea | 1 (Listing) | 1094 |

FIG. 30

| stage_id | attribute_id | attribute_value |
|---|---|---|
| 100007823 | 3498 (MasterBedroomStructureYN) | Y |
| 100007823 | 3499 (LivingRoomStructureYN) | Y |
| 100007823 | 3503 (LivingRoomArea) | 24 |
| 100007823 | 3502 (MasterBedroomArea) | 58 |

FIG. 31

| log_id | log_date | uid | party_role_id | attribute_id | attribute_old_value |
|---|---|---|---|---|---|
| 434111 | 10-JAN-2001 | 200012 | 2344 (Bob Tol) | 239898 (Bedrooms) | 2 |
| 434112 | 10-JAN-2001 | 200012 | 2344 (Bob Tol) | 239899 (FullBaths) | 2 |

FIG. 33

| party_role_id | party_id | role_id | parent_party_id | current yn |
|---|---|---|---|---|
| 439883 | 32734 (Mary Smith) | 1 (Subscriber to) | 10000 (Platinum) | Y |
| 439884 | 32734 (Mary Smith) | 2 (Member of) | 10231 (GCAR) | Y |
| 439885 | 32734 (Mary Smith) | 5 (Agent for) | 10123 (Johnson Realty) | Y |

FIG. 35

| uid | listing_uid | relationship_type | party_role_id |
|---|---|---|---|
| 2539986 | 2539983 | Primary Listing Agent | 439885 (Mary Smith, Johnson Realty) |
| 2539993 | 2539983 | Secondary Listing Agent | 493843 (Sue Perry, Johnson Realty) |
| 2540029 | 2539983 | Primary Selling Agent | 502349 (John Verring, ABC Realty) |

FIG. 36

| Party_role_id | party_id | role_id | parent_party_id | current_yn |
|---|---|---|---|---|
| 439883 | 32734 (Mary Smith) | 1 (Subscriber to) | 10000 (Platinum) | Y |
| 439884 | 32734 (Mary Smith) | 2 (Primary Member of) | 10231 (GCAR) | Y |
| 439885 | 32734 (Mary Smith) | 5 (Agent for) | 10123 (Johnson Realty) | N |
| 449838 | 32734 (Mary Smith) | 5 (Agent for) | 10344 (Parker, Inc) | Y |

FIG. 37

| party_role_id | party_id | role_id | parent_party_id | current_yn |
|---|---|---|---|---|
| 402309 | 10123 (Johnson Realty) | 2 (Primary Member of) | 10231 (GCAR) | Y |
| 402319 | 10123 (Johnson Realty) | 3 (Branch of) | 10112 (Johnson, Inc) | Y |

FIG. 38

| Query Group | Attribute Name | Properties |
|---|---|---|
| Condo | Condo Fee Amount | Datatype- Currency; Rule- One selection required |
| Condo | Condo Fee Frequency | Datatype- Picklist; Rule- One selection optional |
| Condo | Condo Fee Includes | Datatype- Picklist; Rule- Multiple selections optional |

FIG. 39

| search_id | attribute_id | left_value | right_value | operator |
|---|---|---|---|---|
| 983434 | 1 (LocaleId) | | 1209 (Montgomery County) | = |
| 983434 | 1001 (ListPrice) | 200000 | 300000 | BETWEEN |
| 983434 | 1023 (Bedrooms) | | 3 | > |

FIG. 41

| standard_status_id | name |
|---|---|
| 1 | Active |
| 2 | Contingent |
| 3 | Contract |
| 4 | Sold |
| 5 | Expired |

FIG. 46

| locale_id | status_id | standard_status_id | dom_calculate_yn | dom_adjustment | end_transaction_yn |
|---|---|---|---|---|---|
| 101 (Hawaii) | (Active) | 1 (Active) | Y | 0 | N |
| 101 (Hawaii) | (Contingent) | 2 (Contingent) | N | 0 | Y |
| 101 (Hawaii) | (Contract) | 3 (Contract) | N | 0 | N |
| 153 (Maryland) | (Active) | 1 (Active) | Y | 1 | N |
| 153 (Maryland) | (Contingent) | 2 (Contingent) | Y | 1 | N |
| 153 (Maryland) | (Kickout) | 2 (Contingent) | Y | 1 | N |
| 153 (Maryland) | (Contract) | 3 (Contract) | N | 1 | Y |

FIG. 47

| uid | listing_uid | status_id | status_date | sequence |
|---|---|---|---|---|
| 238778 | 238777 | 2341 (Active) | 13-JAN-2001 | 1 |
| 240882 | 238777 | 2342 (Contingent) | 20-JAN-2001 | 2 |
| 240889 | 238777 | 2343 (Contract) | 21-JAN-2001 | 3 |

FIG. 48

| uid | listing_uid | status_id | status_date | sequence |
|---|---|---|---|---|
| 200040 | 200039 | 2341 (Active) | 19-APR-2000 | 1 |
| 200199 | 200039 | 2349 (Expired) | 19-DEC-2001 | 2 |

FIG. 49

| Locale | Column | Criteria |
|---|---|---|
| Core | ListPrice | > 100000 |
| US | FederalTax | < 10000 |
| MD | MDStateTax | < 1000 |
| VA | VAStateTax | < 1000 |
| DC | DCSoilType | = MUD |
| MC | MCCountyTax | < 500 |
| FX | FXCountyTax | < 500 |

FIG. 53

Yellow Flag: Sale price should be within 30% of list price

Sale Price: 1

List Price: 40,000

Are you sure? Check box: Y N

If No then what is the real sale price?

If Yes please enter a response:

Searchlite – Search Form – Microsoft Internet Explorer

File　Edit　View　Favorites　Tools　Help

Address http://search2.mris.com/residential/search_form.cfm?showsection=

Basic　　　　　　　　　　　　　　　　　　　　Basic Display On/Off

Style ?　　　　　　Type ?

A-Frame　　　　　Attach/Row Hse
Art Deco　　　　　Back-to-Back
Beaux Arts　　　　Detached
Bilevel　　　　　　Double Wide
Bungalow　　　　Duplex List Price ?

300000　　TO　　400000

Number of Bedrooms ?

TO

Number of Full Baths ?

TO

Property Address　　　　　　　　　　　　Property Address Display On/Off

Project /Subdivision　　　　　　　　　　Project/Subdivision Display On/Off

Property Description　　　　　　　　　　Property Description Display On/Off

Basement　　　　　　　　　　　　　　　Basement Display On/Off

Parking/Transportation　　　　　　　　　Parking/Transportation Display On/Off

Lot Information　　　　　　　　　　　　Lot Information Display On/Off

Listing Information　　　　　　　　　　Listing Information On/Off

Water Oriented　　　　　　　　　　　　Water Oriented On/Off

Searchlite – Search Form – Microsoft Internet Explorer

File   Edit   View   Favorites   Tools   Help

Address http://search2.mris.com/residential/search_form.cfm?showsection=

Property Address            Property Address Display On/Off

Project/Subdivision            Property/Subdivision Display On/Off

Property Description            Property Description Display On/Off

Basement            Basement Display On/Off

Parking/Transportation            Parking/Transportation Display On/Off

Lot Information            Lot Information Display On/Off

Listing Information            Listing Information On/Off

Listing Broker Code ?     Listing Broker Office Code ?     Listing Agent ID ?

Lookup Broker     Lookup Broker Office     Lookup Agent

Water Oriented            Water Oriented On/Off
Water Front ?     Water View ?     Water Accesst ?
○ No  ○ Yes  ● Either     ○ No  ○ Yes  ● Either     ○ No  ○ Yes  ● Either Prepared by:   Copyright© 2001 Metropolitan Regional Information Systems Inc.
Information deemed reliable, but not guaranteed.

FIG. 73

Short listing – Residential – Microsoft Internet Explorer

File  Edit  View  Favorites  Tools  Help

MLS#  Metropolitan Regional Information Systems, Inc.  02/08/2002
MC4081892  Short Listing  02:03:09 PM

17420 TAUNTON DR GAITHERSBURG, MD 20877

BASIC INFORMATION:
MLS #: MC4081892           List Price: $ 304,900     Status: ACTIVE          Year built: 1980
Ownership: Fee Simple, Sale  Type: Detached          Model: THE VICKSBURG    Style: Colonial Total Taxes: $ 2,922       HOA Fee: $ 0              Area: N/A               List Type: Excl. Right
Tax Year: 2001             C/C Fee: $ 0              Old Map: 19K9           Age: 21
Tax ID Num: 160901836422   Ground Rent: $ 0          TBM Map: 854HS          Lot/Block/Square: 7/D
Adv. Subdivision: MILL CREEK
SOUTH

| TOTAL | MAIN | UPPER1 | UPPER2 | LOWER1 | LOWER2 | SCHOOLS |
|-------|------|--------|--------|--------|--------|---------|
| BR: 4 | BR: 0 | BR: 4 | BR: 0 | BR: 0 | BR: 0 | ES: |
| FB: 2 | FB: 0 | FB: 2 | FB: 0 | FB: 0 | FB: 0 | MS: |
| HB: 1 | HB: 1 | HB: 0 | HB: 0 | HB: 0 | HB: 0 | HS: |

ROOM DIMENSIONS:
Main: Living Room 11 x 19              Upper 1: Third Bedroom 12 X 20
Main: Dining Room 11 X 11              Upper 1: Fourth Bedroom 9 x 12
Upper 1: Master Bedroom 11 x 27        Main: Family Rm 11 x 19
Upper 1: Second Bedroom 14 x 14

PROPERTY INFORMATION:
Main Entrance: Foyer            Number of Levels: 2                  Parking: Drvwy/Off Str,       Metering:
Lot Acreage: .21                Number of Fireplaces: 1              Garage                        TV/Cable/Comm
Lot Square Feet: 9,100          Interior: Floor Plan-Traditional     # Garage Spaces: 2            CATV/Dwelling
Basement: Yes                   Exterior: Deck, Fenced-Rear          # Carport Spaces:             Roofing: Composite
Basement Type: Partial          Porch-front, Sidewalks               #assigned Spaces:             Sewer/Septic: Public Sewer
Unfinished                                                           Handicap:
Appliances: Dishwasher, Disposal, Dryer, Exhaust Fan, Icemaker, Oven/Range-Electric, Range hood, Refrigerator, Washer
HEATING/COOLING/WATER:
Heating System: Forced Air, Heat Pump(s)    Heating Fuel: Electric    Water: Public
Cooling System: Central Air                 Cooling Fuel: Electric    Hot Water: Electric

REMARKS:
Spacious...huge rooms, 1st flr fam rm off large kit. Sep DR. deck in priv backyd. Perfect to metro. public trans 270 370 major roads

METHOD AND SYSTEM FOR PLATINUM DATABASE

CROSS REFERENCE TO RELATED APPLICATIONS

This application is a Divisional of U.S. application Ser. No. 10/117,083 filed Apr. 8, 2002. U.S. application Ser. No. 10/117,083 claims priority from U.S. Provisional Application Ser. No. 60/282,547 filed Apr. 10, 2001, of Rick Carr, et al., titled "METHOD AND SYSTEM FOR MRIS PLATINUM DATABASE." The entirety of all of the above-listed Applications are incorporated herein by reference.

BACKGROUND OF THE INVENTION

1. Field of the Invention

The present invention relates to a flexibly adaptable method and system for providing real estate information, and in particular to a method and system that provides variable information and input for users based on predetermined criteria, such as the location of the property and information requirements associated with that location.

2. Background of the Technology

The ability to describe real property in exhaustive detail has become necessary in the real estate industry. From the moment an owner executes a contract declaring real property for sale or rent, his listing agent is under pressure to effectively and quickly market the property to the public. When a potential buyer inquires about the possibility of a move, the buyer's agent must quickly retrieve countless properties matching the criteria. The listings must be presented in full detail before the buyer commits to the time-expensive trip down the road (or across the country) to view property in person.

Real Estate, while a global industry, is subject to variation by locale. For example, a 'patio' on the East Coast, is called a 'lanai' in Hawaii. Furthermore, specific regions require tracking of fields not present in the core database in the prior art. For example, Washington, D.C., requires tracking of "Soil Types." To that end, there is an unmet need for a single system that includes customization features to allow flexibility based on a given region.

Prior art real estate information systems have included products that provide information on the assumption that the system being installed is for a marketplace in which the entire set of requirements for the marketplace is the same. This approach reflects the assumption that the system would be used within a single geographical area, such as a county.

The features of one prior art system have, for example, included regionalization, in which more than 20 counties were included in a single multiple listing system. However, when such combinations of counties have been included in prior art systems, all of the counties have been required to conduct business identically, regardless of the needs of the local marketplace. Thus, for example, all users in all geographic areas have to provide input in the same fields for each piece of property, regardless of whether these fields are useful for the specific geographic area.

For example, property near the ocean frequently includes a field for "blocks to the beach." However, for property located far from the ocean, input of information for this feature is not useful.

There remains an unmet need to provide a flexible single system for accommodating many users with differing real estate listing needs.

SUMMARY OF THE INVENTION

The present invention includes a method and system for providing real estate information to users tailored to requirements and fields relating to the location of the property. In an embodiment of the present invention, a single repository, such as a database or database farm, is used with middle tier software on servers on a network to provide information to users. Such information is provided via user terminals coupled to the network for particular properties, and information is received via these terminals for properties to add to the database. Information and fields specific to locations are input to the system via a system operator so as to control system requirements for locators.

In one embodiment of the present invention, user terminals utilize downloaded software to interact with the middle tier. In another embodiment, users access the middle tier via a network browser. The middle tier software access is based upon an open standard, such as an open Application Program Interface standard, so as to allow access for a variety of terminal types and software through an open published standard.

Embodiments of the present invention include various levels of security, which limit, for example, a user's capability to input data or search or review information in certain fields. Embodiments of the present invention include front-end security, such as use of passwords or other identifiers linked to user authorization level.

With either the local loaded software option or the network browser option, the user is provided with selections for various options performable via the system. For example, upon entering a user identifier and password, depending on the user authorization, the user may input information or make modifications to data in the database. Such input and modifications are made, for example, via a graphical user interface (GUI) screen. The screen includes, for example, prompts for input regarding the property information to be input.

One embodiment of the present invention includes features for automatically populating information on the property from, for example, public records information, such as assessor deeds and other real estate databases. Upon entry by the user of the address for the property to be input, the address is used to identify data corresponding to the address, and relevant information is used to populate the profile automatically for the property. The information that is to be input to populate the property is determined based on previously identified property criteria for the locale of the property.

Alternatively, embodiments of the present invention allow the user to manually input information, rather than use or accept the automatically populated input. Typical input includes a property description, number of bedrooms, number of baths, the yearly taxes, the roof construction, and other property specific information. In addition, the user inputs information about the seller and selling price, as well as any other information relating to a real estate contract.

The present invention is describable by a number of components, including: 1) System Architecture; 2) Middle Tier Architecture; 3) a listing system; 4) localization module; 5) (QC) quality control module; 6) public record system; and 7) statistics generation; and 8) mapping and imaging/multimedia.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIG. 2 presents a table of sample attributes for a property, in accordance with an embodiment of the present invention;

FIG. 5 presents a table of sample property and description information, in accordance with an embodiment of the present invention;

FIG. 9 presents a table of sample universal identifier (uid) and structure information for a property, in accordance with an embodiment of the present invention;

FIG. 12 contains a table of sample parent uid and column identification (I.D.) information, in accordance with an embodiment of the present invention;

FIG. 16 contains a table of example locale column information, in accordance with an embodiment of the present invention;

FIG. 18 shows a table of example party role record information, in accordance with an embodiment of the present invention;

FIG. 19 is an example table of condo attribute and property information, in accordance with an embodiment of the present invention;

FIG. 20 contains a list and descriptions of valid input groups, based on the Core Data and Virtual Data model, in accordance with an embodiment of the present invention;

FIG. 22 shows a table of example condominium information for a system in accordance with an embodiment of the present invention;

FIG. 23 is an example table of picklist item information for all properties, in accordance with a system for one embodiment of the present invention;

FIG. 24 contains an example table of staged listing information, in accordance with an embodiment of the present invention;

FIG. 26 shows a table of example table of stage identifier information, in accordance with an embodiment of the present invention;

FIG. 27 is an example table of staged I.D. and column I.D. information, in accordance with an embodiment of the present invention;

FIG. 29 presents an example structure table produced by a logical column table, in accordance with an embodiment of the present invention;

FIG. 30 shows an example table of automatically generated structure attributes, in accordance with an embodiment of the present invention;

FIG. 31 is an example table for determining referenced listing attributes, in accordance with an embodiment of the present invention;

FIG. 33 presents a table of example changed listing information for a listing log, in accordance with an embodiment of the present invention;

FIG. 35 is an example table of party role information, in accordance with an embodiment of the present invention;

FIG. 36 contains an example table of post sale data modification for the information of FIG. 35;

FIG. 37 presents a table of sample changed party role information, in accordance with an embodiment of the present invention;

FIG. 38 shows a table containing an example entry having two party roles, in accordance with an embodiment of the present invention;

FIG. 39 is a table of grouped information pertaining to condominium ownership, in accordance with an embodiment of the present invention;

FIG. 41 presents a table of example search attribute information, in accordance with an embodiment of the present invention;

FIG. 46 shows a table containing example standard status records, in accordance with an embodiment of the present invention;

FIG. 47 is an example table containing sample records for a locale status map, in accordance with an embodiment of the present invention;

FIG. 48 contains a table of example status history record information, in accordance with an embodiment of the present invention;

FIG. 49 presents a table of status history record information that includes an expired listing, in accordance with an embodiment of the present invention;

FIG. 53 presents a table of sample criteria for use with the example Locale Tree of FIG. 52, in accordance with an embodiment of the present invention;

FIG. 66 shows an example of exception report information provided in a graphical user interface screen, in accordance with an embodiment of the present invention;

Figure 69:
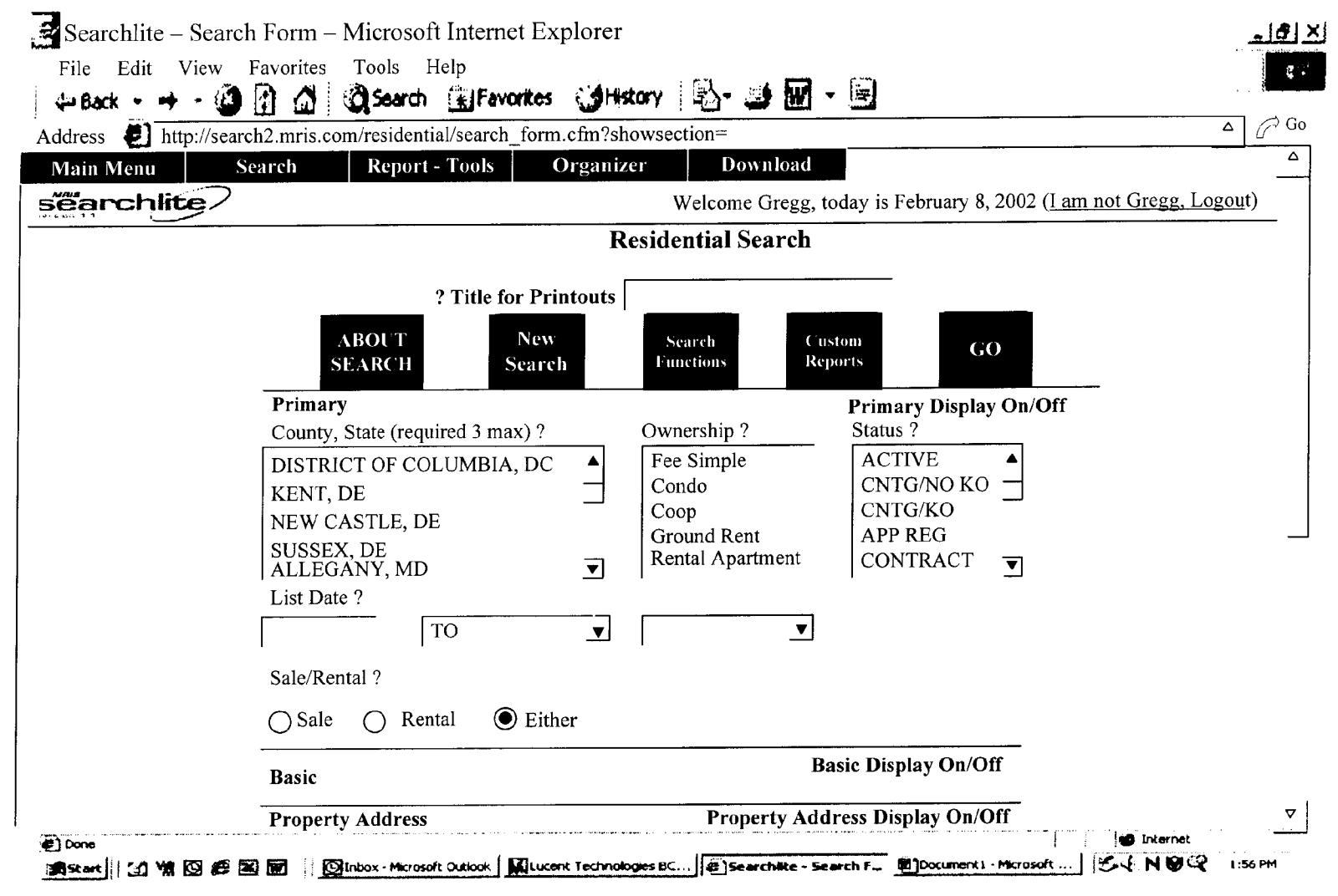
Figure 71:
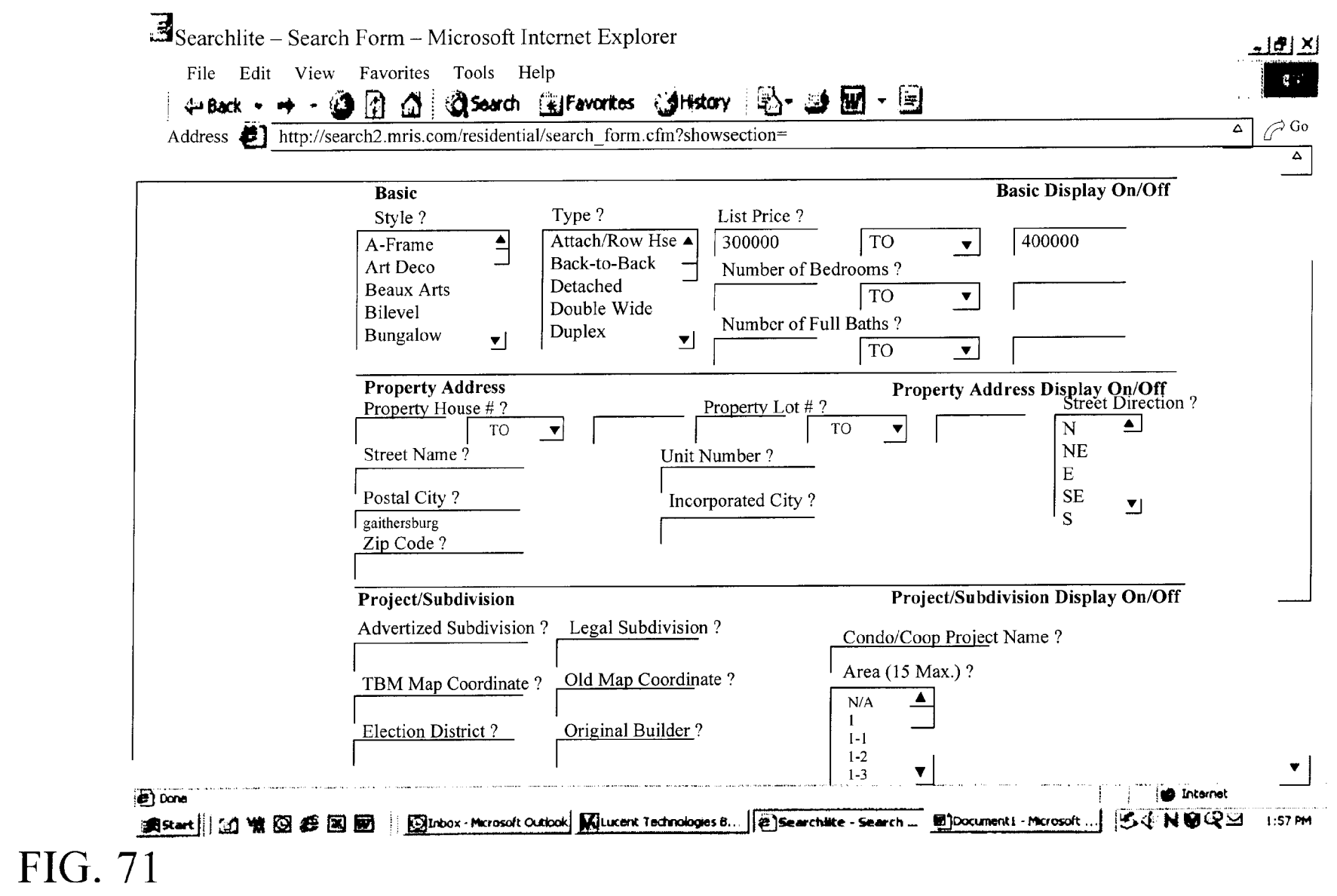
Figure 72:
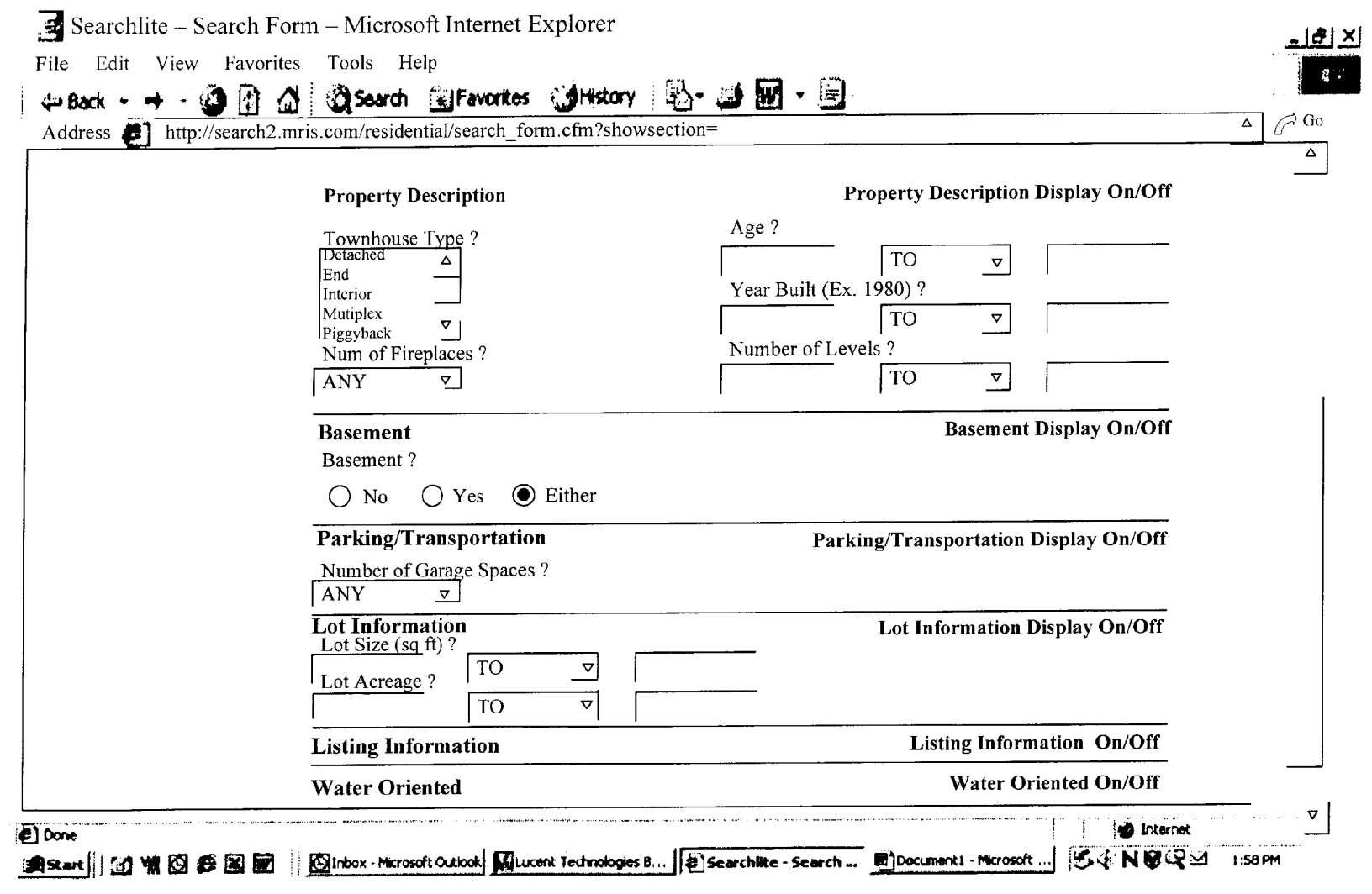
Figure 76:
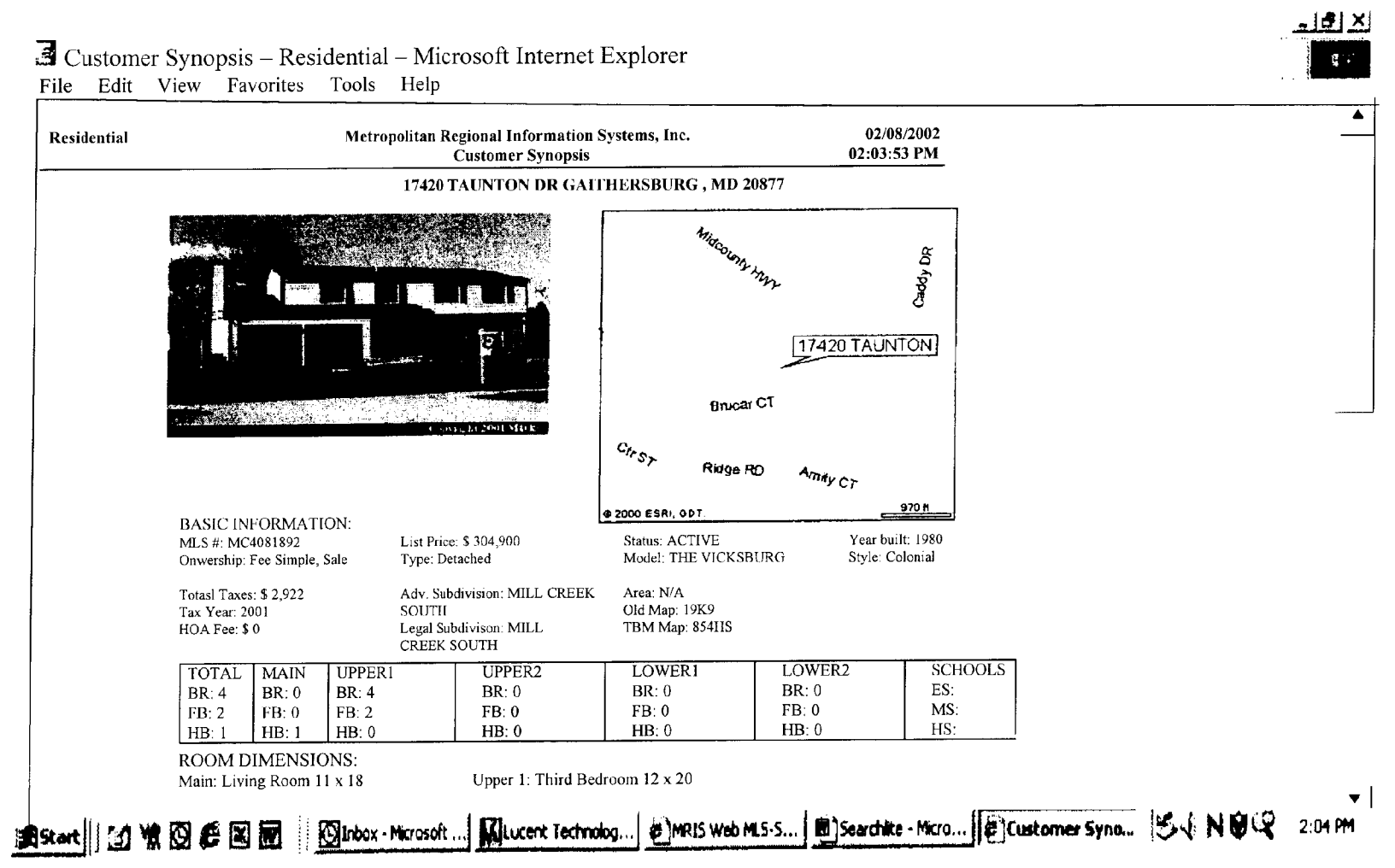
Figure 77:
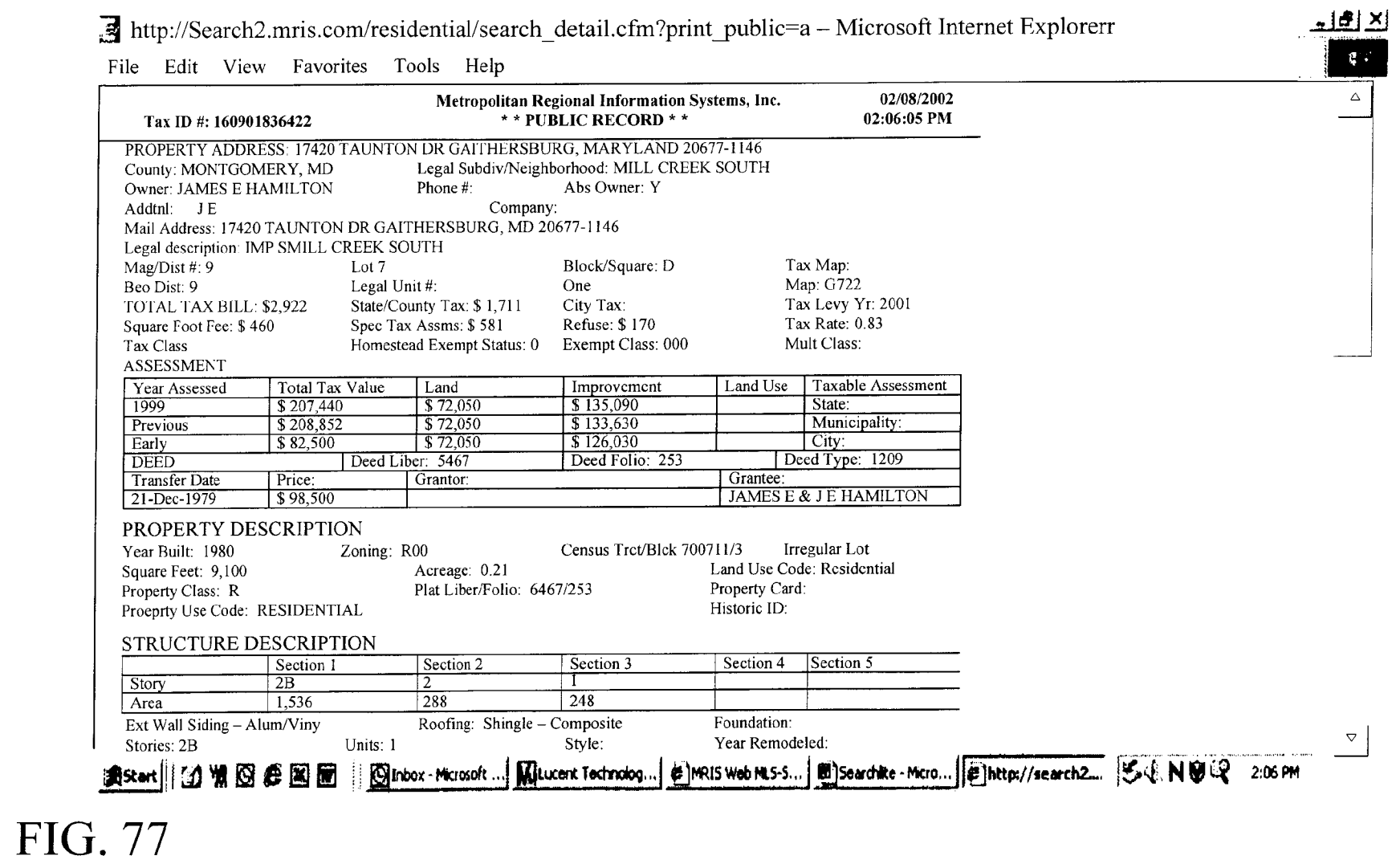

FIGS. 68-77 present sample graphical user interface screens for use with a system in accordance with one embodiment of the present invention.

DETAILED DESCRIPTION

Figure 1:
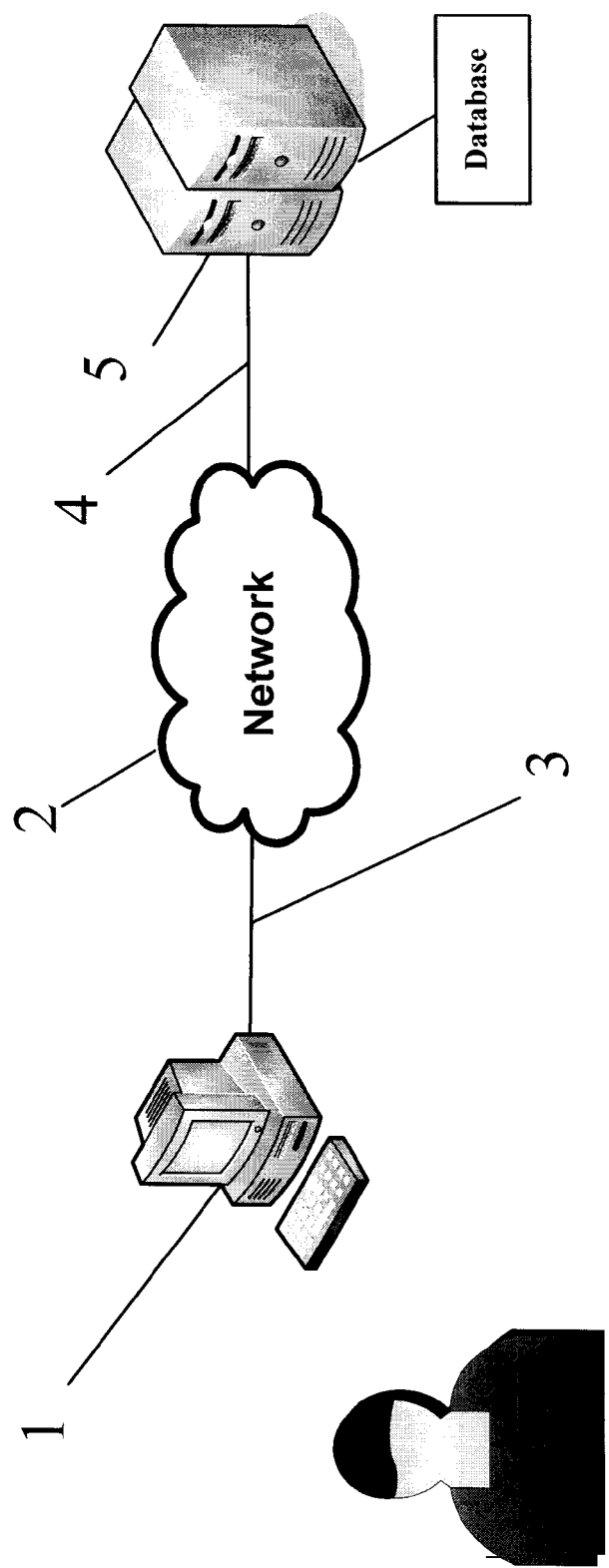
FIG. 1 is an example components diagram for a system in accordance with one embodiment of the present invention.

The present invention overcomes the limitations of the prior art by providing a single method and system that accommodates the needs of multiple local marketplaces. One advantage of the present invention over the prior art is that, in contrast to the listing services in multiple geographic or otherwise defined marketplaces in the past, the present invention does not require separate systems with customized databases to be used in each of those specific localized jurisdictions. The present invention, referred to in one embodiment as the "Platinum database," allows a single system using a single database schema to accommodate the localization needs of multiple marketplaces.

Functionally, in embodiments of the present invention, one feature of the internal design and database allows for a single database object or field to be referenced in more than one name. For example, in Maryland, many houses have certain exterior features referred to as "patios." In Hawaii, a patio is called a "lanai." The system of the present invention allows for that same field of data to be referenced by different names.

As another example, in Washington, D.C., there is a field in the database called soil type. When selling real estate in D.C., soil type is a required field to be completed. In contrast, when selling property in Fairfax, Va., a field for soil type is not required. The system of an embodiment of the present invention allows use of a business rule to change information included in the database, based upon the geographical location of the property.

The present invention tailors the information provided to a user by geographic information for the user, such as by using the address of the property, including the country, state, city, county, and then specific address. For purposes of such definitions, "geographical location" can refer to nearly any selected geographic indicator. In addition, one embodiment of the system allows use of the Geographical Positioning System (GPS) location of the property. Based upon the determined location for the property, the system uses logic to identify required fields, which vary, for example, by what's required in the United States, what's required in the state of Maryland, what's required in the county of Montgomery, what's required in Gaithersburg, and so forth. The present invention thus uses a layer approach, also referred to as a decision tree approach, that varies information depending on the specificity of the address information provided.

Information for requirements is input into the system based on input by local participants in the system. For example, at the county level, the Garrett County Association of Realtors specifies in their marketplace how that marketplace works, what their business rules are, and what is important to them. Once that information is gathered, it is presented to a host operator for the system. An embodiment of the present invention includes a configuration tool, which the host operator uses to input the requirements relating to, for example, Garrett County. These requirements include such information as specific business rules, requirements, and field definitions for that geographical area. When users of the system, such as real estate professionals initiate a search for a property, these users conduct their search based on the rules and fields available for searching in their geographic location.

An embodiment of the present invention is a real time system on a network, such as the Internet, using, for example, Transmission Control Protocol/Internet Protocol (TCP/IP) to access a database on the network.

Embodiments of the present invention include various levels of security, which limit, for example, a user's capability to input data or search or review information in certain fields. Embodiments of the present invention include front-end security, such as use of passwords or other identifiers linked to user authorization level.

Access to the database and capabilities of the system of an embodiment of the present invention depend on user hardware and access selections. As shown in FIG. 1, in an embodiment of the present invention, with one option, locally loaded software at the user's terminal 1, such as a personal computer (PC), minicomputer, microcomputer, mainframe computer, telephone device, hand-held device, or other device with a processor, display, and capability of connecting to a network 2, such as the Internet, is used to access the network 2 via coupling 3 and connect 4 to a database on a server 5 on the network 2. The server 5 includes, for example, a PC, minicomputer, microcomputer, mainframe computer, or other processor. With a second option, the user utilizes a network browser on the user's terminal 1 to access the database via, for example, a network site hosted by a server 5.

With either the local loaded software option or the network browser option, the user is provided with selections for various options performable via the system. For example, upon entering a user identifier and password, depending on the user authorization, the user may input information or make modifications to data in the database. Such input and modifications are made, for example, via a graphical user interface (GUI) screen. The screen includes, for example, prompts for input regarding the property information to be input. Example GUI screens are presented in FIGS. 68-77, below.

One embodiment of the present invention includes features for automatically populating information on the property from, for example, public records information, such as assessor deeds and other real estate databases. Upon entry by the user of the address for the property to be input, the address is used to identify data corresponding to the address, and relevant information is used to populate the profile automatically for the property. The information that is to be input to populate the property is determined based on previously identified property criteria for the locale of the property.

Alternatively, embodiments of the present invention allow the user to manually input information, rather than use or accept the automatically populated input. Typical input includes a property description, number of bedrooms, number of baths, the yearly taxes, the roof construction, and other property specific information. In addition, the user inputs information about the seller and selling price, as well as any other information relating to a real estate contract.

One problem with the prior art is that existing vendor products are based upon proprietary back-end, front-end, and custom databases. Embodiments of the present invention solve the problem by using an open Application Program Interface (API) standard that allows multiple front-end search engines, browsers, and fat clients to access the actual data repository through an open published standard.

A description of how a county or other geographic real estate area is added to the database will now be described, in accordance with embodiments of the present invention. As with other aspects of data entry, addition of a new real estate area is accomplished in embodiments of the present invention via the network. However, in contrast with property data entry or modifications to existing data fields, for which some users are authorized, entry of new real estate areas is accomplished by the host entity for the system. The information for the new region is provided, for example, by a committee in a county that is building consensus for the geographical area as to what information they are interested in inputting into the system. As part, for example, of installation of or deployment into a new market area, the host entity uses a tool set allowing addition of the new area and prompting for selection and set up of the rules, fields, and other information specific to the geographical marketplace being added.

Modifications to the fields or other template information relating to the geographical area are determined by procedures within the region, and the host operator is then approached with changes to be made. For example, if a realtor feels that the local committee (e.g., multiple listing service (MLS)) failed to include a needed field, that realtor would approach the local committee with the recommended change. Upon the local committee accepting the change, the local committee instructs the host operator to make the change. In addition, one embodiment of the present invention includes a contact feature that allows the realtor to contact the host operator directly and request information on how to change the fields. The realtor is then provided with instructions as to contacting the local committee.

An example user interaction by a typical realtor to obtain information about a piece of property in the database, in accordance with an embodiment of the present invention, will now be described. For the browser-based interface, the user selects an option to perform a property search (e.g., selects a button on the GUI for property search). The user then inputs data relating to the property of interest, such as the address or other available location information for the property. The search can also be conducted based on other criteria, such as general location and specific features of interest for the property. For an example, the user can select criteria relating to waterfront properties in general and then search across multiple geographical areas based upon this and any other selection criteria that the user has input into the system. The user then receives information results from the database corresponding to the criteria input.

In an embodiment of the present invention, database management is accomplished by a host operator. A set of specialized configuration and maintenance tools are used in order to maintain the actual database at the database level. For example, in one embodiment of the present invention, the system is based upon Oracle technology on the back-end. Java-based application servers are used in the middle (the "Middle Tier"), and programming languages and tools have been developed and are used to maintain the database and the infrastructure.

In an embodiment of the present invention, the hardware architecture used by the system includes a highly scalable processor or group of processors to house the database, such as the IBM RS6000 (made by IBM Corporation of Armonk, N.Y.) massively parallel SP system. In one embodiment, the SP consists of multiple computer nodes running an Oracle parallel server, which then accesses a single database. Within that single database there is one database schema that houses all of the actual real estate data, as well as all of the configuration information. In one embodiment, all of this information is housed within a single server farm that is highly scalable, highly reliable, and also redundant. In an embodiment of the present invention, this portion of the system is referred to as the "platinum database server farm."

In an embodiment of the present invention, the platinum Middle Tier API is built in a server farm, using, for example, servers manufactured by Intel of Santa Clara, Calif. Each of the multiple servers performs specific duties, such as load leveling or acting as traffic cop (i.e., controlling processing and data flow), handling the actual API or interface with end users, and accessing the database. Generally, the middle tier in this embodiment performs specific duties that relate to how data is requested and updated, as the data is communicated and otherwise handled between the user and the actual database.

Decisions as to the geographic location and information to be provided to a user or for a property are determined at the middle tier level, based on the information received from the user and verified against information contained in the database. The database also includes information relating to each of the user's authorized access level.

The present invention is describable by a number of components, including: 1) System Architecture; 2) Middle Tier Architecture; 3) a listing system; 4) localization module; 5) (QC) quality control module; 6) public record system; 7) statistics generation; and 8) mapping and imaging/multimedia. Each of these components will now be discussed in greater detail.

The listing system portion of the present invention provides a solid, efficient framework for real property data input, storage and retrieval. In one embodiment, this framework handles two main levels. First, the logical data model describes the type and quantity of information that is stored in the listing system. Second, a series of business and system functions describes how customers interact with the listing system.

The listing system provides the framework for describing real property in detail. The flexible, extensible system allows for customization of property in each specific area of the world, while at the same time promoting data standardization across the world. The kinds of information that can be attached to a property listing are limitless, including, for example, text descriptions, photographs, maps, and Internet links. The information is arranged in an organized manner to allow for easy interpretation and display, as well as detailed and effective searching.

The listing system portion of the present invention is focused on real property listings and their related information. The listing system encompasses many modules that, when taken together, constitute a whole system for real property data storage and retrieval. Each module consists of a group of related requirements that can be viewed as a whole or as part of this larger listings system.

Each listing is comprised of many attributes: descriptive details that together paint a complete picture of the listing. For example, a property may contain "3 bedrooms, 2 full baths, 1 half bath, 3 acres of land, a Dishwasher appliance and a Cooking Range appliance." This list is equivalent to five distinct attributes as shown in FIG. 2. Each listing attribute has a name and a value. Without the name "Bedrooms," the value "2" holds no meaning, and vice versa.

Attributes also have properties, such as data type, size, and input rules. For example, the "Bedrooms" attribute may be numeric, and it may be required for all listings. The "Appliances" attribute may be an optional pick list that allows multiple selections. For the purpose of understanding the present invention, a brief overview of these properties is provided below.

Figure 3:
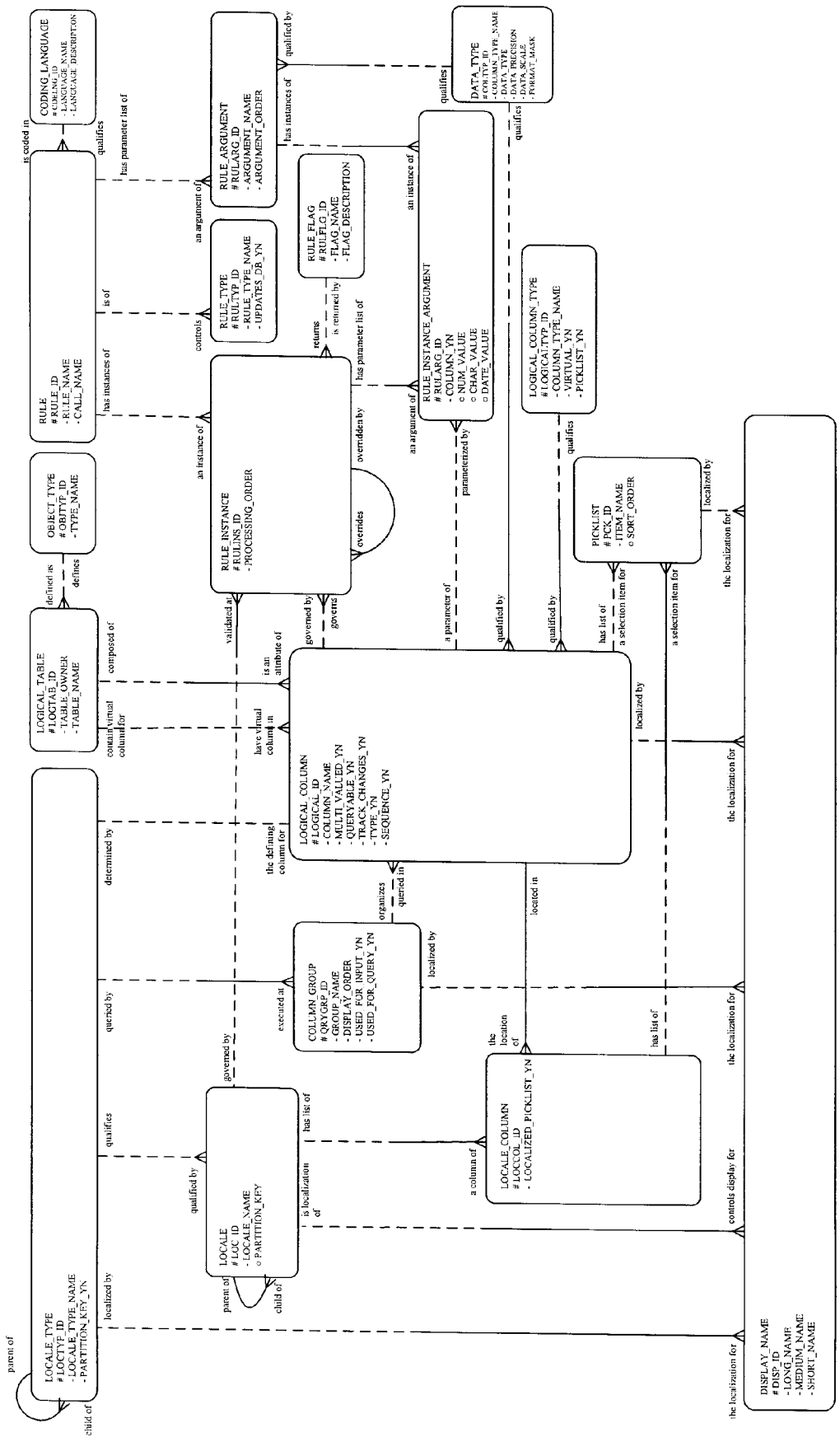
FIG. 3 shows a block diagram for an example meta data model, in accordance with an embodiment of the present invention.

The system's meta data model of the present invention, as shown in FIG. 3 defines the properties for listing attributes. When discussing a listing attribute's name (Bedroom) and properties (required, numeric), apart from any specific value (2), the term logical column is used. A simple way to understand this term is to think about a spreadsheet or a table, which includes rows and columns. Just like in a spreadsheet, the rows (or records) hold the values for all of the columns identified at the top.

Figure 4:
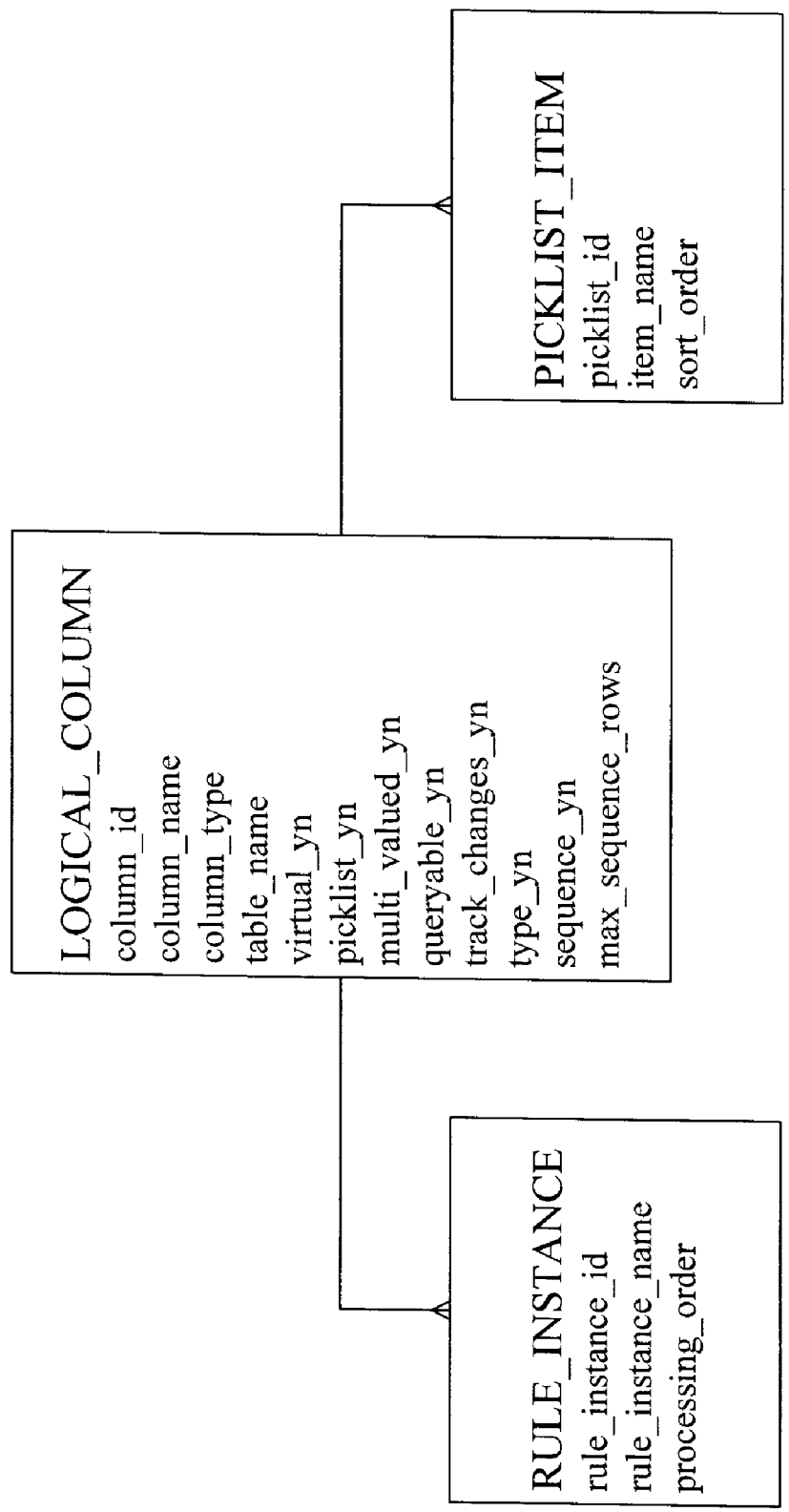
FIG. 4 contains an example block diagram of a representative data system in accordance with an embodiment of the present invention.

Logically, the entire listing system can be pictured as one giant table with many, many rows of data. The logical columns at the top define every possible value that can be included in a listing. And instead of defining just a name for each logical column, the system defines many other properties as well. FIG. 4 is an example block diagram or a representative description of a data system, in accordance with one embodiment of the present invention.

In the center of FIG. 4 is the representation for the logical column, with its many base properties. In addition, each logical column can be attached to one or more governing rules, such as "value required" or "value cannot be greater than 50." Finally, a logical column can be attached to one or more possible picklist items. For example, "Home Type" may have several picklist items associated with it, including "Detached", "Attached", and "Mobile Home."

The base properties for an example logical column called "ListPrice" are shown in FIG. 5, and a sample value for each property is provided. Note that logical columns are often identified by the column_I.D.

A given logical column may apply to one listing or one million listings. Regardless of it's scope, every logical column must be defined in the meta data. Scope, in this sense, is one of the following two choices, in accordance with an embodiment of the present invention: 1) core, or applicable to all Platinum listings; and 2) locale, or applicable to listings in a specific geographic area only.

The system's foundation is a core set of required and optional attributes. These attributes can be used to effectively describe real property listings across the world. The core set includes, but is not limited to, all elements defined in the Real Estate Transaction Standard (RETS). Example elements are listed in Appendix A: RETS Elements.

To illustrate the benefit to this base level of data standardization, take the following example of a hypothetical individual, referred to as "John Smith": John is a web developer who lives in San Francisco and works from home. Tired of the big city, John hits the Internet one night, entering the value of his current one bedroom apartment ($350,000 US). He's delighted when he sees listings come up from the South of France to the mountains of Colorado. Because all property listings share a core set of attributes, standard search and retrieval methods can be implemented to run across the entire system.

Figure 6:
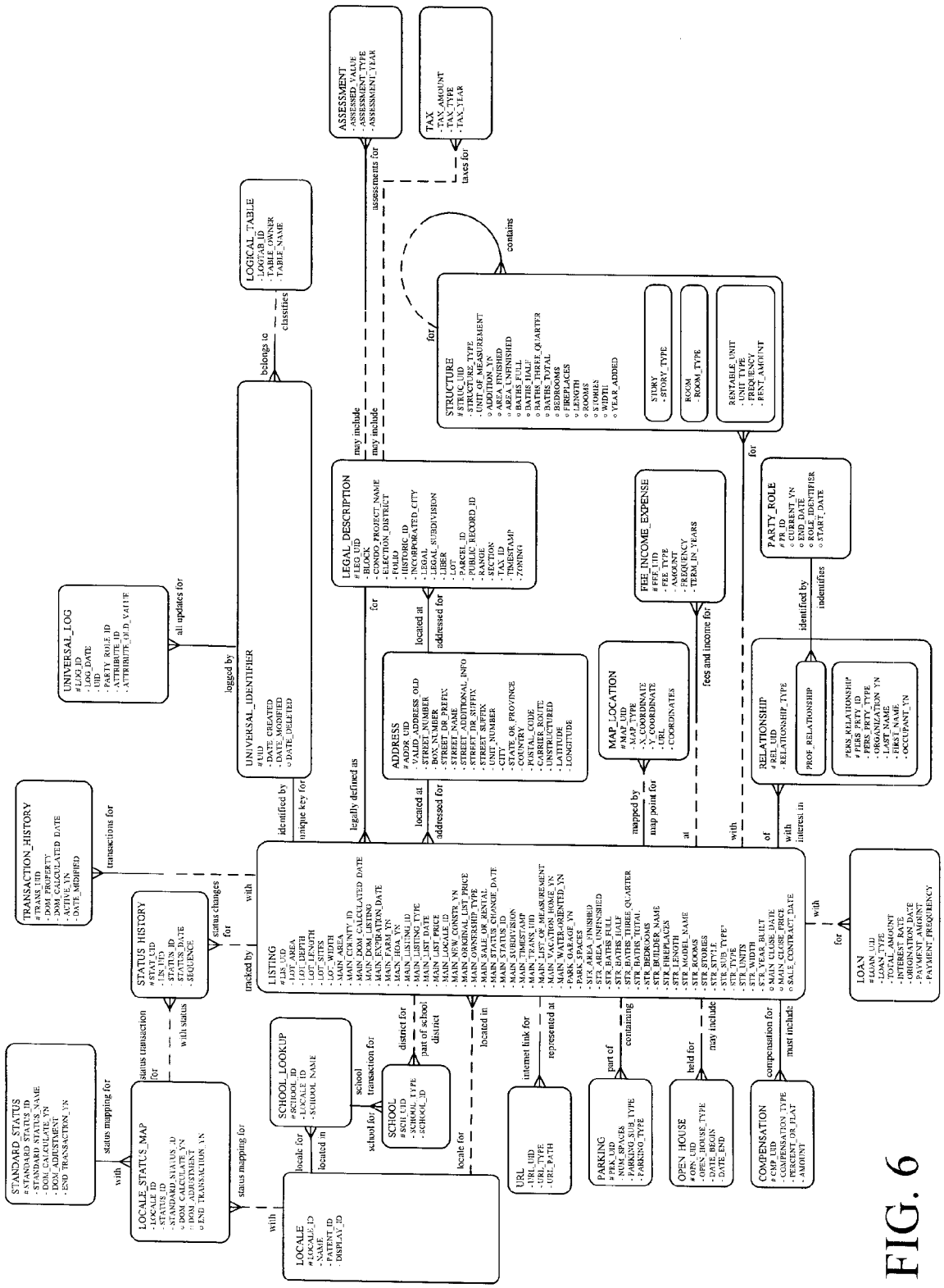
FIG. 6 shows an example block diagram of core attributes of a system in accordance with an embodiment of the present invention.
Figure 7:
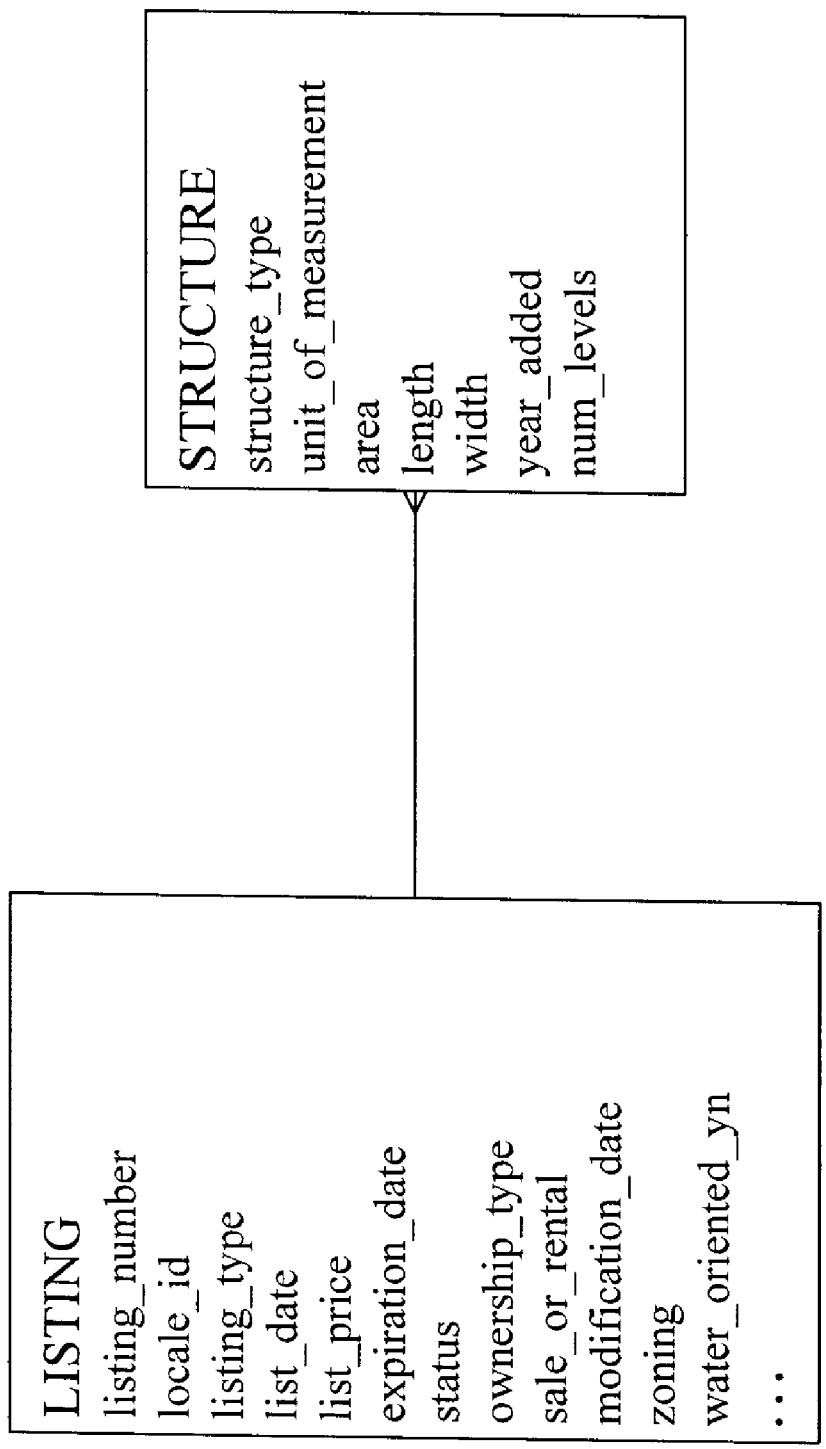
FIG. 7 is an example block diagram of the relationship between listing and structure tables in accordance with an embodiment of the present invention.

FIG. 6 is a visual representation of these core attributes. Various RETS element can be found in the diagram shown in FIG. 6. In FIG. 6, the listing data has been broken down into sets of similar data, which are stored in separate areas, or tables. The rows, or records, in these tables are then linked back to the main listing. FIG. 7 shows the relationship between the listing and structure tables.

A structure can be a rent-able unit, a level or a room, as indicated by its structure type. At first, these items may not seem too similar. However, all structures have dimensions: area, length and width, and they may have year added and number of levels. The similarities found in the different structure types make it effective to store them together.

Also, one listing may include many records in the structure table. In fact, many listings contain a unit, 20 or more rooms, and three different levels. If all of these structures were stored in the same table as the rest of the listing data, that table would be very large. Also, much of that data would be blank, or null. Storing everything in one big table has some advantages, like the fact that it is relatively easy to understand. However, in terms of storage space and retrieval speed, normalized data (as shown above) is generally more efficient.

The words "generally more efficient" indicate that there are times when listing data should not be normalized, and this is true. An embodiment of the present invention uses the following rules for determining when to normalize data.

1) When there is a one-to-many relationship between the listing and an object contained by that listing, that object is stored in its own table.

2) However, when that object is one of the most commonly searched listing items, it is stored in the main listing record. For example, the main structure of a property (the home), although it logically 'fits' in the structure table with levels and rooms, is stored in the main listing table to maximize query performance.

3) The same piece of data is not stored in more than one place; instead, a reference to the original piece of data is used. For example, an agent's name and contact information is the same, whether that agent is acting as the listing agent or selling agent. Thus, each agent's name and contact information is stored in one table, and all applicable listings refer to the appropriate agent record in that table.

4) If many different objects could refer to a piece of data, that data is stored in its own table. For example, both a listing and a public record could refer to the same address, so addresses are stored in their own table. The benefit is that changes to an address are instantly available for retrieval. For example, if an address is changed by the United States Post Office data, all referring listings and public records are able to obtain this information change.

5) There may be times when a change to that item should not be seen by objects other than the one that caused the change. For example, a listing agent modifies his listing's address because he did not trust the public record. This may be a valid change for the listing, but the public record system should not use this new data. In cases like this, the same address is stored once for the listing and once for the public record.

Figure 8:
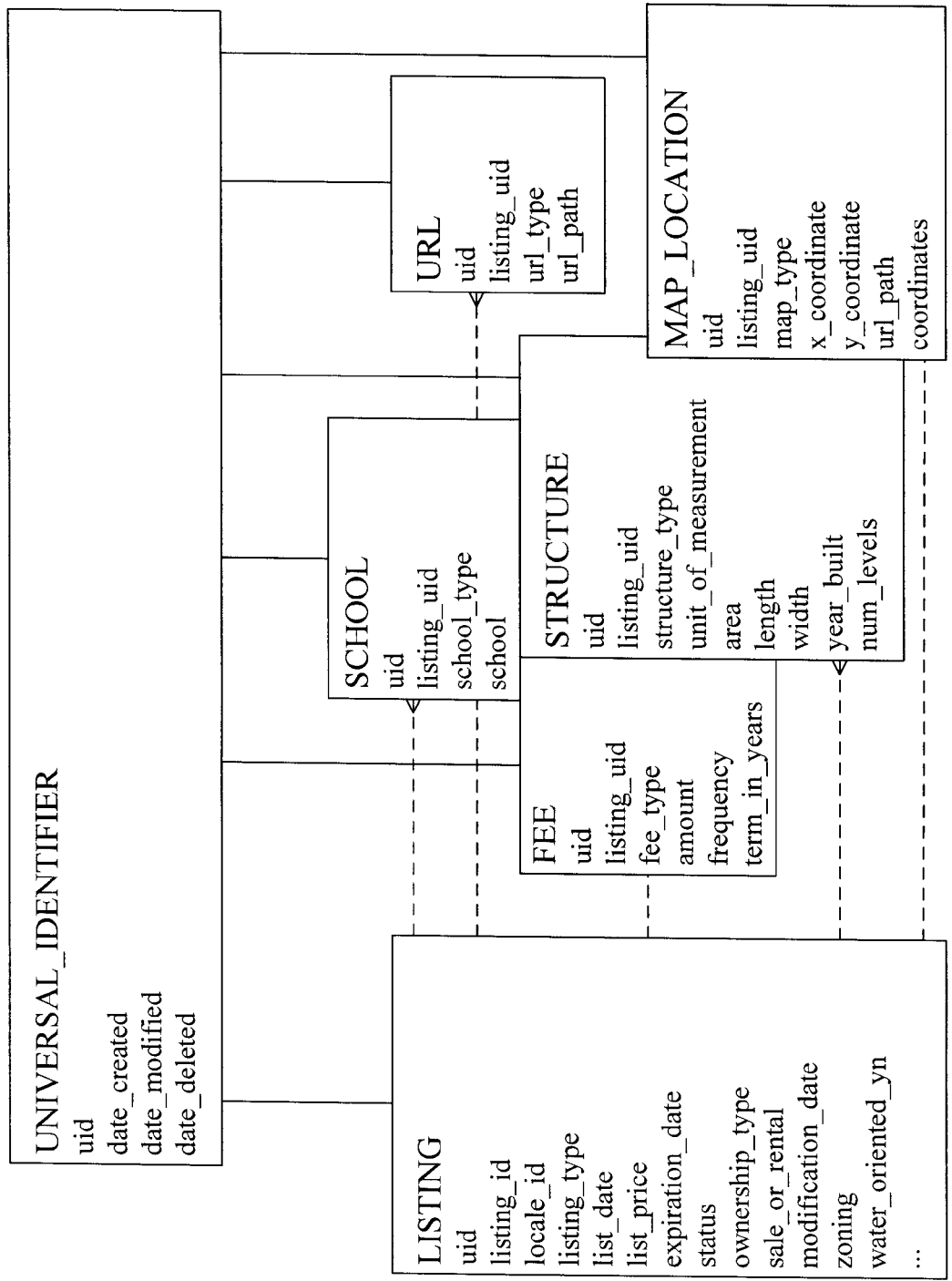
FIG. 8 contains a block diagram of universal identifier information for a system in accordance with an embodiment of the present invention.

Thus, when efficient, in an embodiment of the present invention, data are stored in different tables. These tables include property fees, location descriptions, schools, Internet links, etc. The system obtains all the data for a given listing at once through the universal identifier, as shown in FIG. 8.

The universal identifier is a unique number assigned by the system to each record in the listing system, as it is created. No matter what kind of record (e.g., listing, structure, fee, url), the universal identifier is generated from the same pool of numbers. This ensures uniqueness for all records in the listing system. In an embodiment of the present invention, a record's universal identifier is never changed. It is the one piece of information that is always used for system identification.

Records that should be linked together use the universal identifier as the method for doing so. For example, a listing that contains "3 bedrooms, 2 full baths, 1 half bath, 3 acres of land, a Dishwasher appliance and a Cooking Range appliance," has a universal identifier of #123000. This listing also includes six structures: one is a level and five are rooms. Each of these structures is represented as a record in the structure table with its own universal identifier. Additionally, these records include a reference to the main listing's universal identifier (uid), as shown in FIG. 9. Using the universal identifier in this manner allows the system to link appropriate records together in order to display an entire listing.

Another feature of an embodiment of the present invention is the use of calculated data. The listing system, in accordance with an embodiment of the present invention, utilizes many attributes that are based on calculations from other attributes.

For example, an active listing's days on market might be the difference between the current date and the listing date. Another example would be total bedrooms, which might be the sum of the bedrooms on each level in a home. In terms of efficiency, the present invention uses the following guidelines to handle calculated data:

1) Generally, summed or calculated data is created on the fly, rather than stored. This reduces system overhead involved in recording data that is constantly changing, and it increases data accuracy. A listing's days on market is calculated on the fly. This data is rarely queried, but it is used in many reports. Also, it changes every second, and would require much system overhead to keep it accurate.

2) However, if summed or calculated data is queried frequently, it is stored in the listing system, even if it requires more overhead. This is because query speed is slow when that query is dependent on calculations being made at that time. For example, because total bedrooms is searched on a regular basis, it makes sense to store this attribute in the listing system, rather than calculate it on the fly.

3) If the pieces needed for the data calculation are not required by the system, the data are stored in the database. For example, it is not a requirement to enter the number of bedrooms for each specific level of the home. If the calculation of total bedrooms was dependent on these non-required items, there would be times when the calculation of total bedrooms would not be possible. Thus, total bedrooms is stored in the listing system.

4) If the calculation performed to obtain the data is extremely laborious, the data is stored rather than calculated on the fly. This saves system resources in the long run. An example of this is a public record's time on market. This calculation takes into consideration all listings that have occurred for a specific public record over time, and, as such, requires more processing time.

The present invention includes a method for translating the normalized core data model into a simple list of attributes. The meta data model of the present invention stores all the details necessary for this translation, by the logical column name.

Figure 10:
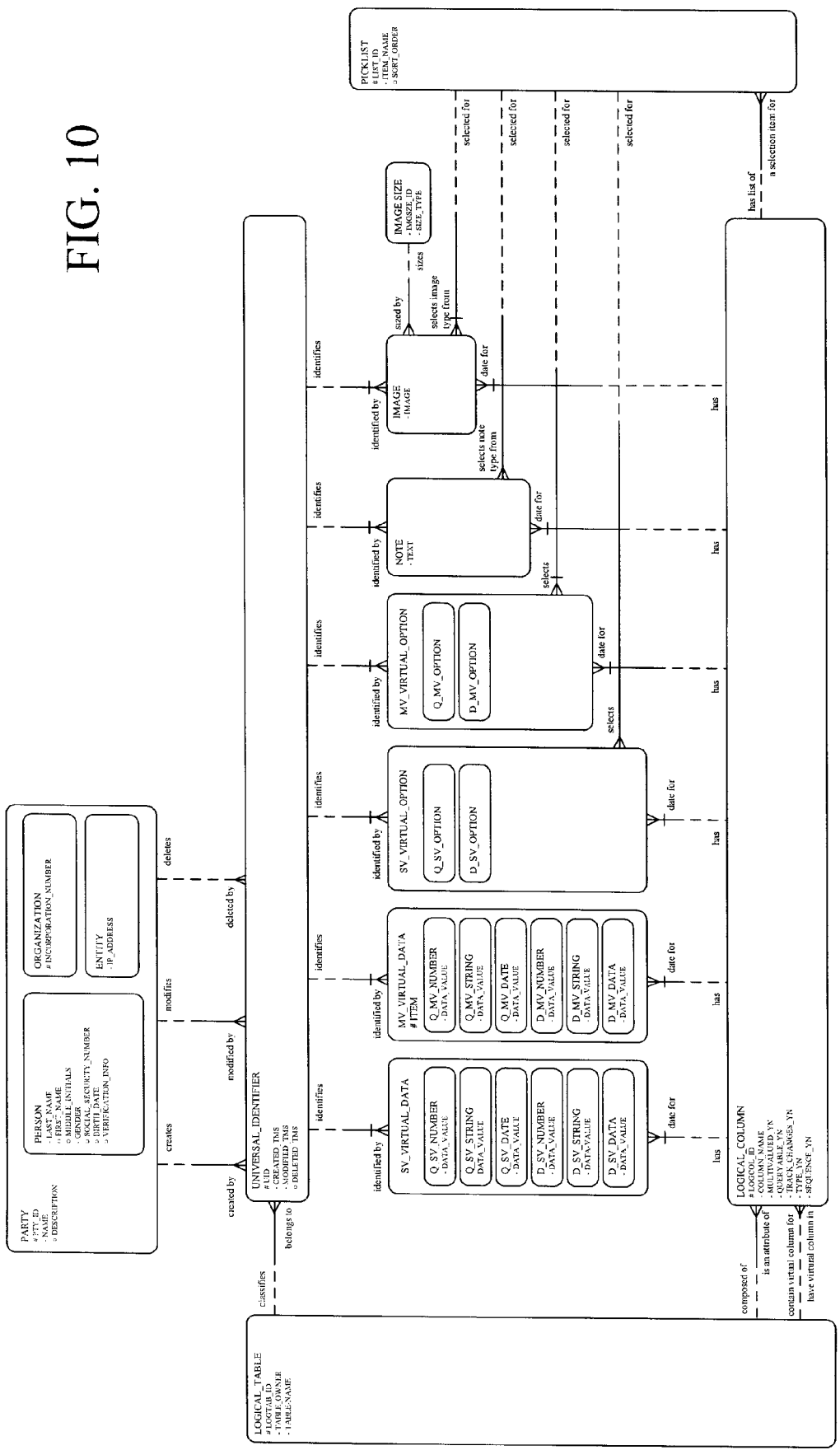
FIG. 10 shows a block diagram of an extensible listing data model for a system in accordance with an embodiment of the present invention.

Building on the core data set is a feature of the listing system portion of the present invention. Different kinds of real property, even similar property located in different areas, require additional attributes that do not necessarily apply to the standard listing. There is little benefit to forcing all listings into the exact same mold, as the following example scenario illustrates: Jane Doe, a Realtor in Hawaii, is pulling up listings for her most particular client. She's not interested in pulling up every possible listing in the world. She wants to see only the vacation condos with water views and access to the local Beach Club. A lanai is a must, and the property must be at least 20 miles from the island's volcano. Because data is customized according to the location and type of property, searches can be drilled down to the last detail, effectively limiting results to serious candidate listings only. The model for extensible listing data is shown in FIG. 10. This model allows add-on data, regardless of its meaning, to be stored in the same repository and attached to the appropriate listing.

Another feature of the present invention is virtual data. This is a somewhat complicated concept, but it can be broken down using a simple example. A Hawaii listing with universal identifier #123000 has the following core attributes: 3 bedrooms, 2 full baths, 1 half bath, 3 acres of land, a Dishwasher appliance and a Cooking Range appliance. In addition, this listing's distance from volcano is 25 miles. Distance from volcano, while it may be the most important attribute for this Hawaii listing, is not extremely valuable in Iowa. Even so, it would be possible to save space in the main listing table in order to store the distance from volcano for every listing. But it would not be efficient. In most cases, the value for this locale-specific column would be blank, or null. What's more, there are countless locale-specific attributes across the world. The listing table would grow to an unmanageable state fairly quickly if all attributes were stored there.

Figure 11:
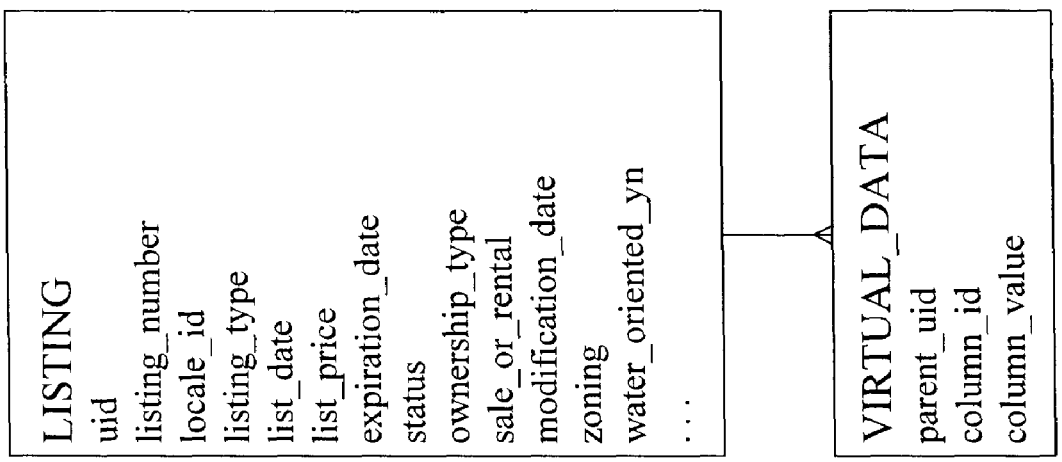
FIG. 11 is a block diagram of virtual attribute adding-on to a listing, in accordance with an embodiment of the present invention.

Instead, both the name (miles from volcano) and value (25) of that attribute, or logical column, are stored in the virtual data table of the present invention, as shown in FIG. 11. As FIG. 11 indicates, this virtual attribute is added-on to the listing. It is just as if the listing table was extended to include that attribute, for that particular locale only.

This idea can be extended. Virtual data can be used not just for listing records, but for structures, fees, locations, or any other record with a universal identifier. Using the sample listing from above, Master Bedroom #123002 includes a lanai. In Hawaii, many rooms include an adjoining lanai, so a locale-specific attribute, LanaiYN, has been defined as virtual data for the structure table.

One reason that the universal identifier is important in this embodiment is because the system needs a way to link the virtual data back to the appropriate parent record. Also, logical columns are often referred to by column_I.D., rather than name. For the sample listing, the records indicated exist in the virtual data table example shown in FIG. 12.

Notice that no new universal identifier is generated for these pieces of virtual data. This is because virtual data is regarded as add-on data for another record. It is generally not useful on its own. The only universal identifier included here is the one necessary to link back to the parent record.

Another thing to consider is the attribute value. In the example above, there are two data types represented: numeric and text. Locale-specific attributes often come in as many different data types as core attributes. Efficiency-wise, with the present invention, it is useful to store virtual data of the same data type in its own place.

Figure 13:
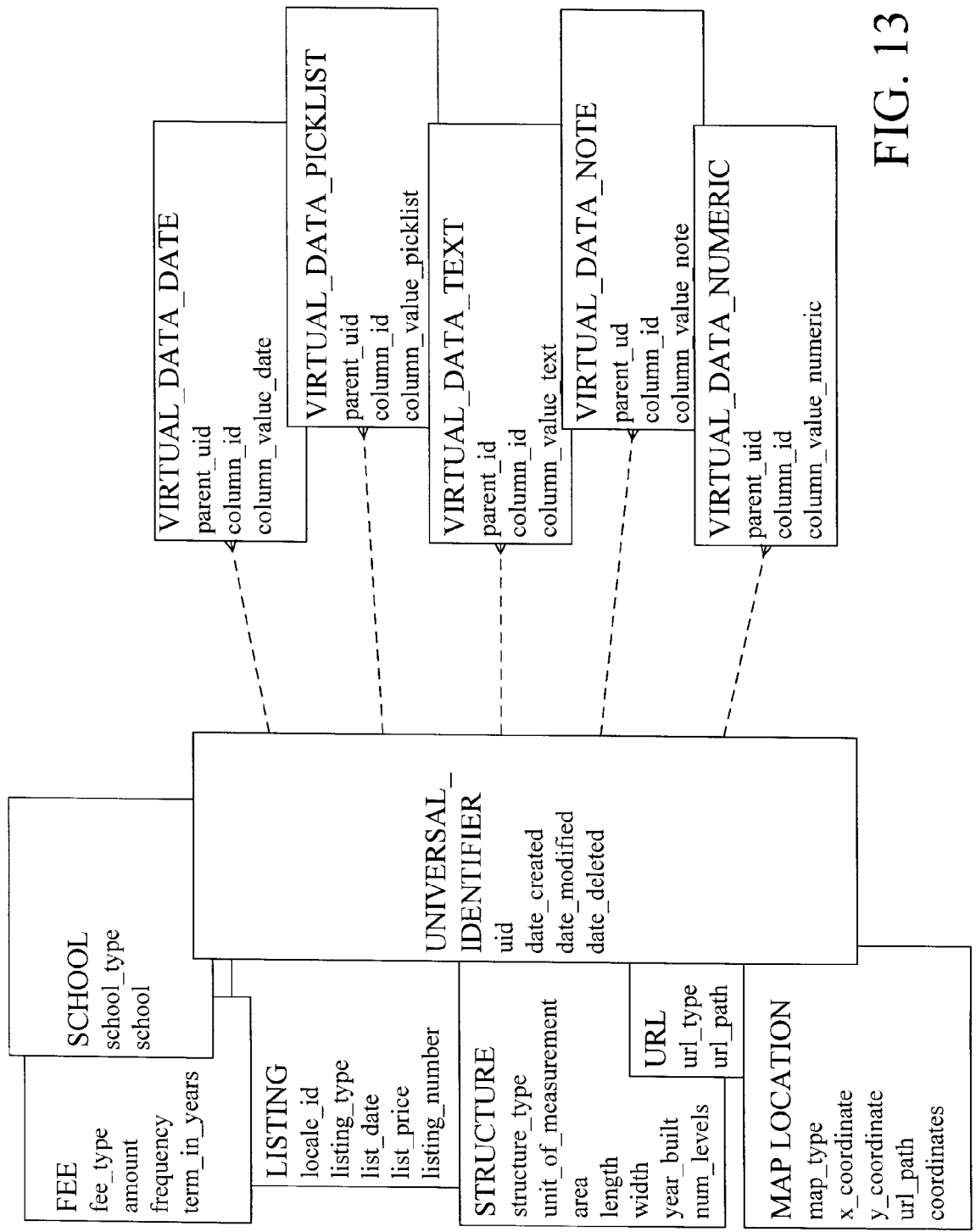
FIG. 13 presents a block diagram of storage of virtual data for different data types in different locations, in accordance with an embodiment of the present invention.

For example, the miles from volcano attribute calls for a numeric value. It would be possible to store that numeric value along with other text and date values. However, this would mean the lowest common denominator of searching. A standard range search, like "20-25 miles from volcano", would produce a system error. Additionally, data integrity would be more difficult. It would not be possible to rely on the database system to ensure values input for miles from volcano were numeric. More advanced programmatic methods would have to be developed instead. To address these difficulties, an embodiment of the present invention stores virtual data for different data types in different places, as shown in FIG. 13.

This idea is also extended throughout the system. Because a large amount of data is stored as virtual data, it makes sense to group similar kinds of data together and store them in their own tables. This approach is similar to the approach to the core attributes described above. Thus, logical columns with the same properties are stored in the same virtual data table. Data type, or column type, is one of the base properties of logical columns, as described above. In addition, logical columns are classified as allowing single or multiple selections, and being query-able or not query-able by the system. These properties are all used. In the end, the virtual data is broken down into a number of tables in an embodiment of the present invention.

Figure 14:
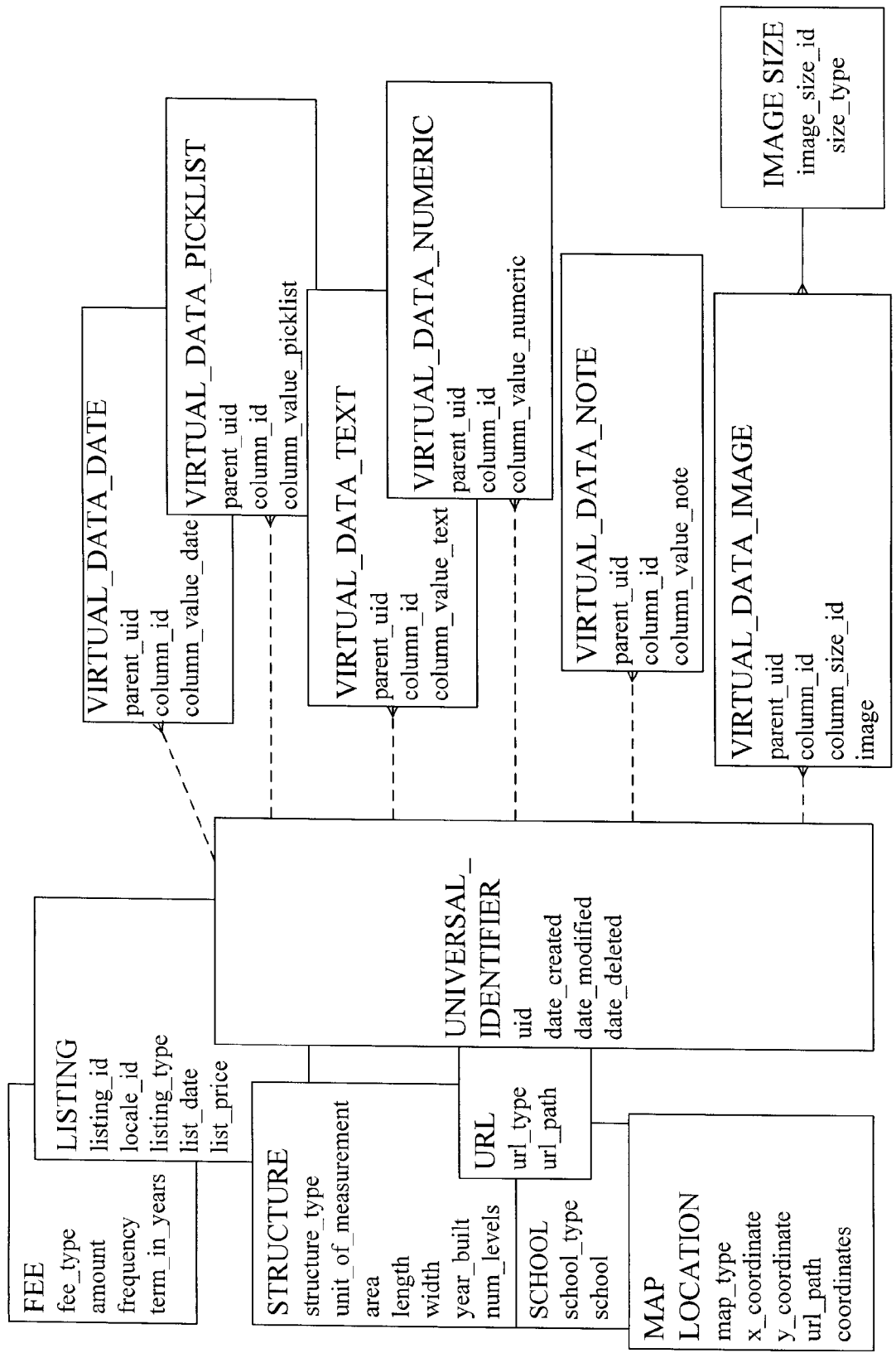
FIG. 14 shows a block diagram of images and notes information included in a set of virtual data tables, in accordance with an embodiment of the present invention.

In an embodiment of the present invention, images and notes are included in a set of virtual data tables, as shown in FIG. 14. The virtual notes table allows the system of the present invention to attach agent remarks, public remarks, directions, or other comments, to a particular listing or listing object. Virtual image allows the system to attach multiple images to a particular listing, even to a structure (like a room) or a school if desired. Images are slightly more complex, in that a specific image size (small, medium, large) must be selected. In this sense, size refers to the pixels used to display the image appropriately.

The meta data model is capable of translating the physical database layout into a simple list of attributes. One feature of the present invention for virtual data is that they are included within the schema for a given location. The system stores many such schemas, and allows them to be added continually over time. The Localization Module portion of the system, described further below, details the process for storing and handling these schemas. A basic overview of the system follows.

Figure 15:
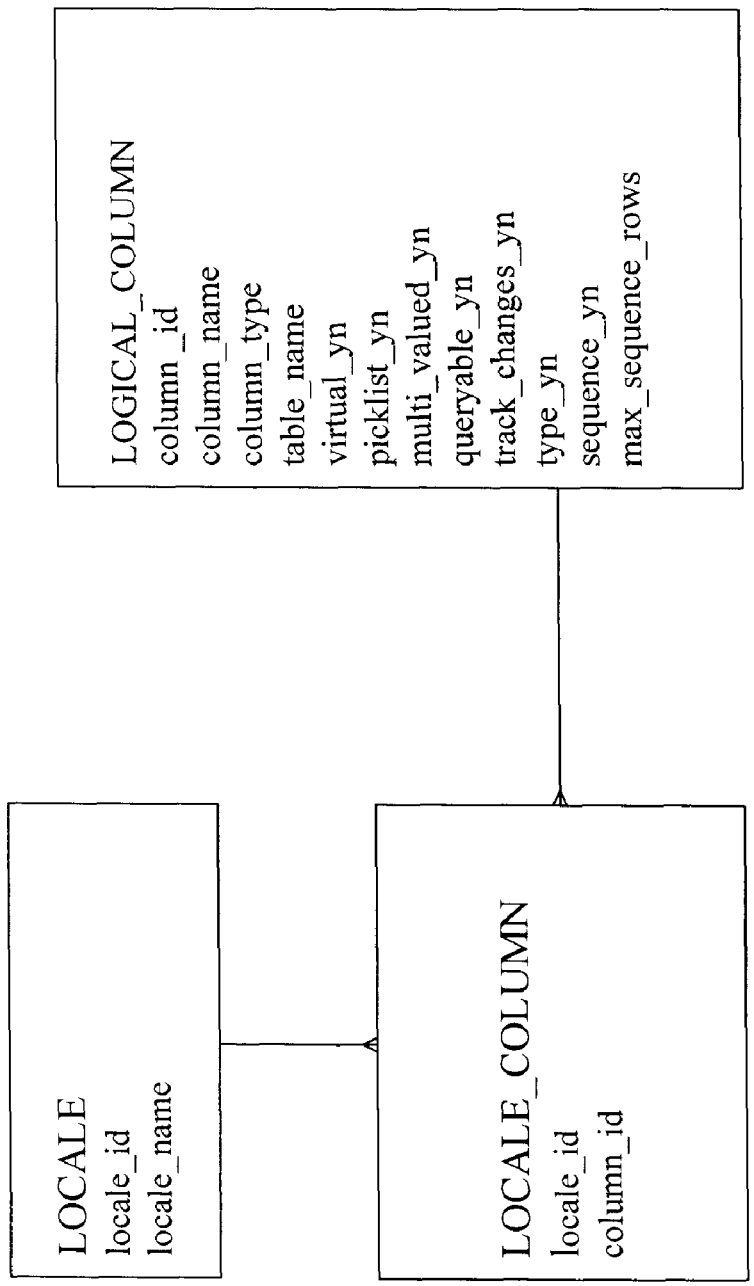
FIG. 15 is a block diagram of locale column information, in accordance with an embodiment of the present invention.

FIG. 15 provides locale column information. A locale has already been defined as a geographic area, but the Localization Module builds on that. The idea of locales is pictured as a tree, starting up top with the system core, and branching out to more specific locales underneath. This tree has several levels that include, for example, core, country, state, county, realtor board, or even city in some cases. For example, the core might have two countries directly below it, including United States and Canada. Underneath United States, the tree might have Maryland and Virginia. Under Maryland, Montgomery County, etc. Every listing must be assigned a locale. In fact, the locale for a given listing is the most specific locale that exists for its address.

Next, the idea of logical columns is developed further. When a logical column is defined for an area that is a subset of the core, it is necessary to link that logical column to the appropriate locale. This is accomplished by adding another layer to logical columns, called locale columns. A locale column is a reference to a logical column, but only for the locale specified. For example, the Miles From Volcano attribute applies only to the state of Hawaii. In order to use this attribute, it must defined in the meta data. First, the logical column is defined. Next, a locale column is created that references this logical column for Hawaii.

When all columns are defined in this manner, it becomes much easier to determine which columns apply to a given listing. All columns are defined for that listing's locale, as well as every locale in the path followed up to the core level. For example, if a listing is located in the state of Hawaii, the locale columns shown in FIG. 16 might apply.

In summary, through its meta and virtual data models, the system of the present invention allows each local area to define a database that fits its specific needs, while still complying with the standards of the real estate industry at large.

Because of the listing system's two main goals, data standardization and extensibility, the invention employs fairly complex storage methods. An extensive API library is included in one embodiment of the present invention to handle all direct interfacing with the listing system. This library, which is detailed further below, includes interfaces for each of the business functions of the system.

Before a customer inputs or retrieves listing information from the system, the user is required to authenticate with the system. A customer (also referred interchangeably throughout as a "user") can be a real estate agent, an appraiser, an application, an anonymous web surfer, or even an automated export process. Regardless, every customer must complete authentication before accessing any listing data. This process is well detailed in the API library description below.

The party model stores information about the system's customers. All customers have an identifier and a name, and all have at least one role to describe how they work with the system. For example, Mary Smith is a subscriber to the system. This identification level provides her with one of the most basic roles within the system, the subscriber role. Mary is also a member of the Greater Capital Association of Realtors, which itself is a party and a region within the system (a locale). Additionally, she works for a company called Johnson Realty, which happens to be another party in the system. There is a relationship between Johnson Realty and Mary. One of Mary's roles is to act as an 'agent for' Johnson Realty. The Party Model allows storage of all of these roles, as shown in FIG. 17.

Figure 17:
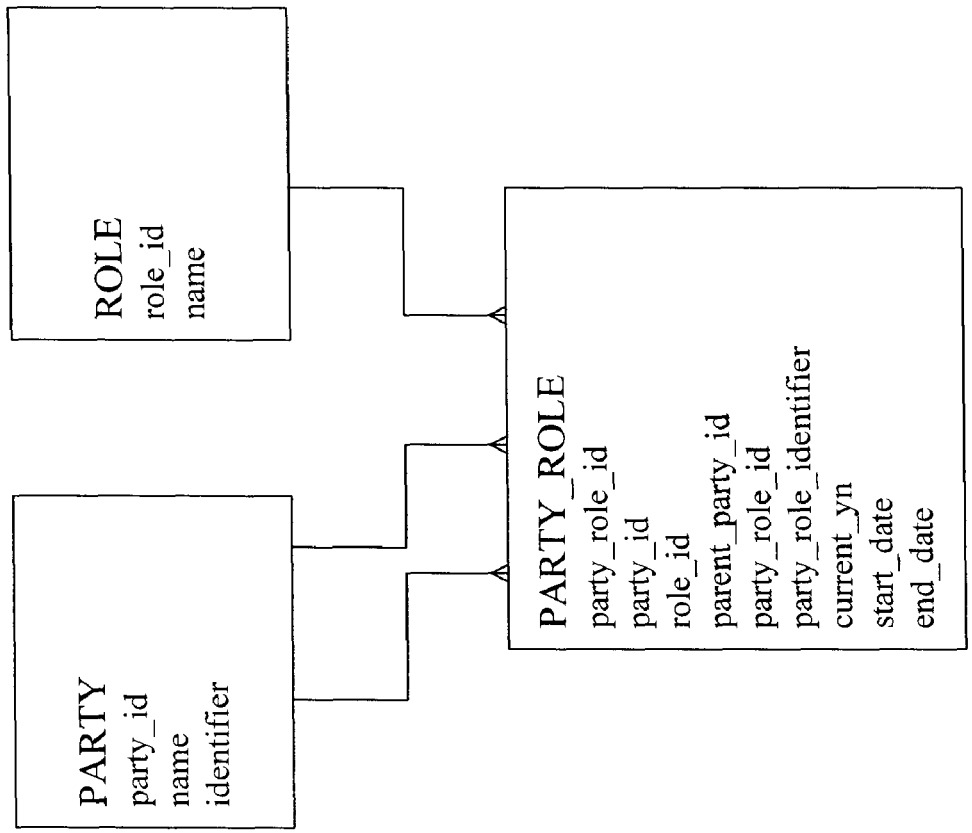
FIG. 17 presents a block diagram of a party role information model for a system in accordance with an embodiment of the present invention.

As the diagram of FIG. 17 indicates, the party role table shows the relationships between parties in the system. Since there are two parties in every relationship, there are two lines drawn from party to party role. For example, Mary Smith might have the records shown in FIG. 18 in the party role table based on the example above. The party I.D. refers to the party which has been granted the specific role indicated by role I.D. The parent party I.D. is the party who is granting the role to the party. So, the system is granting the role of subscriber to Mary Smith, and not the other way around.

System privileges, linking searching for comparable properties or inputting a listing, are one set of factors in the roles granted to a specific party. In the example above, Mary Smith might have the following system privileges that come with her roles: 1) subscriber role allows Mary to login to the system; 2) subscriber role allows Mary to search active system listings; 3) member role allows Mary to search GCAR members; 4) agent role allows Mary to input listings on behalf of Johnson Realty; 5) agent role allows Mary to search comparable system listings; and 6) agent role allows Mary to use Johnson Realty's shared searches.

In an embodiment of the present invention, there are several administrator roles in the system, including the Locale Administrator, the Branch Office Administrator, and the Brokerage Administrator. These roles include special system privileges. For example, the Locale Administrator is allowed to create and update the locale columns for the parent locale. All locales have been entered into the system party table, and thus can be used in creating party roles.

In summary, at the authentication stage, an embodiment of the system determines the privileges a customer has been granted, based on assigned party roles. It should be noted that authentication, in this sense, assumes that a user has already established a connection to the Internet or the other system network. If a customer on a single-user machine connects to a non-Internet system network, in one embodiment of the present invention, authentication information is passed to the listing system transparently, in order to avoid multiple logins.

In an embodiment of the present invention, customers with an 'agent for' role have the ability to enter listing information into the system on behalf of their broker. This includes the following types of data: 1) New Listing—property listing that is new to the market; 2) Sold Listing—property that sold before it was entered into the system, such as a new home, comparable property, or for sale by owner property; 3) Listing Update—modification(s) to an existing listing; 4) Open House—open house for an existing listing; 5) Multimedia Data—photos, plat maps, virtual tours, video, or other multimedia data for a listing; and 6) GIS Coordinates—mapping information for a listing.

In an embodiment of the present invention, the same listing input process is used for all of the above data types. A locale is selected. Control attributes are returned, and a preliminary input form is displayed. Control attribute values are selected. All remaining attributes are returned, and another input form is displayed. Form values are selected. Additional information may be requested, such as schools for a particular area, a validated street address, or a matching public record. The form is completed and a request made to stage or save the data. Any quality control issues are returned. Unacceptable data are fixed and/or reasons are entered for questionable items. Listing is staged, and listing is saved if requested.

The Listing Input steps above will not be further detailed. In an embodiment of the present invention, the listing input system portions of the present invention rely heavily on information stored in the meta data model. This is where all possible listing attributes are defined, regardless of their scope. Additionally, the meta data model offers the tools necessary to translate the system's complex back-end storage system into a simple list of attributes. And a simple list of attributes is much easier to handle from a data input perspective. Thus, the first step of the data input process of the present invention is to retrieve appropriate meta data information from the system.

Many listing systems require the customer to classify a property into one distinct property class, such as "Residential Single Family," "Residential Condo," or "Residential Farm." However, this approach forces the listing agent to classify a property in a way that may not exactly fit.

To overcome this and other problems of the prior art, the present invention employs a flexible system that allows growth and change, depending on the location of a given property and the features that the property includes. This kis based on two different concepts: locale and control attributes.

With regard to locale for input, as described above in the data model, the listing system of an embodiment of the present invention is extensible by locale. Every possible logical column is linked to the locale in which it applies. As a result, the logical columns that can be used to describe a given property are dependant on its location. It follows, then, that a property's locale must be input before the application can build an appropriate data entry form. The locale drill-down functional description below describes further the process a customer goes through to choose a locale.

Once the locale has been provided by the customer, the API library can return either a complete list of logical columns or a list of the control attributes appropriate for the given listing's entry. Control attributes are special descriptive details for a listing that, when taken together, can be used to create a listing's "virtual property type." These special attributes determine which of the locale-specific logical columns are appropriate for the listing.

To clarify the system's use of control attributes, the term input group will now be discussed. Every attribute included in the data model, be it a core or locale-specific element, is part of at least one input group. An input group is the system's method for linking related items together, without having to store them together physically. For example, there are many items related to condominium ownership, such as condo fee and its frequency, and amenities of the condo community. Amenities may be stored as virtual data, whereas the condo fee may be stored in a table with other fees. Regardless, it is useful to logically group these related items together when inputting a listing, as shown in FIG. 19.

FIG. 20 provides a list and descriptions of the valid input groups, based on the Core Data and Virtual Data models, for an embodiment of the present invention. Additional input groups are addable as needed.

Figure 21:
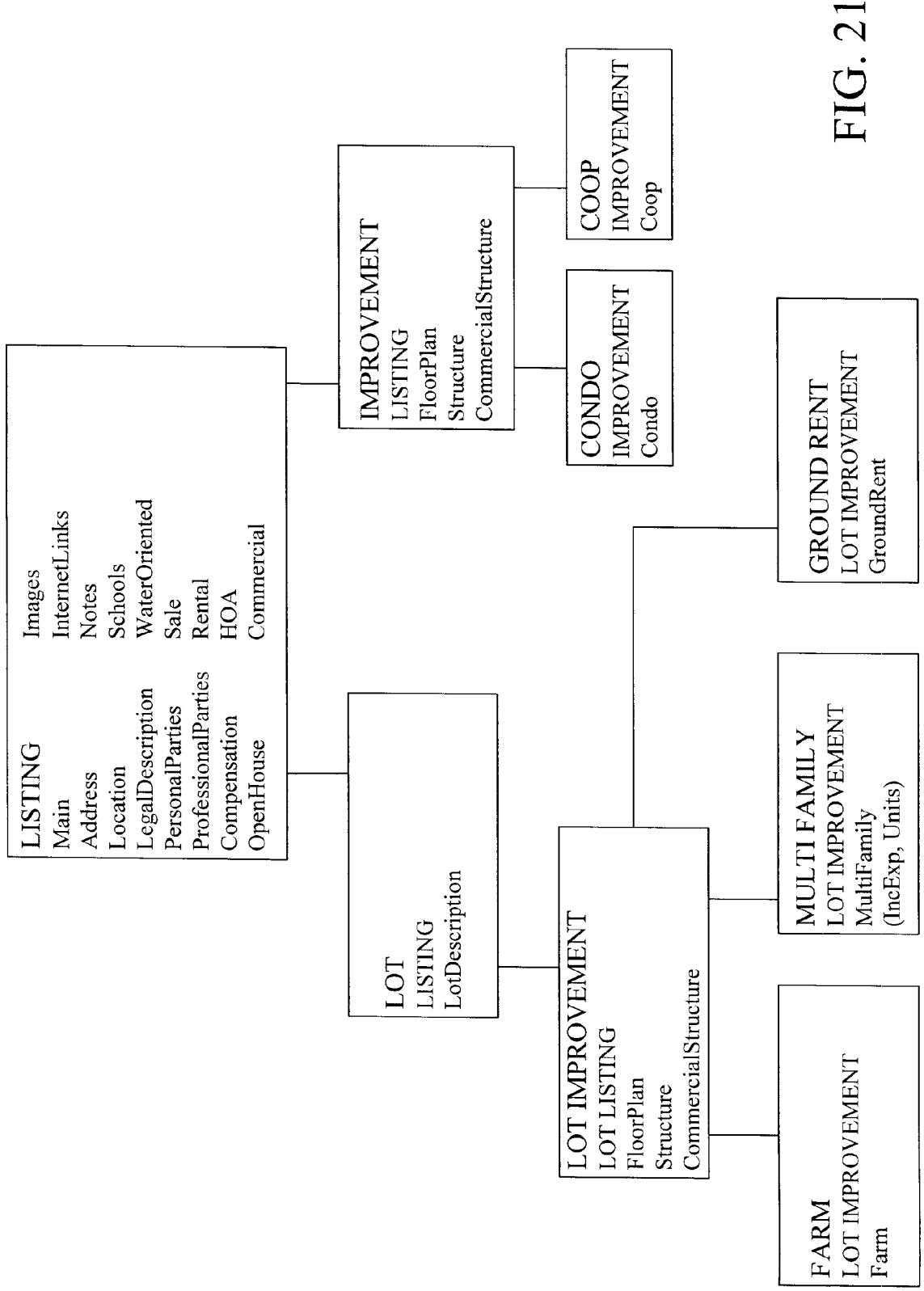
FIG. 21 presents a block diagram of example valid grouping of input groups together, in accordance with an embodiment of the present invention.

It is important to note that the combination of input groups used to form a particular listing must be valid. For example, a property cannot contain attributes from both the condo and farm input groups simultaneously. FIG. 21 provides a diagram that actually groups input groups together in the valid ways. This is extendable as needed.

For each input group, there is a control attribute in the main data set. The value chosen for this control attribute indicates whether the input group applies to the particular listing. If the input group applies, all attributes in that input group are available for selection, and all properties (including rules) associated with those attributes apply to the listing. The meta data model links each input group to a given control attribute, as well as stores the valid control value for that attribute. For example, "Ownership Type" is a control attribute for the "Condo" input group. The "Condo" input group is linked back to "Ownership Type," with a valid control value of 1 (the option value for condominium ownership). See, for example, the example Condo information in accordance with an embodiment of the present invention shown in FIG. 22.

Attribute properties of input group members may change based on these input groups, including rules and pick list options. For example, if a property includes the "Condo" input group, the pick list values for "Home Type" is overridden. This is achieved by storing the input group I.D., along with the appropriate picklist items, as shown, for example, in FIG. 23.

As the table in FIG. 23 shows, picklist items that apply to all properties are assigned to a generic input group I.D. of 1. Picklist items that should be used only with a specific input group are assigned to that input group, as with the Condo example. This allows the meta model to translate listing attribute choices appropriately for specific properties. Translation depends on the values of the listing's control attributes.

The listing system of the present invention provides a staging area for listings in progress. This area is more or less a scratch pad, where listings are stored while they are being input or updated. New listings can be stored and worked on in this temporary area for many days at a time, then saved when the customer is ready.

In the staging area, listings are stored as a simple list of attributes. Note, for example, the name/value pair that makes up a listing attribute. Regardless of what physical storage methods are utilized by the listing system of the present invention, a listing is really just a bunch of attributes. This is what is stored in the staging area. Every new listing is first staged, and then saved to the database. Every listing change is made in the staging area, and then saved to the live database. The present invention handles the transfer of listing information from staging area to live database.

Figure 25:
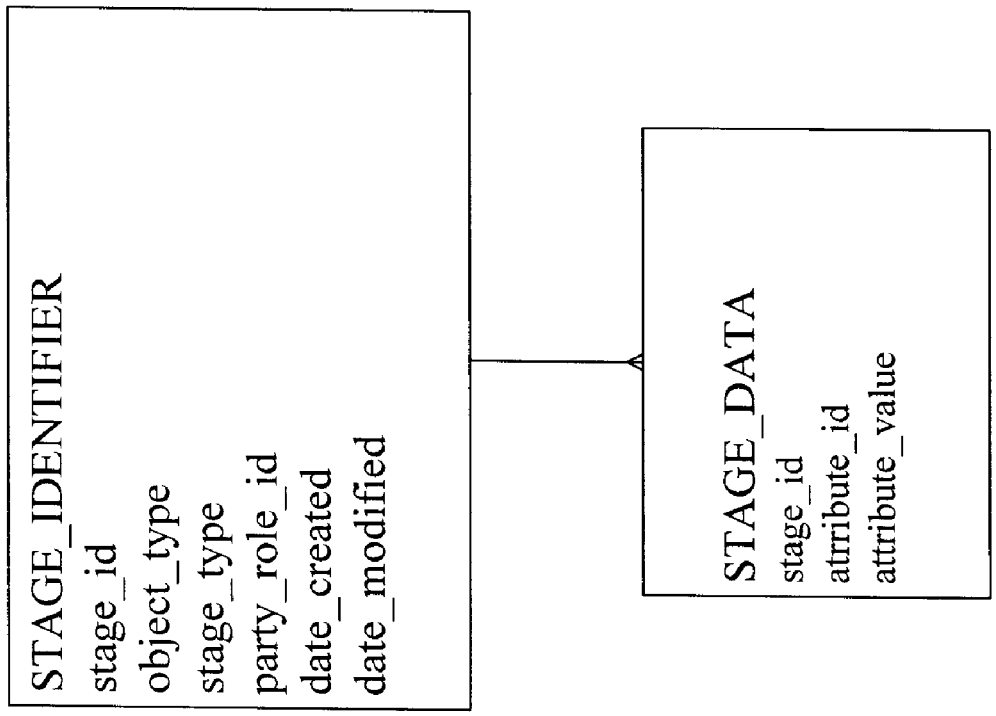
FIG. 25 presents a block diagram of a stage identifier, in accordance with an embodiment of the present invention.

For example, a staged listing in accordance with an embodiment of the present invention is shown in FIG. 24. First, with regard to the Stage Identifier, because hundreds of listings could be 'in progress' at the same time, it is necessary to identify which attributes belong to a particular staged listing. In embodiments of the present invention, it is possible for different kinds of information to be input into the system, open houses versus listings, for example. This leads to the development of a stage identifier that clearly defines what is being staged, as shown in FIG. 25.

The stage identifier first provides a unique numeric stage I.D. This is used to link all appropriate stage attributes together. In addition, the table produced by the staged identifier of FIG. 25 stores the type of object that is being staged (e.g., open house, listing, public record), the type of stage (e.g., new input or modification), the party that is making the modification (e.g., by role, so that the brokerage is known), and the date created and date modified. FIG. 26 presents a table of sample stage identifier information in accordance with an embodiment of the present invention.

In an embodiment of the present invention, the attribute I.D. is another important item of the staging area. There is a subtle difference between an attribute I.D. and a logical column I.D. Logical columns are defined for every piece of virtual data, as well as every column in every table of the core database. However, in accordance with some embodiments of the present invention, it would not be possible to uniquely identify every single listing attribute with just a logical column I.D. For example, the structure table can have many records for one listing as discussed above. However, there is only one logical column for Structure Type and one logical column for Area. If the logical column I.D. is stored in the staging area, a resultant table is produced, such as the one shown in FIG. 27.

Figure 28:
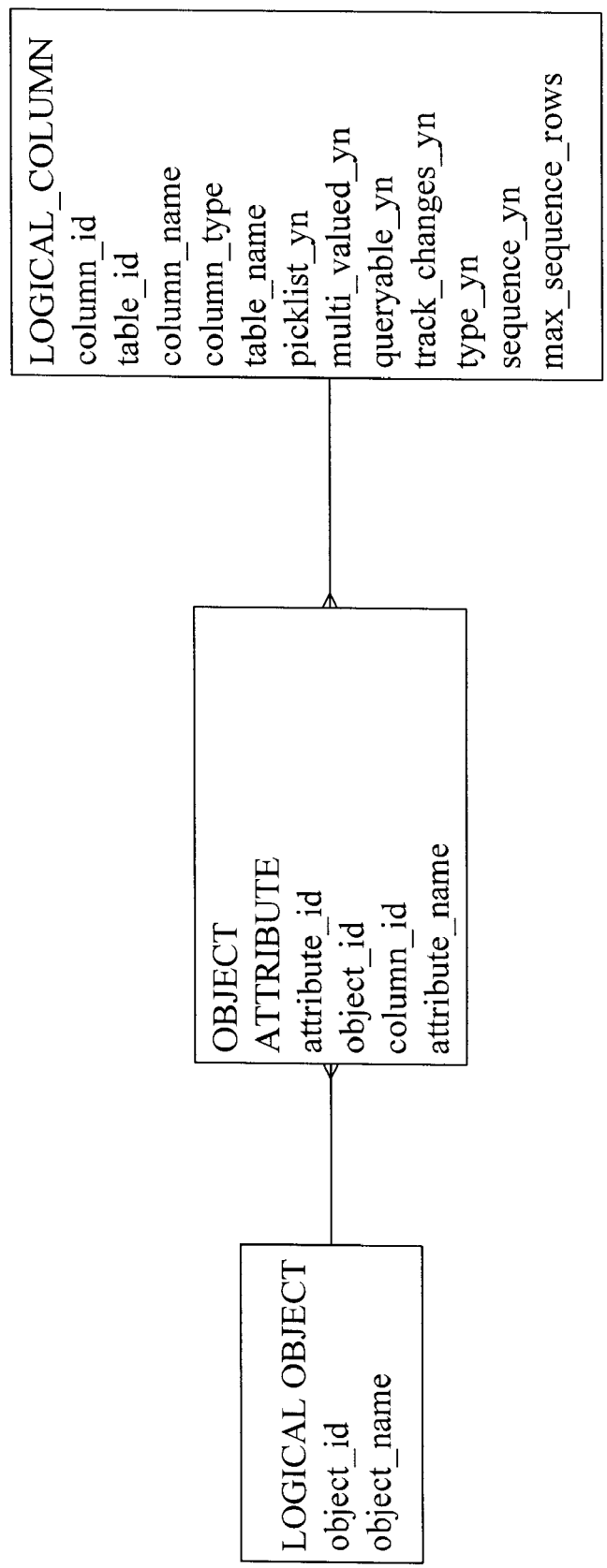
FIG. 28 contains an example block diagram of a logical column table, in accordance with an embodiment of the present invention.

In the example of FIG. 27, there is no way to determine whether the area value 24 belongs to the Master Bedroom or the Living Room. To solve this problem, object attributes are created. This is another layer in the meta data model; this layer provides a unique identifier for every possible case of every logical column. This is easiest to understand by revisiting the logical column table shown in FIG. 28.

The idea of logical objects will now be described further. The Listing System is capable of storing different kinds of objects, such as listings, open houses, public records, and other information. While logical columns are all linked to the appropriate physical table in which they are stored, object attributes are linked to the appropriate logical object. In an embodiment of the present invention, the last three columns in the logical column table (type, sequence, and max sequence rows) are used to come up with a unique identifier for every case of every logical column in the system. As an example, the structure table includes the logical columns (assuming only two columns for this example) shown in FIG. 29.

The StructureType column includes four picklist options: Master Bedroom, Living Room, Dining Room, and Family Room. This column becomes extremely important to determining Object Attributes. Because the Structure Type column is the type indicator for the Structure table (type_yn=Y), it also determines how many possible choices there are in the structure table. This is shown through the number of picklist choices for that particular column, which, for the example shown in the table of FIG. 29, is four. Using this information, a list of the structure attributes can be automatically generated, as shown in FIG. 30. Then, substituting the attribute I.D. into the staging area, it can be determined exactly which listing attribute is referenced each and every time, as shown in FIG. 31.

In order to create the logical attribute for a type indication (e.g., Structure Type), in an embodiment of the present invention, the name is equal to the picklist item name+the table name+"YN." For non-type indicators (e.g., Area), the name is the parent column picklist item name+logical column name.

Note that logical attributes are automatically created based on the above, but, in an embodiment of the present invention, an administrative portion of the system, referred to as MRIS admin, has control to delete logical attributes that should not be allowed. For example, the map_location table stores several types of maps (e.g., Thomas Bros Book, Map Quest Internet Link, County Lat/Long). For each of these map types, different logical attributes are appropriate.

The attribute value stores, for example, the value of the particular listing attribute. It is important to note that this column may be broken down into three separate columns, one for each data type, in some embodiments of the present invention.

When a new listing is created, it must be stored in the staging area prior to being saved in the database. When an existing listing is modified, a "lock" is acquired for that listing. Acquiring that lock includes setting a flag in the listing table (lockedForUpdateYN) to indicate that the listing is being updated, as well as recording the date of the lock and the identifier of the party locking the listing.

Each listing can exist in the staging area once and only once. If a customer attempts to modify a listing which is currently flagged for update, the customer is notified of its status. If the listing was locked by that customer, the customer is able to select one of the following options: 1) go directly to that staged listing; or 2) re-stage the listing (to clear out changes made but never committed). If the listing was locked by staff, the customer is not able to edit the listing. If the listing was locked by another member of the office, depending on privileges, the user may go directly to the staged listing, or re-stage the listing, as above. Staging of listings may be prohibited, for example, by anyone other than 1) the listing agent; 2) someone from the listing branch office; or 3) host operator staff.

The system purges incomplete listing/listing changes if they have been in the staging area for more than an acceptable amount of time (which is configurable). Additionally, customers have the option of purging staged listings themselves (in case the change is abandoned).

Host operator staff are not required to make changes in the staging area, but they are required to lock the listing prior to making the change. If a host operator attempts to modify a listing that is already flagged for update, some choices are presented. In response, the host operator can take one or more of the following actions: 1) request that the change wait for the staged listing to be checked in or purged before committing the change; 2) purge the staged listing, requiring the customer to re-stage and re-input listing changes; or 3) make the change and set the change as a staff update that cannot be overridden.

Listings in the staging area can be refreshed or appended. This is extremely helpful for browser-based front ends that have no storage facility of their own. Those applications simply go page by page and append to the staged listing prior to save.

During the data input process, it may be necessary for the customer to look up specific pieces of information, such as a public record or a school. In an embodiment of the present invention, the possible lookups are defined in the meta data and include the type of information expected to retrieve the particular data set, as well as the set of data that will be returned. In most cases, the data set returned by a given lookup is a subset of the listings attributes. In embodiments of the present invention, the customer is provided a final choice in whether to use the returned data or which one (if more than one result). At that point, the application fills in the appropriate listing attributes, and can optionally append this information to the staged listing.

When a property address is entered into the system, it is validated against a CASS-certified data set. Possible valid addresses and geographical data points are returned to the agent for selection. The agent may choose to use the certified address or modify it. Upon modification, a listing-specific address record is created, with a link back to the validated address record. If no address is found, the agent may create a listing-specific address record.

This process is transparent to the front-end customer. The system only needs to deal with the listing attributes, thanks to the meta model translation. In an embodiment of the present invention, this is just like the lookup process described above.

Once the looked-up addresses have been returned to the customer, the customer chooses the appropriate record, and the application fills in the listing attributes with those values. At this point, the process changes slightly. In addition to choosing one of the data sets returned, the user has the option to choose and modify an address, or enter a new address from scratch.

When the staged listing is saved to the database, the system runs a backwards-translation routine to populate the physical database. This routine cross-references each of the attributes that belong to the address table. If a match is not found, the system creates a new address record. If a match is found, but any of the values are different, the routine creates a new address record. In an embodiment of the present invention, the case where an address is modified, the link to the original address is kept in the listing (to help processes like days on market calculations and market updates).

After address validation has taken place, the listing system attempts to link information with the appropriate public record. In an embodiment of the present invention, possible public records are presented to the agent for selection. In the event that no public record is found, the agent may search and link a public record to the property manually. If the appropriate public record does not exist, the agent is prompted to enter a listing-specific legal description. This legal description emulates a basic public record, including tax assessment and valuation data, zoning information, etc. The listing-specific legal description only remains alive to serve the listing's needs and is not viewable in public record searches. The process for creating the listing-specific legal description is the same as the one used above for addresses.

In an embodiment of the present invention, customers have access to a special staging area for images. The API library includes a separate function to help with the upload process.

The present invention handles the transfer of listing information from the staging area to the physical database. The process varies slightly, depending on whether the staged listing is new or updated. For new listings, the steps are as follows: 1) select all attributes for the given listing in the staging area; 2) verify all attributes in the staging area are valid for the given locale; 3) verify all attributes in the staging area are valid for the given control attributes; 4) run the automated validation and quality control procedures, as detailed further below; 5) map each staged attribute to its physical location in the database; 6) group the attributes by each physical record in each table that will be created, using a preferred table/record order (e.g., listing, structure, virtual text); 7) for each physical record, create universal identifier and insert attributes into the appropriate table; 8) commit the changes in the database; and 9) return a status code to the application.

For updated listings, the steps are as follows: 1) select all attributes for the given listing in the staging area; 2) verify all attributes in the staging area are valid for the given locale; 3) verify all attributes in the staging area are valid for the given control attributes; 4) map each staged attribute it to its physical location in the database; 5) group the attributes by each physical record in each table that will be created, using a preferred table/record order (listing, structure, virtual text, etc); 6) for each physical record, compare to the physical record stored in the database to determine what attribute values are different than in the previously saved listing, and what (if any) new physical records need to be created; 7) for each changed attribute, run validation and quality control procedures as detailed below; 8) for each physical record that contains an updated attribute, update the appropriate database record; 9) for each new physical record, create a universal identifier, and insert attributes into the appropriate table; 10) commit the changes in the database; and 11) return a status code to the application.

Whenever an attribute is created or changed in the database, a record in the universal log table is created to store historical information about that attribute (including who made the change). This is accomplished through a back-end system process, with no interaction from any customer or staff member. In an embodiment of the present invention, no customer or staff member is permitted to update or delete any universal log. The universal log is a comprehensive history, used in market updates, as well as the calculation of listing statistics.

Figure 32:
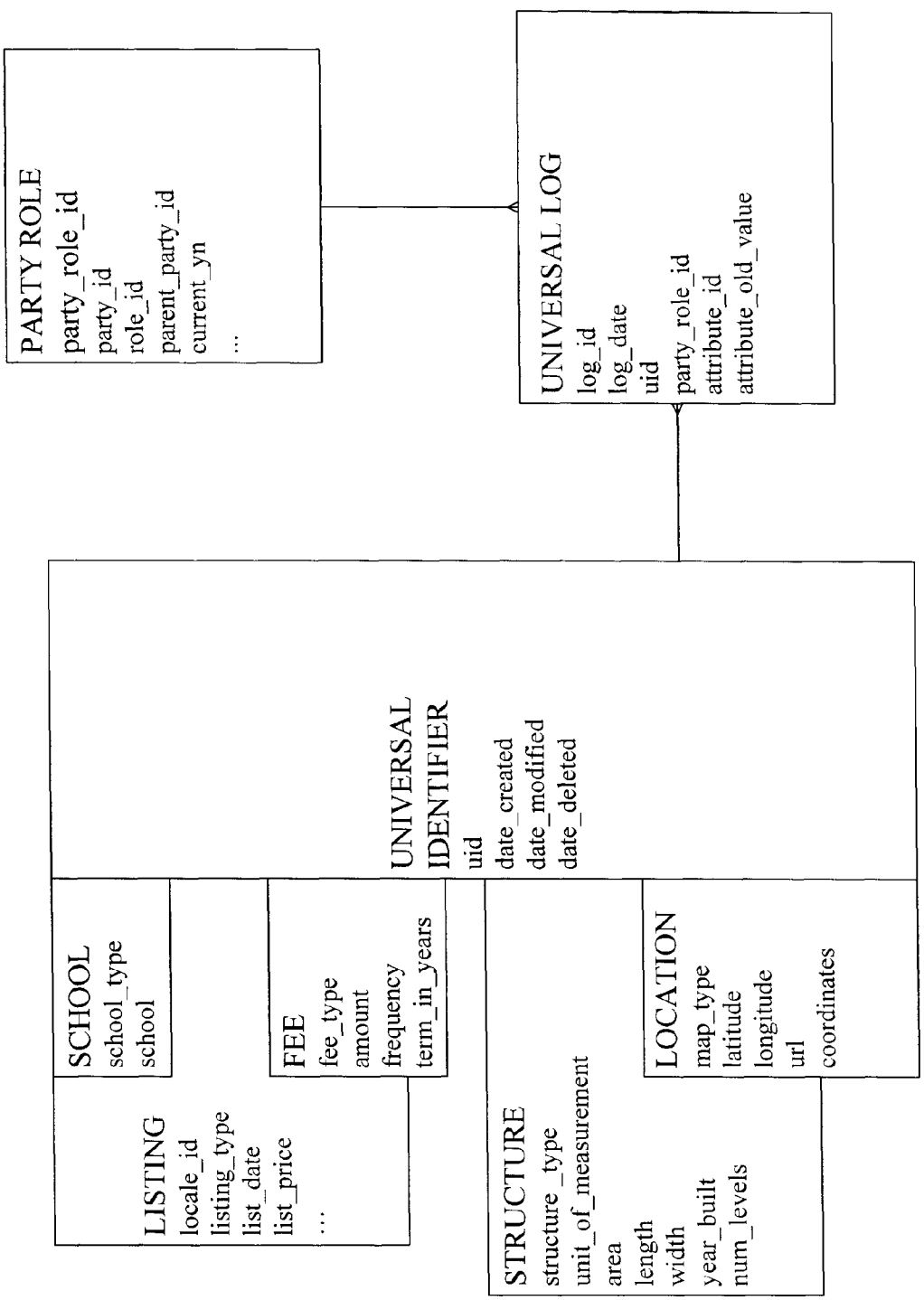
FIG. 32 contains an example block diagram relating to how a universal log stores changed attribute name-value pair information, in accordance with an embodiment of the present invention.

As the diagram in FIG. 32 indicates, the universal log stores every changed attribute name-value pair. For example, if a listing agent changes a listing from "2 Bedrooms, 2 Half Baths" to "3 Bedrooms, 1 Half Bath," the log stores the information shown in FIG. 33.

Before a staged listing can be saved in the listing system of the present invention, in one embodiment, it is run through a quality control module for validation. This quality control module is detailed further below.

In general, in an embodiment of the present invention, the system's validation routine verifies that all attribute rules have been obeyed as defined in the meta data. For example, rules are defined in the meta data as generating either red or yellow flags. If an attribute's rule generates a red flag, the attribute value must be modified and re-validated. If an attribute's rule generates a yellow flag, the agent must enter an acceptable reason for this data, and if the agent does so, the data is considered acceptable.

In one embodiment of the present invention, only non-database dependant validation rules are included in the meta data set that a front-end application receives. To ensure high quality of data, the system runs a validation routine on incoming data, prior to save.

In an embodiment of the present invention, an agent within a given branch office has the ability to enter listings under an I.D. on behalf of that branch office. In the data model, this is enforced by linking the listing directly to the agent's party role I.D., rather than to the party I.D., as shown in FIG. 34.

Figure 34:
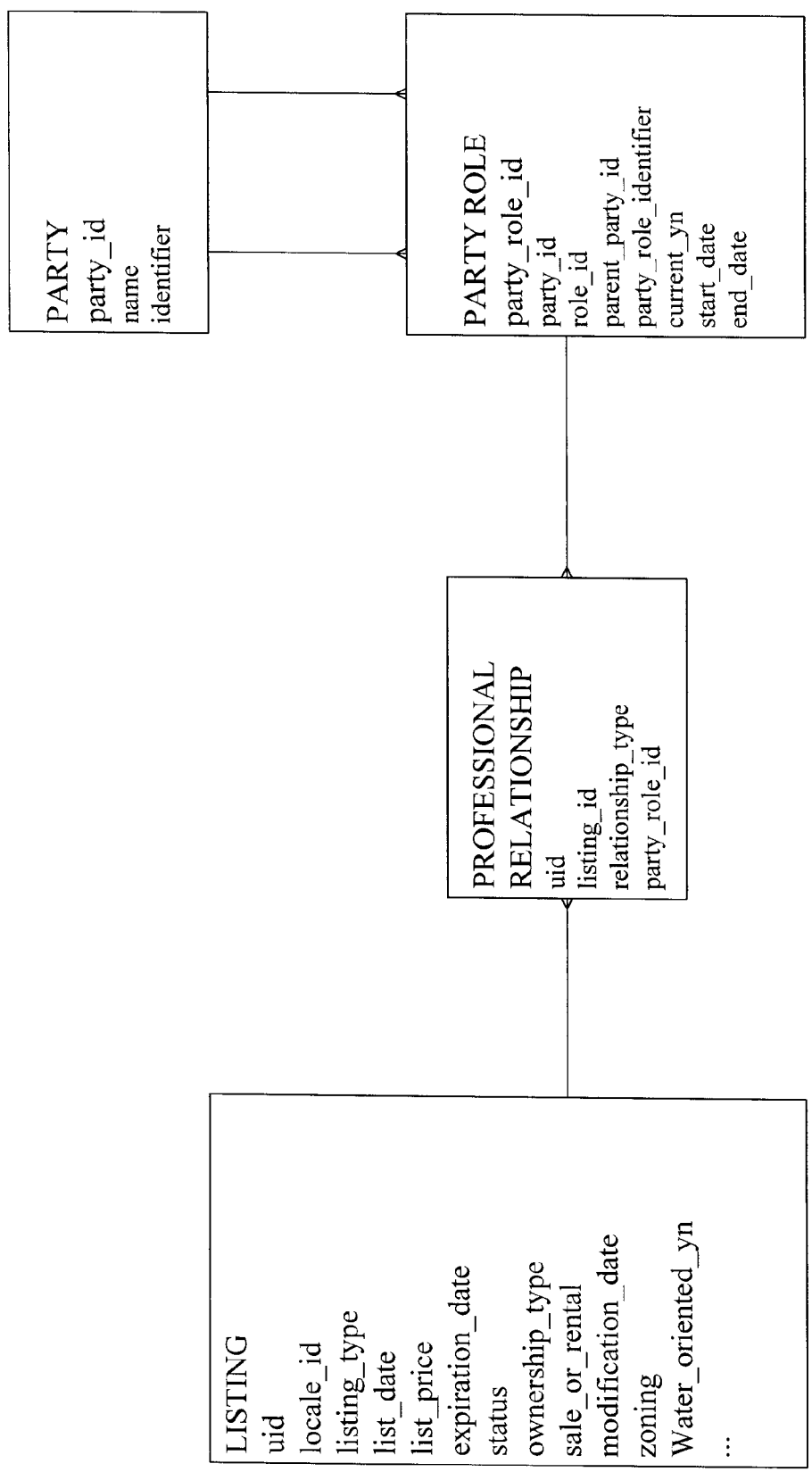
FIG. 34 shows a block diagram relating to linking of a listing to agent party role I.D., in accordance with an embodiment of the present invention.

In FIG. 34, the professional relationship table serves to link a listing directly to a valid party role. Take the example of Mary Smith, who has the party roles indicated in the table shown in FIG. 35. Mary's agent role allows her to input a listing for herself, on behalf of Johnson Realty. Assume that she has done so, and the listing's universal identifier is #2539983. In order to link the listing to the appropriate party role, a record would be created in the professional relationship table with Mary's party role I.D. of 439885.

The present invention creates a column in the listings table for the Primary Listing Agent, and stores that agent's party role I.D. there. This approach takes advantage of the fact that there could be many different parties involved in a given listing. For example, many listings have a primary listing agent and a secondary listing agent. Once that listing has been sold, a number of selling agents come into the picture. The system's general rules indicate that when there are many similar data sets for one listing, it is wise to store them in a separate table. Thus, data is stored in the professional relationship table. FIG. 36 presents example post sale data modification for the information of FIG. 35.

Using the party role I.D. to record the agents associated with a given listing also helps with a common occurrence in the real estate industry, the listing transfer. The listing transfer is often what happens when an agent moves from one office to another, although there are different ways of handling it around the country. In some areas, agents are allowed to move, or transfer, their available listings to the new office without explicit permission from the old broker. In other areas, available listings can only be transferred with the listing broker's permission. Most areas mandate that off market and transacted listings remain with the office where they were initially listed. The present invention allows customized behavior for listing transfers at the locale level.

Continuing the above example, Mary Smith has decided to move from Johnson Realty to Parker, Inc, and as a result, her party roles have changed, as shown in FIG. 37. Off market (included transacted) listings and sales in which Mary has been involved must remain with Johnson Realty. The present invention addresses this change. Mary's old party role of 'agent for Johnson Realty' still exists. If it has simply been flagged as not current, this means that Mary can no longer create listings for Johnson Realty. However, the present invention can still reference the party role and display the correct listing office and agent information for those transactions.

Mary's available listings are handled in one of two ways, depending on Johnson Realty's party roles. As parties can be agents, offices, or even local boards, offices can have their own party roles. In this example, Johnson Realty has two party roles, as shown in FIG. 38. Every real estate office must be a primary member of one specific local board. The procedure for handling active listing transfers is made by the office's primary local board.

In this example, GCAR may have chosen that active listings should be transferred automatically after an agent has moved from one office to another. In this case, a back-end system process handles the listing transfer. When Mary's office change is complete, the system changes the party role I.D. from 439885 to 449838 for all of her active listings. In this example, there is no interaction required from Mary, her old manager or her new broker.

On the other hand, GCAR may have decided that listings should not be transferred without the explicit permission of a branch office administrator. In this event, a back-end system process automatically notifies Johnson Realty's branch office administrator when Mary's records have been changed. This notification is sent via email. It includes a list of all active properties for which Mary is the primary listing agent, a url labeled 'transfer' for each property, and a universal resource locator (url) labeled 'transfer all' at the end. It is then the responsibility of Johnson's branch office administrator to transfer Mary's listings, one by one or all at once, simply by clicking the appropriate url(s). Each url triggers a function to authenticate the office administrator and update the party role I.D., from 439885 to 449838, for the appropriate listings. This function is also available to the office administrator through, for example, the system's Internet or Intranet site (in case the email is lost).

Listing data are stored optimally to ensure near immediate results from queries. Benchmarks are determined and regularly updated. Data storage top rate performance is provided in at least the following areas in an embodiment of the present invention: 1) Quick Search—search using Listing I.D. or Street Name; 2) Agent/Broker—search using Agent I.D. or Broker I.D.; 3) Global Search—broad search using core attributes; 4) Detailed Search—complex search using customized attributes; 5) CMA—similar to detailed search, but concentrated on off market properties; 6) Open House Search—search for Open Houses; and 7) Ask Mr. IS—keyword search similar to "Ask Jeeves[SM]" of Emeryville, Calif. (www.askjeeves.com).

Customized and flexible query statements are also supported. At the core level, the present invention ensures that all RETS elements are searchable. Additionally, each locale has the opportunity to pick its searchable logical columns.

Embodiments of the present invention support the Data Mining Query Language (DMQL) as specified in the RETS standard. This language allows flexible search methods, including sub-queries and boolean searching. In some embodiments, certain attributes are required criteria for detailed searches (e.g., Locale I.D.).

In general, in embodiments of the present invention, several steps are necessary to complete a search request. A locale is supplied, and a preliminary form is displayed with the valid search types. The search type is input, and the requested query form is displayed. Search criteria are input or retrieved from saved information. A search or count is requested. Search syntax is validated. The matching results, count, or an error code are returned. Records are optionally selected, and, if requested, full details are returned. Universal identifiers for requested images are returned to the application. The application can then choose to retrieve and display the returned images, or pass along that choice to the customer.

Just as in the listing input section, searches with the present invention rely on meta data to translate the system's complex storage schema into a simple list of search attributes. This information is what makes it possible for an application to build a search form. The first step for any listing search is to retrieve appropriate meta data from the system.

Unlike the listing input section, searches are not dependent on a specific kind of property. All kinds of properties are accessible within one search interface. However, there is one very important piece of information necessary to building the appropriate search form: locale.

The importance of locale to embodiments of the present invention has already been reviewed. When creating or modifying a listing, it is necessary to know the most specific locale available for the given property's location. Without this level of specificity, it would be difficult for the application to display the appropriate attributes for the listing. The use of locale is a bit different within the listing search. When searching, it is not necessary to drill down to the most specific locale of a given listing. A search form can be displayed using one or more locales that exist anywhere in the locale hierarchy.

For example, a nationwide Internet site sets up a simple home search. For this application, only the core listing attributes are searched and retrieved. Thus, it is only necessary to input the locale of the core, which is the root node in the locale hierarchy. Once this is accomplished, a list of searchable columns can be retrieved from the meta data and displayed to the user. Since locale is actually one of the core attributes of some embodiments of the present invention, a user may add a specific state or county to the criteria once the form is displayed.

In a more complicated example, an agent is working with a buyer who is considering property in either Montgomery County or Frederick County. In this case, both counties would be selected for locale, and the meta data would be retrieved for every attribute in each of the locale's paths, up to the root node. This could add up to a lot of meta data, so an embodiment of the present invention groups the information logically. In an embodiment of the present invention, this grouping is reformed on two levels, by locale and by query group. The locale grouping allows the front end to display all search attributes from, for example, Maryland up to the root node together, and the attributes for, for example, Montgomery and Frederick counties in their own separate areas. Query groups are discussed further below.

In the listing input description above, the term input group was introduced. Because of the amount of data included in any listing by the system, logically grouping that information together makes any application developer's job simpler. This feature of an embodiment of the present invention is used in the form of query groups. Every searchable listing attribute is part of at least one query group, and often more. An application can use query groups to determine where to display the search attributes on a form.

Using the same example from above, information is grouped together that pertains to condominium ownership, as shown in FIG. 39. As indicated, the information stored for query groups is almost identical as that for input groups. However, there is a notable difference. There is no need for control attributes to be selected prior to displaying any of the query groups. This feature was introduced with the description of the listing input portion of the system above, in order to enforce business rules involved in creating a valid listing. The present invention allows all kinds of property to be searched within the same interface, so it is not important to hide, for example, the Farm query group when displaying the Condo group, and vice versa.

In embodiments of the present invention, query groups can be created and saved by locale administrators when a locale is first defined in the system. Additionally, applications can override these query groups for their own needs.

In order to make working with the system a little easier, the present invention has established guidelines on the most common ways to access the system for searching. Although all listing data is searchable through one interface, it is important to distinguish between some of the more common ways customers access the system. In each of the different search types, behavior and performance are slightly different. However, all search types follow the same general steps as noted above.

Several types of searches, in accordance with embodiments of the present invention, will now be discussed further. A quick search uses one or two very specific attributes in order to target a limited number of properties. Common attributes used in a quick search are MLS# or Street Name. The present invention designates specific attributes for use in the quick search. When a search consists only of attributes designated for quick search, no additional criteria is required (e.g., Locale I.D.).

Agent/Broker searches are commonly used to compile all listings or sales for a particular agent, branch office, or brokerage. The results are sometimes used in listing or sales statistics. Although these searches can return a limited number of properties, some of the real estate firms in the system can be far reaching. Thus, in some embodiments of the present invention, at least one locale must be selected in an agent/broker search.

The global search is commonly used for searching across geographic boundaries. This type of search takes advantage of the system's standardization, displaying only the core attributes in the search form. Several of these attributes are optimized for truly global searching, and a search containing only these attributes does not need to include a locale. However, not all core attributes are optimized for this search technique. In an embodiment of the present invention, at least one locale is required in any search that strays from the specially designated globally searchable attributes.

Most of the searches performed against the system of the present invention fall into the category of detailed search. This is a complex search using attributes from anywhere in the locale hierarchy. This type of search may be performed, for example, by a real estate agent in order to retrieve active listings that meet the criteria of a specific buyer. In some embodiments, at least one locale must be submitted with the detailed search.

The CMA, or comparable market analysis, is very similar to the detailed search. The main difference in the CMA search is that the focus is on sold properties, instead of active ones. Additionally, customers may wish to view basic statistical information on the properties retrieved. For example, the present invention has the capability of automatically calculating the average sales price and days on market for these results. In some embodiments, at least one locale must be submitted with the CMA search.

The open house search is used to pull up open house information for listings. This search is typically used in combination with another search type, such as agent/broker search, or detailed search. A common use of this search type is for a branch manager to put together a tour of homes for office meetings. In some embodiments, at least one locale is required with an open house search. Typical results include open house details, as well as the full listing printouts if requested.

"Ask Mr. IS" is a very simple search interface, relying on keywords input from the user. For example, a user may input "3 bedrooms, 2 baths, active, $200,000 price, Philadelphia." In an embodiment of the present invention, a specialized parse routine is used to perform this search.

Based on a saved search, a customer can retrieve listings that have been modified since a particular date, during a given date range, or since the last date/time of market update for that search. Example modifications usable in the market update include: new to the market, expired, sold, other status change, and price change. In some embodiments, logical columns are flagged as tracked for market update purposes, allowing expansion of this list.

Upon receipt of search criteria, embodiments of the present invention perform syntax validation. This routine ensures that all attributes for the given query are valid for the locale(s) chosen and that required search attributes are present. Additionally, the query is checked to ensure that it complies with the DMQL language specified by RETS. Any errors in the syntax validation cause the system to return an error code.

It is at this point that some embodiments of the present invention may determine a query is too complicated for performance reasons, and may advise the client of this fact. If the client still chooses to perform the query, indication is provided that benchmark responses are not guaranteed.

Figure 40:
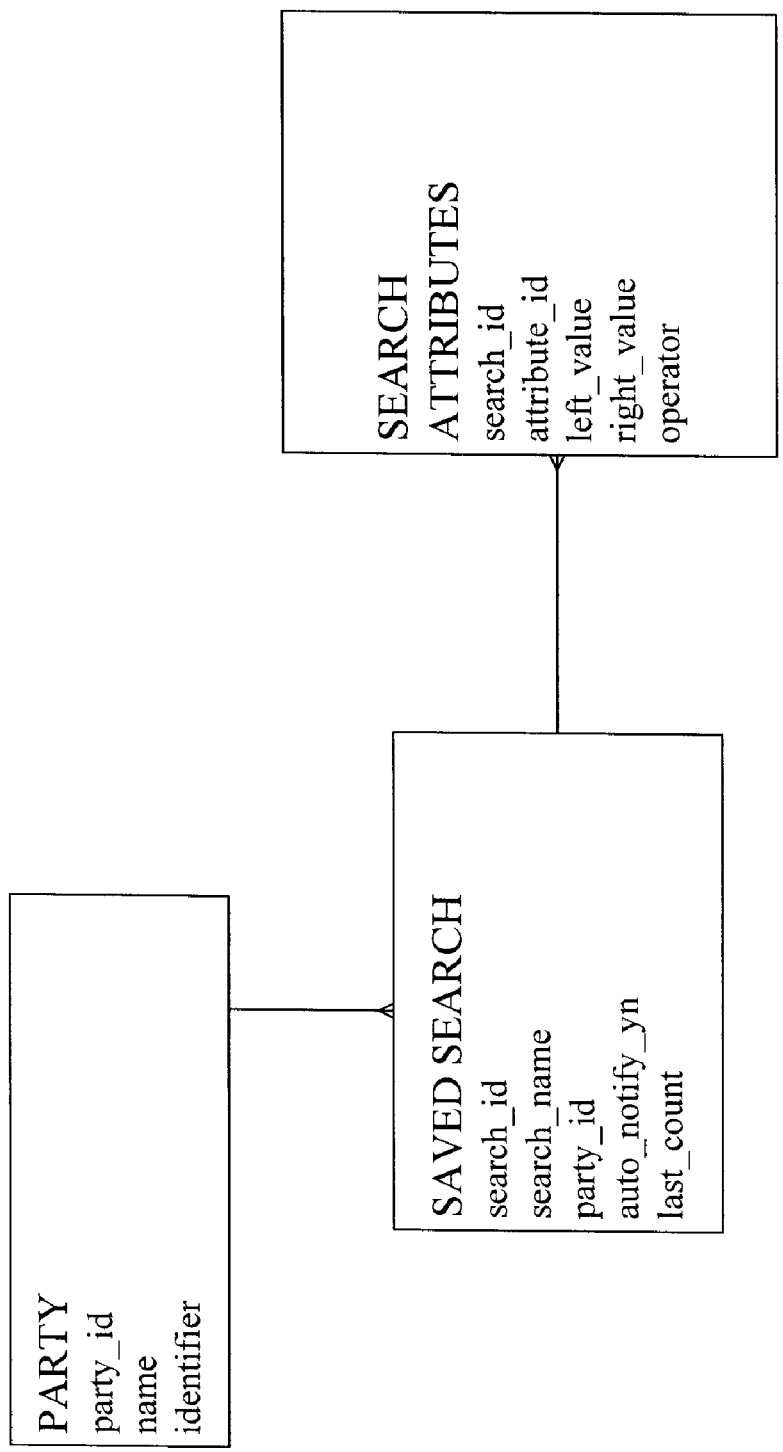
FIG. 40 is a table containing criteria saved according to party I.D., in accordance with an embodiment of the present invention.

Users have the ability to save, retrieve, modify and delete search criteria for any of the above search types in an embodiment of the present invention. Criteria are saved according to the customer's party I.D., as shown in FIG. 40.

As indicated above, in an embodiment of the present invention, every saved search is attached to its owning party. Mary Smith may have 15 saved searches and Bob Smith may have five. Mary, as each party in the system, is able to use saved searches belonging to her, her branch office or her branch office's main brokerage—which indicates that a saved search can be shared across a branch office or brokerage. Branch office or brokerage administrators can, for example, save, retrieve, modify, and delete shared saved searches for their office or brokerage, respectively.

Saved searches include one record to define the search, as well as one or more pieces of search criteria. Attributes used in a saved search are stored just as they are input or displayed, by attribute I.D. and value. Unlike listing input, however, a search criteria attribute may have more than one value associated with it. For example, a search may wish to return properties with "3 or more total bedrooms, listing price between $200,000 and $300,000, and locale I.D. equal to 1209." The search attributes for this example search include the information shown in FIG. 41.

In some embodiments of the present invention, saved searches can also be flagged for the system's auto notify service. The owner of this type of saved search is automatically notified when one of the following events occurs: 1) a new listing is entered into the system that fits all criteria of the saved search; 2) an existing listing is modified and, in its new state, fits all criteria of the saved search. Notification is sent via email, for example, to the customer's preferred email address. Additionally, if a customer retrieves a count for a particular saved search, the present invention stores this value, along with the saved search record.

During the search process, a count of listings that match the saved or newly input criteria can be performed. Counts can be requested from the system at any time during the search process. However, if the search includes any attributes that are not quick-search or globally indexed, the present invention requires at least one locale to be selected prior to returning a count.

In embodiments of the present invention, a listing count goes through the same process as retrieving listings, with one exception. Only one record, the actual numeric count of listing matched, is returned. Once the search criteria is ready to go, the customer can request matching listings. In an embodiment of the present invention, there are two concepts involved in retrieving the matching listings for any given search: 1) Listing Universal. Identifiers; and 2) Return Sets.

Figure 42:
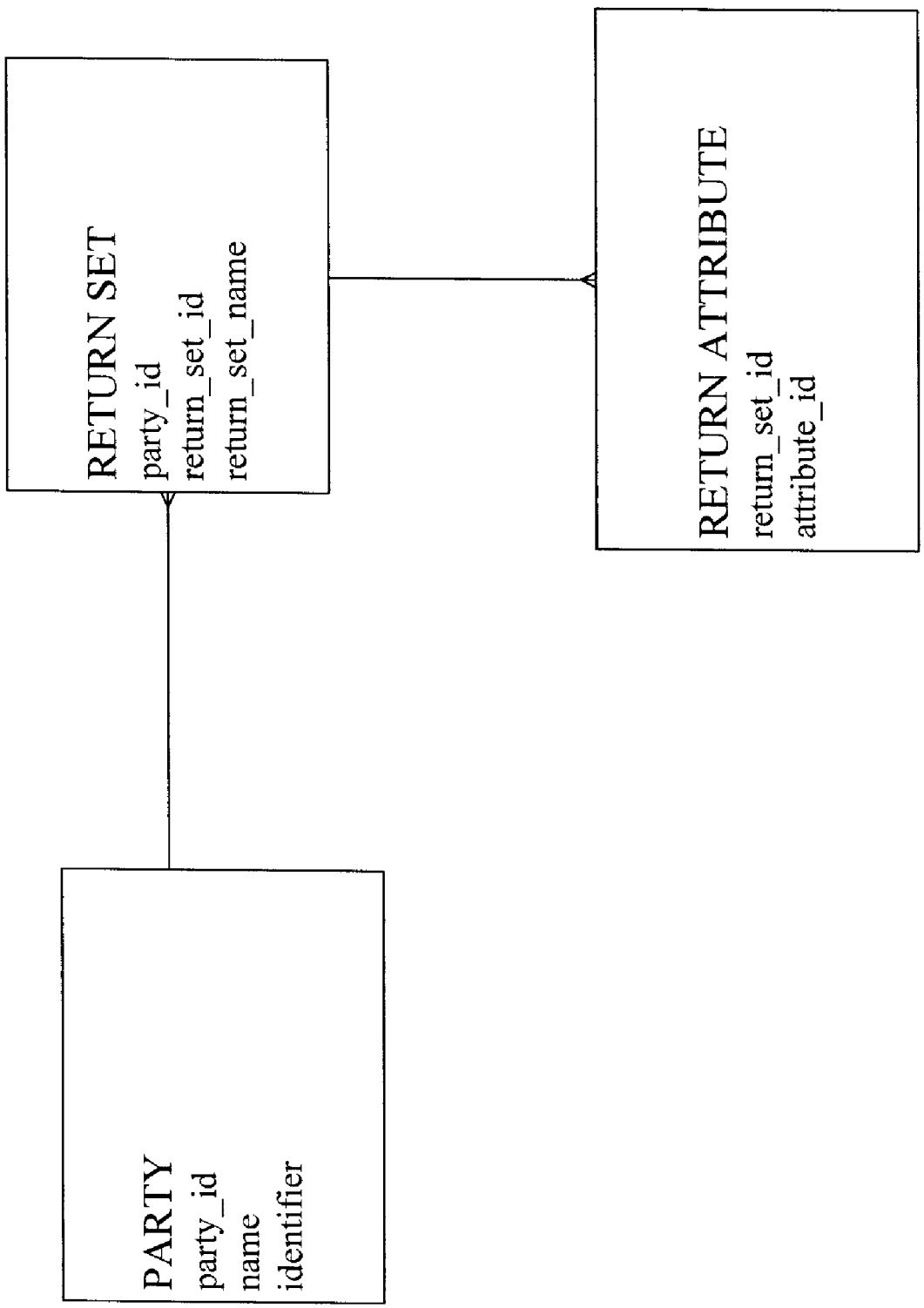
FIG. 42 shows a block diagram of attributes the system returns to applications submitting a list of universal identifiers, in accordance with an embodiment of the present invention.

The present invention is able to retrieve a list of universal identifiers for the matching listings. This is particularly helpful when the count is relatively large (e.g., 200 or more). Once the list of universal identifiers has been retrieved, the application can loop through in sets of, for example, 20 or 50 (or a configurable number) to retrieve details. During this step, applications submit a list of universal identifiers, along with a named return set. This set contains the attributes the system returns to the application, as shown in FIG. 42.

Return sets are used to display listing information. Embodiments of the present invention store at least one default return set for every locale, and likely more than one. In addition, customers and applications are able to save customized return sets for their own use. This is accomplished by attaching the return set directly to a party I.D., as in the saved searches portion of the system. Return sets can be shared just like saved searches, and thus typically include the same level of security. Either the universal identifier or a url for retrieval is returned for any image (e.g., photo, plat map) specified in a return set, as opposed to the image itself.

In an embodiment of the present invention, the full details for a property can be retrieved in the same manner, using a special "full details" return set. The listing's universal identifier is used, for example, to retrieve its full details. The full details for the particular property are returned again as a list of attribute names and values. However, this list is fully translated for the locale in which the property is located. This portion of the system is described further below. Again, the universal identifier or a url for retrieval is returned for requested images. The user has the option of automatically retrieving and displaying these images or doing so when ready.

In some embodiments, applications need not go through the two step process for retrieving listings. These embodiments of the present invention allow retrieval of all listings at once in a specified return set.

Additionally, as the DMQL language specifies, in embodiments using this language, the system is able to accept a list of attribute names as the valid return set. Attribute names can be sent, for example, using the RETS Standard Names or the MRIS Names.

The listing system portion of the present invention is capable of running back-end system processes, which, for example, may be configurable by locale. In this sense, locale typically refers to the local real estate board. For this reason, some embodiments link every locale to a specific local real estate board. If the system process interacts with listings in the present invention, the locale specified in the listing is used when searching the appropriate configurable information. On the other hand, if the process interacts with parties (e.g., real estate agents), the primary local board specified by the agent's office, for example, may be used. Either way, the configurable information is stored in the party model's profile options table.

Figure 43:
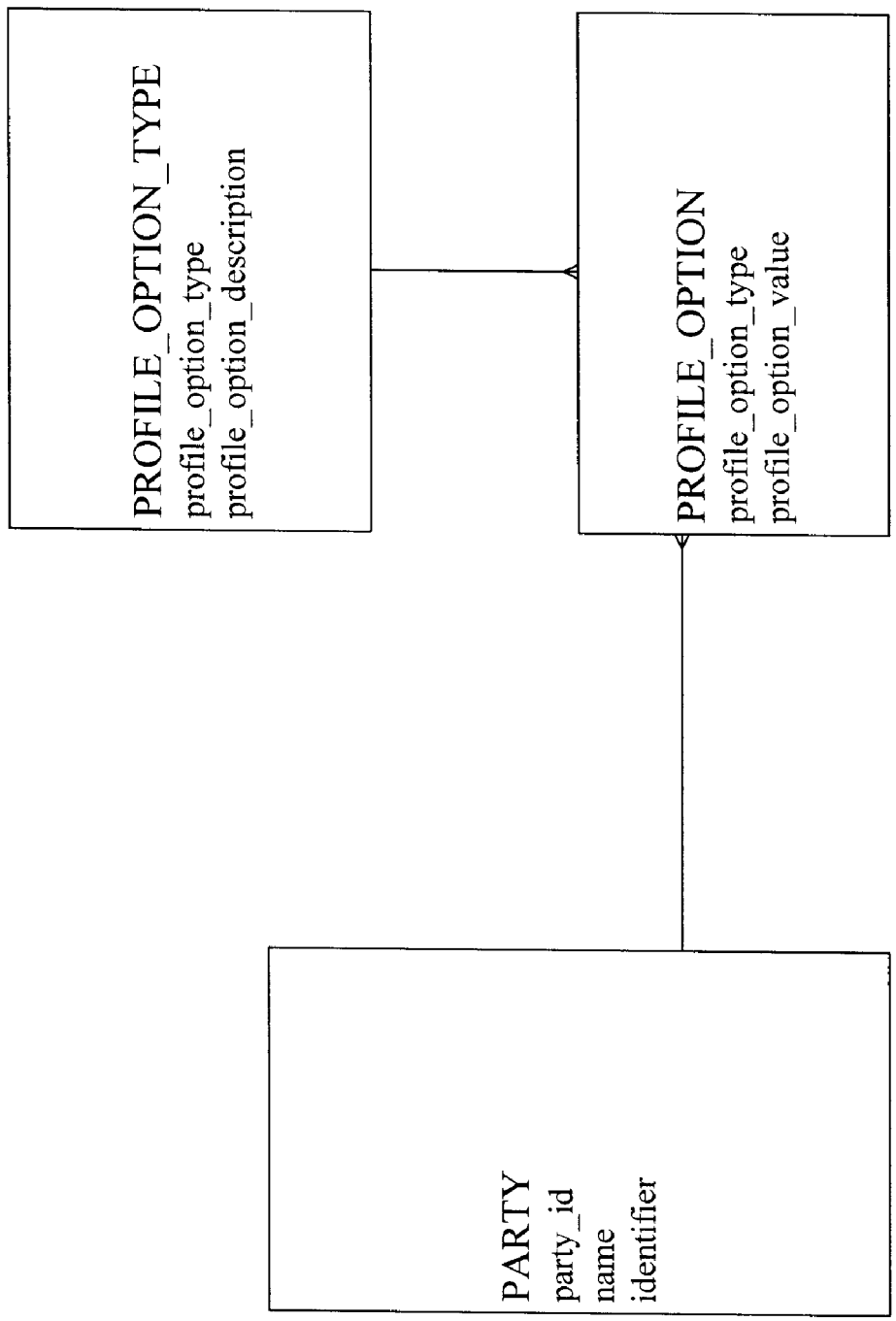
FIG. 43 is a block diagram of party profile options, in accordance with an embodiment of the present invention.

The diagram shown in FIG. 43 illustrates party profile options, which is how the configurable information is stored. As shown, profile options are directly linked to parties. Since all locales and real estate boards are also parties, in embodiments of the present invention, configurable options are linked directly to them. For example, a profile option may be necessary to store the ListingTransferPolicy for a real estate board. As discussed above with regard to listing transfers, it was determined that different boards would likely embrace different policies for this occurrence. ListingTransferPolicy could, for example, be recorded as a valid profile option type, and the profile option table might store a value of "Automatic" for the Hawaii Board of Realtors.

In an embodiment of the present invention, when a listing is first entered into the system, the agent must record a listing date and an expiration date. If owner and agent extend the listing contract, the expiration date must be modified in the system. In the event a property listing has remained available past its expiration date, the property's status is changed to Expired (or a locale configurable status) automatically.

Similarly, open houses are purged after a locale configurable amount of time (default of 30 days) from the event date. Staged listings that have remained unsaved for a certain time period are also purged. The default time period is seven days; however this is configurable by locale.

Listings are locked from agent modification a certain time period after being classified as Transacted or Off Market. This time period defaults to 90 days, but is also configurable by locale.

The listing system of an embodiment of the present invention provides the ability to automatically notify agents of specific events via email. Events on which to notify are configurable. Possibilities include system messages, listing expiration, and market updates.

In an embodiment of the present invention, the system automatically tracks the time on market for each listing, as well as each property. Roughly speaking, in accordance with one embodiment of the present invention, the days on market calculation is the total number of days a listing has been active in the system, within a specific time period. The ListingDaysOnMarket applies to one specific listing. The PropertyDaysOnMarket applies to a given property, which could have been listed multiple times by different agents. Additional rules are usable in conducting the days on market calculations.

Figure 44:
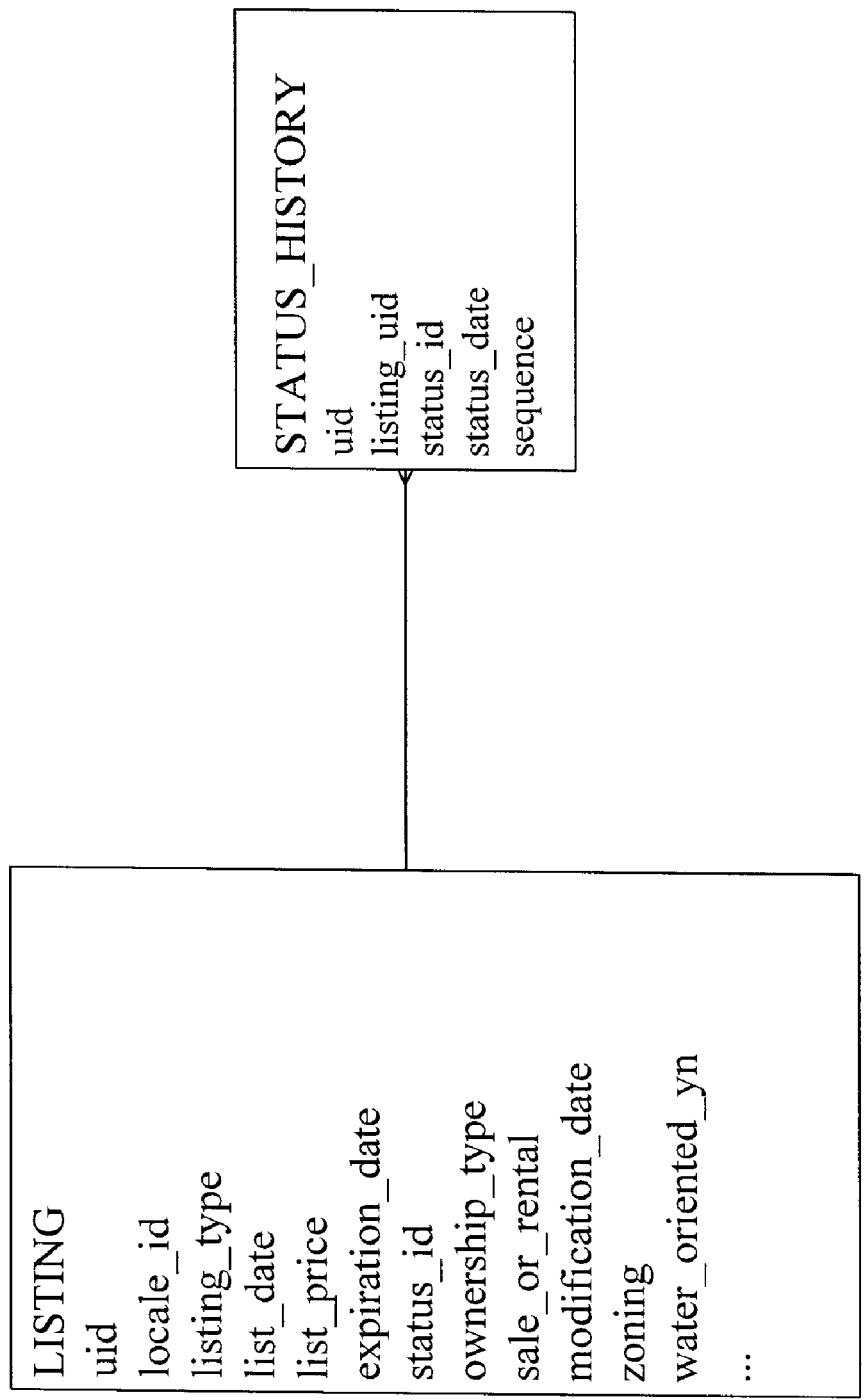
FIG. 44 contains a block diagram of locale status history table recordation, in accordance with an embodiment of the present invention.

In order to calculate days on market correctly, the present invention determines whether a listing is on the market or not—as well as when a listing was sold or rented. The listing status is what stores this information. Thus, every change to a listing's status is recorded in the status history table, as shown in FIG. 44. An embodiment of the present invention also includes a special translation table to store localized rules, as shown in FIG. 45.

Figure 45:
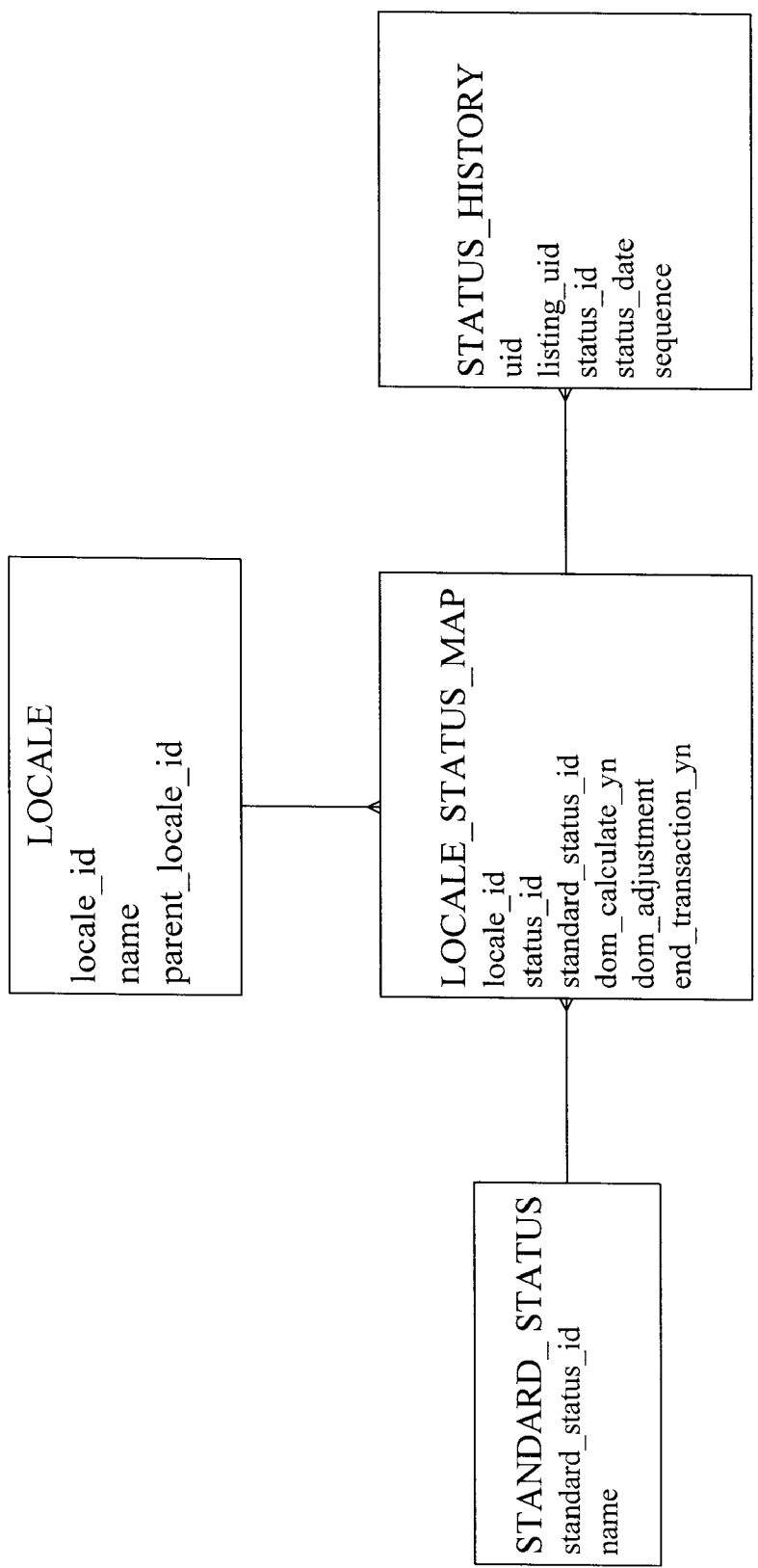
FIG. 45 presents a block diagram of a translation table for storing localized rules, in accordance with an embodiment of the present invention.

The locale status map is the foundation for storing localized differences, as shown in the diagram of FIG. 45. On the left, as viewed in FIG. 45, the standard status table stores the system's standard status picklist. This picklist complies with the status picklist in the RETS specification. FIG. 46 presents some possible standard status records.

In one embodiment of the present invention, every locale has the opportunity to map its particular status picklist to the standard statuses. Additionally, each locale has the opportunity to choose specific behavior for the statuses in their picklists. The locale status map stores this information, which allows differences across regions. For example, Hawaii might wish to consider contingent listings as off market, while Maryland may not. FIG. 47 shows some sample records for the locale status map.

In FIG. 47, the dom_calculate_yn field indicates whether days on market should be calculated for listings currently recorded with that status. The dom_adjustment column indicates a number of days that should be added or subtracted to every days on market calculation for the given locale. For example, if the Maryland Board of Realtors required that new listings display 1 as the days on market, the dom_adjustment would be set to 1 instead of 0. The end_transaction_yn field stores whether or not the given status is the status that terminates a listing's time on market.

If the locale status map has not been defined for a particular locale, in an embodiment of the present invention, the system follows up that locale's path towards the root node and uses the first map it finds.

Another important detail used to calculate days on market in accordance with embodiments of the present invention is the TransactionRolloverPeriod. This is the number of days a listing must be off market before any prior transactions are disregarded by the days on market calculation routine. For example, the system may determine that once a property is off market for more than 180 days, transactions prior to that time are no longer used in days on market calculations. This number is configurable by locale and stored in the locale party's profile options.

In order to calculate the ListingDaysOnMarket, the system of the present invention cycles through all status history records for the given listing, starting with its original listing date. Time is incremented for all status history records where the status maps to dom_calculated_yn for the listing's locale. For example, listing I.D. #238777 is located in Hawaii (locale 101), and it has the status history records shown in FIG. 48. The present invention cycles through the records of FIG. 48 to perform the ListingDaysOnMarket. In Hawaii, a listing is considered off market at the time it is recorded as contingent. Thus, the ListingDaysOnMarket above would use the first and second record to come up with a total of 7. Note that if this same listing were located in Maryland, the calculation would come up with 9, for two reasons. First, listings are not considered off market until they reach the contract status. Second, an adjustment of 1 day is made to the calculation.

The PropertyDaysOnMarket calculation of an embodiment of the present invention is very similar to the calculation for ListingDaysOnMarket. There is one notable difference, however. Instead of looping through the status history for a particular listing, the PropertyDaysOnMarket loops through the status history for all listings linked to the same public record as the given listing. This allows the system to track a property's days on market, regardless of how many times it was listed in the past. Using the example from FIG. 48, listing I.D. #238777 is linked to public record I.D. #3999274. Coincidentally, an expired listing I.D. #200039 is also linked to that public record I.D. In this example, listing #200039 includes the status history records shown in FIG. 49.

Hawaii's TransactionRolloverPeriod is 180 days, which is much more than the time this particular property was off market between listings. Thus, both listings are used in the PropertyDaysOnMarket calculation. In this case, the calculation turns out to be 277 days, which is the 7 days (from above) plus 270 days from the older listing.

In an embodiment of the present invention, days on market calculations are stored for listings and properties that are off market. This makes sense because the total is not changing every day for off market properties. Calculations are done on the fly for active listings and properties, since the total is changing.

The Localization Module of an embodiment of the present invention will now be described in more detail.

Figure 50:
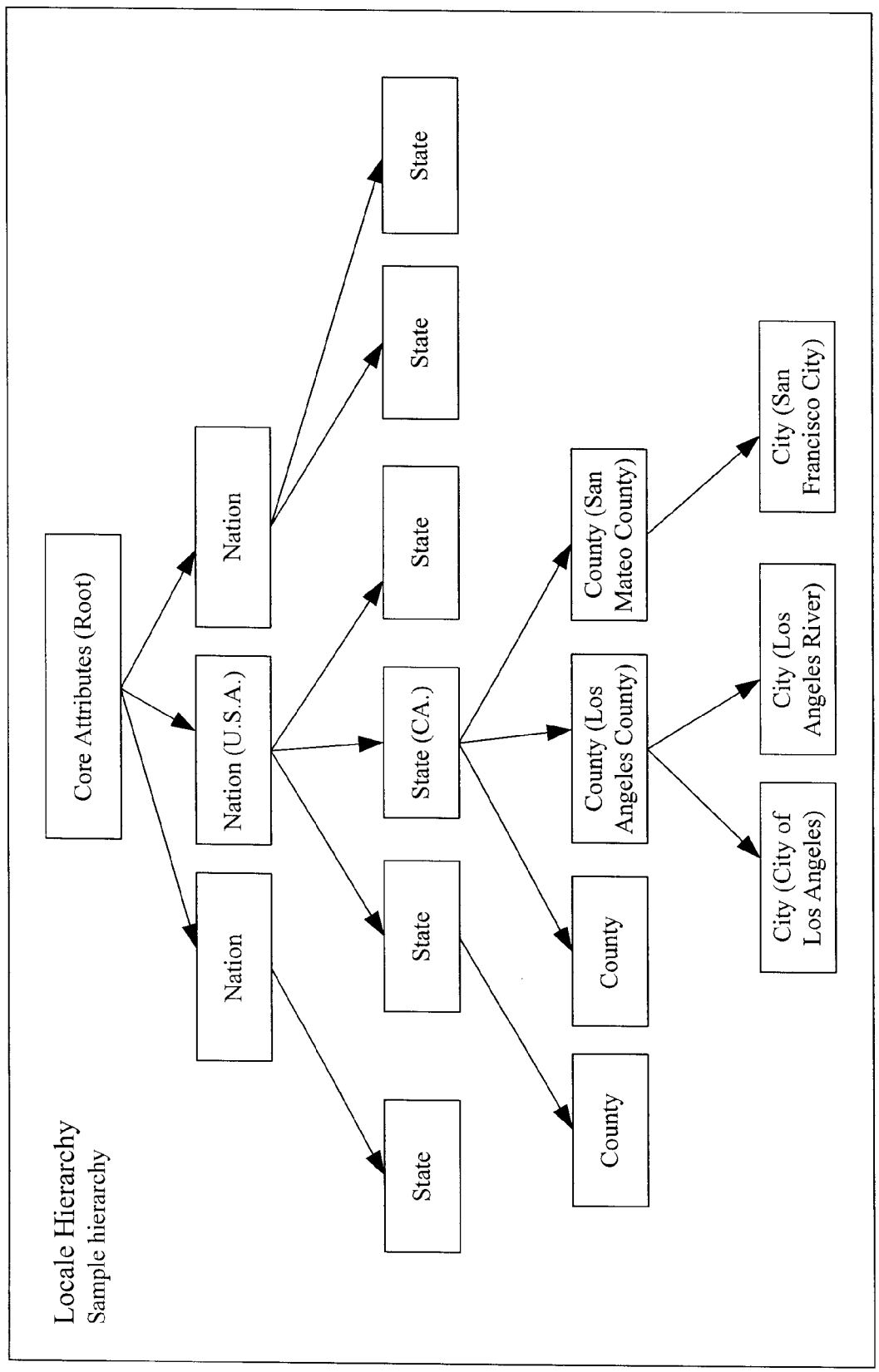
FIG. 50 shows a block diagram of sample hierarchy depicting locale nesting, in accordance with an embodiment of the present invention.

The Localization Module of an embodiment of the present invention provides the capability to customize the storage and display of property information, based on a particular locale. Locales may be nested within other locales, in a tree hierarchy. A Locale inherits the attributes of its parent locale. At the node level of the tree, a given locale contains all the attributes of each node on the traversal path to that node. (See, e.g., FIG. 50, below.) At each node, sets of pertinent business rules are stored. These business rules may contain the display names of core attributes, validation rules, and any additional attributes stored for that locale. If multiple locales on the same traversal path contain business rules pertinent to the same attribute, the more specific locale rules may indicate that they take precedence. In an embodiment of the present invention, each locale only stores the columns and business rules pertinent to that locale.

The system of an embodiment of the present invention integrates tightly with the core listings database, but allows customization of various parts of the overall system. The localization module is available to all modules in the system that are subject to localized customization requirements.

The Localization Module of an embodiment of the present invention interfaces with a quality control module. Based on business rule requirements, the localization module must be able to report to the quality control module any validation rule violations. The quality control module is responsible for processing the business rules, described below, through a validation engine.

The Localization Module integrates with a Data Input Module to handle input of data. The Localization Module depends on a Middle Tier module to support use of localized information.

In the Localization Module of one embodiment of the present invention, each Column in the database is subject to localized names. The Localization module provides the capability to create alternative headings for column display names. Every column in the database is uniquely identified, both Core and Custom Columns. This is accomplished, for example, by storing information about every column in the Logical_Columns Table.

In an embodiment of the present invention, each displayable item in the database has a locale adjustable display name attached to it. If an attribute in the database, for example a picklist value, has a different name in different locales, then the locale uses the localized term. To address this, every table in the localization module that contains display information includes a column that contains a database-wide unique identifier. The combination of the unique identifier and the locale determines the display value to use. In the Logical Entity/Relationship (E/R) Diagram for Localization Module, shown in FIG. 51, the following entities have this unique identifier: 1) Locale_Type; 2) Locale_Name; 3) Column_Group; 4) Logical_Column; and 5) Picklist.

This unique identifier links to a list of display names that have been entered by locales. Each Display I.D. has a short, medium, and long display name. In one embodiment, all three values must be provided to ensure proper display on reports. The same value may be present for all three display value lengths. For example, if a value cannot be abbreviated, then the long value is repeated in the medium and short values.

Each locale is able to extend the database with custom Columns. Custom Columns represent data specific to that locale. Every locale except the root locale—called the "Core"—has a parent locale. This forms a tree similar to the structure of locales. Each node in the locale inherits all the custom columns from the parent node. Each node in the locale tree provides only the custom columns specific to that locale.

As a user traverses the tree from root to leaf node—called the traversal path—the complete set of columns, both core and custom for that property listing are created. No column is duplicated long the Traversal path. Each Custom Column may have several rules assigned to it to validate the data it contains. Each column may be designated as queryable or non-queryable. Each column may be indicated as Change Tracked. A Change Tracked column is a column that, when changed, the changes are stored for use in market updates and listing history.

To satisfy business rules requirements, the same column may have validation rules associated with it in multiple locales along the same traversal path. For each logical column, a full set of business rules is generated (a full set of rule instances) that apply to the locales in the traversal path. Particular rule instances may be designated as overriding an earlier rule. In that case the overridden rule is not processed.

The following example illustrates these features, in accordance with an embodiment of the present invention.

In the core, a rule is applied to a column called "Sale Price." The rule states that Sale price should be within 30% of List price. This column is nearest the root, so the column is rendered in this locale.

In a leaf locale for a county, the rule is more stringent. In this locale the rule is: Sale price should be within 15% of the List Price. Therefore, the county locale rule takes precedence over the core rule. The county locale rule is flagged to override the core locale rule. The core locale rule is not processed.

The Localization Module also serves as the storage area for business rules as they apply to the localized columns. Each column in each node, including the core, is subject to business rules. Each column may have many business rules applied to it. Different Locales may have rules that apply to the same column. If two different locales along the same traversal path both have a rule that applies to a column, then both rules are processed—unless the more specific locale designates the rule as one that overrides another rule.

There are rules best suited to validation of the data once it has been input, such as the following: the "Sold Price" should be within 30% of the "List Price." There are also rules that apply only to front-end rendering, such as: when searching for listings, "List Price" may accept a range of values.

Many rules can be applied both to front-end and back-end systems, such as: if a property is marked as Water Oriented, then Body of Water must be provided. Further, any column may have zero or more business rules attached to it.

Other rules in accordance with embodiments of the present invention include the following Dependency Rules: 1) column is unconditionally required (mandatory in all cases); 2)

column is required when another column has a value; 3) column is required when another column has a certain value; 4) column is required when another column has a certain picklist selection; 5) column is required when another column is null; and 6) column must have a certain value when another column has a certain value.

Embodiments also include the following State Rules, which control the state of data: 1) column may be changed when another column has a certain value; and 2) column MUST be changed to another value after a number of hours from a column value.

The Number Rules, for embodiments of the present invention, include: 1) column value must be within a percentage of another value; 2) column value must be a positive value; 3) column value must be a negative value; and 4) column value must be an integer.

Currency Rules include: 1) column value must be less than another currency value; 2) column value must be greater than another currency value; 3) column value must be within a percentage of another currency value; 4) column value must be a positive currency value; 5) column value must be a negative currency value; and 6) column value must be between a set of values (column or literal).

Date Rules include: 1) column value must be chronologically after another date value; 2) column value must be chronologically before another date value; 3) column value must be in the future; 4) column value must be in the past; 5) column value must be within a certain period from today; 6) column value must be within a certain period from another date value; 7) column value must be between a set of values (column or literal); and 8) column value may trigger a future event (a listing lock, or address lock).

Text Rules include: 1) column value must be exactly a certain number of characters; 2) column value may not exceed a certain number of characters; 3) column value must be a range of characters long; and 4) column value may not contain certain sequences of characters. (e.g., vulgarities).

Picklist Rules (Single and Multiple Value Options) include: 1) column value must be in valid list of values; 2) user may not select more than a certain number of items; and 3) user must select a minimum number of values.

Search Rendering Rules include: 1) column may be searched as an SVO picklist; 2) column may be searched as an MVO picklist; 3) column may be searched as a sequential range of values; 4) column may be searched as a comma separated list of values; 5) column may be searchable as a limited number of sequential ranges of values; 6) column may be searched as a single freeform test field; 7) column may accept wildcards; 8) column must accept a minimum number of characters before a wildcard; and 9) column is not Searchable.

Rules may also be classified as Action Rules, and Validation Rules. An Action Rule is a rule that actually changes data in the database. Validation Rules confirm that the incoming data is within acceptable boundaries. Action Rules generally take precedence over Validation Rules, in that they are processed and committed first. This assures that an Action Rule does not invalidate data, after a Validate Rule has validated the data.

For example, consider the following sequence of validation tests for a column called "Condo Fee" with a Value of "$100":

Rules For Condo Fee: Condo Fee must be a positive currency value.

Rules Related to Condos that stem from Condo Fee: 1) Condo Fee Payment Frequency must have a value if Condo Fee has a value; 2) Condo Fee must have a value if Condo Fee Payment Frequency has a value; 3) Condo Fee is dependent on Condo Y/N having a value of "yes"; 4) Condo Fee Payment Frequency is dependent on Condo Y/N having a value of "yes"; 5) Condo Fee Y/N must be "yes" if Sale Type has a value of "Condo"; and 6) Sale Type is dependent on Sale or Rental having a value of Sale.

Each rule that is processed returns a flag to indicate if an exception has occurred. In an embodiment of the present invention, the flags are returned as follows:

1) A Green Flag indicates that the rule was successfully processed and the data meets the rule. Some rules, such as action rules, may only return this type of flag. Rules that will not alert the user may only need to return Green Flags.

2) A Yellow Flag indicates that the rule was successfully processed and the data is outside the expected bounds of the rule. The data is conditionally accepted, but may also be confirmed.

3) A Red Flag indicates the rule was successfully processed and the data is outside the defined bounds of the rule. The data is rejected, and the user is required to reconcile the data.

4) An Error Flag indicates the rule was unsuccessfully processed.

Logically, Columns in the database are one level "higher" than the standard atomic values inherent in the Database. Generally, the column types are atomic values, subject to particular guidelines. For example, a Currency Column may be described as a Number data type with 14 digit scale, and a 2 decimal precision.

In an embodiment of the present invention, columns can be:

1) Single Value Options (SVO)—Where a column has one and only one correct answer from a standardized list of answers;

2) Multiple Value Options (MVO)—Where a column has one or more correct answers;

3) Free Form Text, Short—Where a column has no defined answer and a user must type in a brief text value (e.g., Street Name);

4) Free Form Text, Long—Where a column has no defined answer and a user may type a long answer (e.g., Remarks);

5) Number—Where a value must be keyed in by the user, and it must be a number value;

6) Currency—Where a value must be keyed in by the user, and it must be a valid currency format;

7) Floating Point (Percentages, rates . . . );

8) Date—Where a value must be keyed in by the user, and it must be a valid date;

9) DateTime—Stores date and time; and

10) Time—Stores time only.

In an embodiment of the present invention, every column present in the database must belong to column groups. The column group represents a logical collection of columns relating to the same subject. The purpose of column groups is to facilitate organization and display of columns by front-end software.

For example, consider the following sample columns: 1) Body Of Water; 2) Mean Low Water; 3) Pier Length; 4) Slip Price; 5) Water Front Footage; 6) Fresh Water Y/N; 7) Hurricane Protection; and 8) Erosion Control. In one embodiment, each of these columns is grouped together in a logical grouping called "Water Oriented." Columns, even those in distinct locales that apply to water orientation, are grouped together logically. When a locale is created, the appropriate columns for that locale are selected from the Water Oriented Group for display by some front end. This is designed to reduce the number of redundant custom columns for each locale. When a Locale is created, for example Anne Arundel County, Maryland, that locale may indicate that the following columns are the only necessary columns: 1) Body Of Water; 2) Mean Low Water; and 4) Erosion Control. In this case, when Anne Arundel County is chosen as the locale to search or input, only those columns are displayed.

In an embodiment of the present invention, a front end extends this capability by only displaying those columns if the property to be input or searched for its designated feature of being Water Oriented. Furthermore, column groups may be designated as Used for Input (for data input applications) or Used for Query (for searching applications).

In an embodiment of the present invention, each column appears in one and only one column group, designated as "Used for Input." Also, each column appears in one or more column groups designated as "Used for Query."

Figure 51:
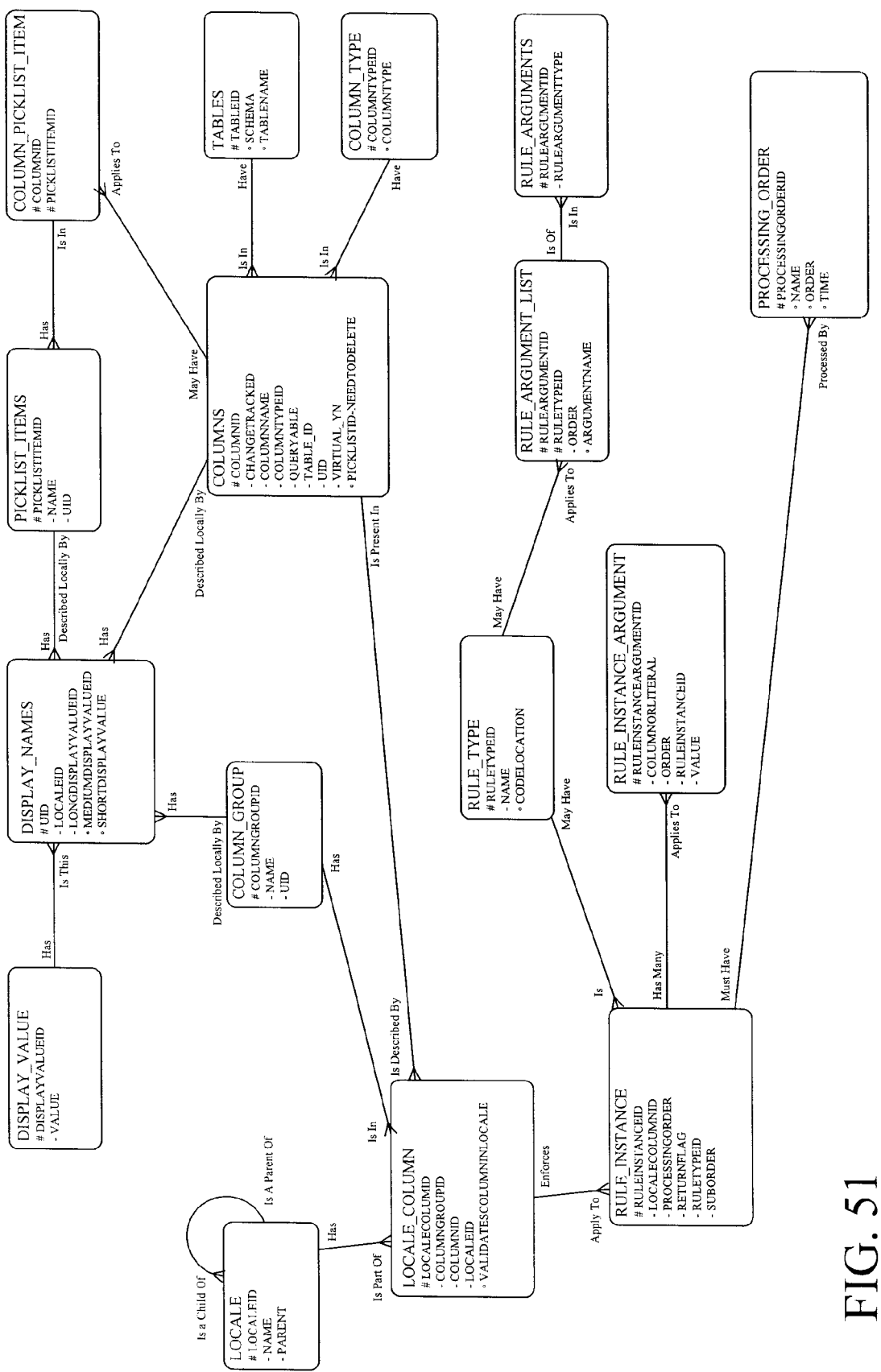
FIG. 51 is a block logical entity/relationship (E/R) diagram for the Localization Module for an embodiment of the present invention.

The rules detailed as 'Business Rules' above are designed to be generic. To that end, additional detail must be specified for each rule. At a minimum, the rule must determine what data types it required, and what column it is validating. The combination of the Rule and its arguments form the detail for a Rule Prototype. Each rule type can be reused to satisfy requirements for different locales. FIG. 51 includes the Logical E/R model for storing Rule Prototypes. In the diagram shown in FIG. 51, there is a list of generic rules, and a list of generic data types. These two lists share a many to many relationship. Between these two tables, to handle that relationship, is a table that lists the order of the data types—to create the argument list—and defines the argument name for each argument in the argument list that is presented to a rule.

A text Example of A Rule Prototype might be as follows:

The "Currency Should Be Within A Certain Percent of Another Value" Rule requires three arguments, in this order, a Currency Column for the Testing Column, a Currency Column for the value to compare against, and a Number representing the percentage of variance.

This would translate to the following (Pseudo) Code Prototype, in accordance with an embodiment of the present invention: CurrencyWithin Percentage (CurrencyColumn, CurrencyColumn, Number). This Prototype explains to the front end portion of the system how to prompt for the appropriate values to create a Rule Instance.

Based on a Rule Prototype, a specific instance of a rule must be stored. The Rule Instance uses the Rule Prototype as a guideline for defining the specific fields in the database to satisfy the requirements of the rule.

In the example used for Rule Prototyping above, a specific instance of the rule might be as follows: "When a sold price is provided for a listing, it should be within thirty percent of the current list price."

This uses the Rule Prototype of: CurrencyWithinPercentage (CurrencyColumn, CurrencyColumn, Number).

A Rule Instance would translate to (Pseudo) Code Instance, in this embodiment, as: CurrencyWithinPercentage (ListPrice, SoldPrice, 30).

A user-friendly message describing the rule is also supplied in this embodiment. This approach assists the user in reconciling the data when the rule is violated.

In accordance with embodiments of the present invention, both the Rule Prototype and Rule instance ultimately refer back to some snippet of code that actually processes the test. This snippet is the Rule Definition. The Rule Definition must conform to the Rule Prototype and accept the specific values passed via the Rule Instance. The Rule Definition must return the appropriate validation flag so a quality control module can report any exceptions back to the user.

The Rule definition may be stored in a variety of ways. Particularly, it may be stored as an Oracle PL/SQL block (in a package, function, procedure etc. . . . ) as a Java Servlet, a compiled C/C++ executable, among others.

In an embodiment of the present invention, most rules are processed at the time a listing is saved. This is called "SaveTime". However in some embodiments, certain rules require asynchronous processing. Asynchronous Rule processing is the processing of rules at some other time than at SaveTime. For example, a listing may be "locked" to prevent editing after a certain time. This rule becomes in force the next time the listing is edited after the defined period In order to maintain proper Data State, a rule type is established when rules are created. Rule Type can be one of several types. A rule is processed: 1) Before SaveTime; 2) At SaveTime; 3) After SaveTime; 4) At EditTime; 5) At SearchTime; 6) Batch Mode; and 7) Manually.

When a rule is created, the rule type indicates when this rule should be processed. For example, given a rule that requires a listing's address to be locked a certain number of hours after it was created, the at Edit Time rule type could handle this scenario. The rule only needs application if the listing is edited after it is entered.

This would permit (at least the appearance of) Asynchronous Rule Processing. Consider the following: A Business rule is created by a locale as follows: "A listing's address may not be changed after 96 hours from the time it is listed." To satisfy this rule the following columns may exist: 1) StreetAddress; 2) AddressLock; and 3) ListDate.

In this example, in accordance with an embodiment of the present invention, the following rules exist for these columns: 1) StreetAddress; and 2) AddressLock. When the listing is edited, a Edit Time Event is triggered. At this event the EditTime rules are processed. This changes AddressLock to Locked. When the At SaveTime rule is processed on StreetAddress, the rule is violated, and a red flag is returned. The user must reconcile the data provided.

Support for data searching is provided in embodiments of the present invention. Searching is supported across multiple locales, and typically those locales are sibling nodes of the same depth. Sibling nodes are nodes of the same depth that have the same parent. The parent nodes must be at least one node deeper than root. For example, a user is able to search for properties in Maryland and Virginia—Maryland and Virginia are at the same node level and have a common parent of United States, which is at least one node off root.

The server also supports searching for properties of sibling locales of different depths. For example, a search may be supported for Properties in Virginia, and Montgomery County, Maryland. Both locales are children of United States.

The present invention also supports searching for properties of non-sibling locales of different depths. These non-siblings only have root (core) as the common ancestor. For example, a search may be supported for properties in Vancouver, British Columbia in Canada, and Seattle, Wash. in the United States.

Figure 52:
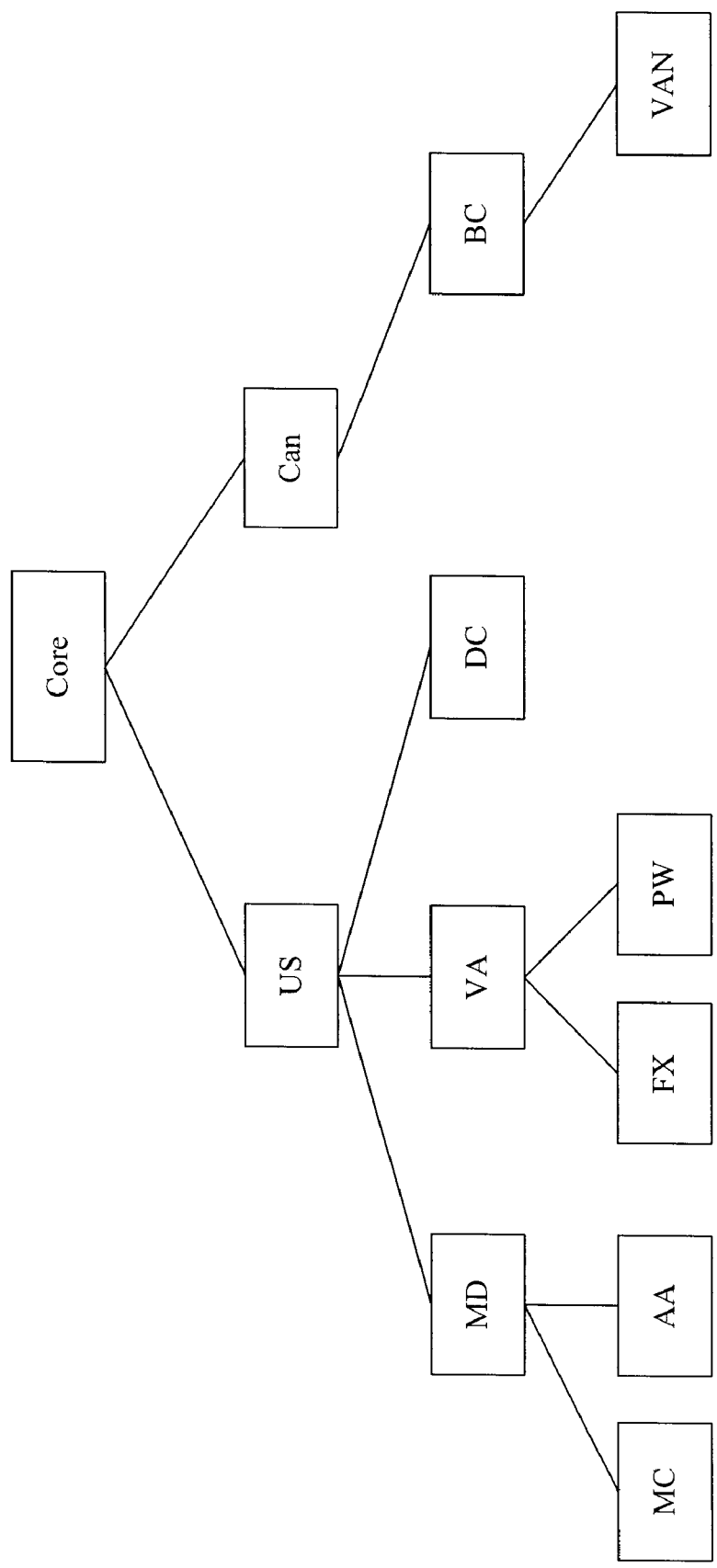
FIG. 52 contains a block diagram of an example Locale Tree, in accordance with an embodiment of the present invention.

When searching for listings across multiple locales, a particular logical structure is used to depict the query. For example in one embodiment, all Columns along the same traversal path to the most specific node selected are ANDed together. Wherever a split occurs in a traversal path the criteria along the split paths are ORed together. For example, given the Locale Tree shown in FIG. 52, and the criteria shown in FIG. 53, the Query is logically structured as follows:

```
...
WHERE
--"All columns along the common traversal path should be ANDed
together"
    (ListPrice > 100000
    AND
    FederalTax < 10000)
    AND --- This is the end of common traversal path; a traversal split
    occurs so the split should be grouped and ORed together
    (
        (
            MDStateTax < 1000
            AND -- Common Traversal Path
            MCCountyTax < 500
        )
        OR -- Traversal split
        (
            VAStateTax < 1000
            AND -- Common Traversal Path
            FXCountyTax < 500
        )
        OR -- Traversal Split
        (
            DCSoilType = MUD
        )
    )
```

Note that this example is pseudo-code, and does not represent the actual query structure to be used by the listing module of an embodiment of the present invention. This example is only used for illustration purposes to depict logical arrangement of query values.

The present invention also supports use of criteria selected that automatically exclude entire locales from searches, even if the searches involve multiple locales. For example, if there were a column in the US locale called ZipCode, and the user enters only Maryland Zip codes, then the Virginia Listings would automatically be excluded from the search.

In order to reduce redundant data, the system of an embodiment of the present invention reuses custom columns across many locales. This reuse may occur even if those locales are not aware of their similarities. If two locales both require a custom column called "Proximity to Ski Resort," then that column need not be duplicated.

In addition, picklist values may be shared among many columns, even if those columns are not aware of their similarities. For example, Dishwasher is a picklist item for an Appliances Column in the Maryland locale, and the Colorado locale has a picklist item for Dishwasher in a column called Amenities. As a result, in one embodiment, the system stores the picklist item of Dishwasher only once.

Figure 54:
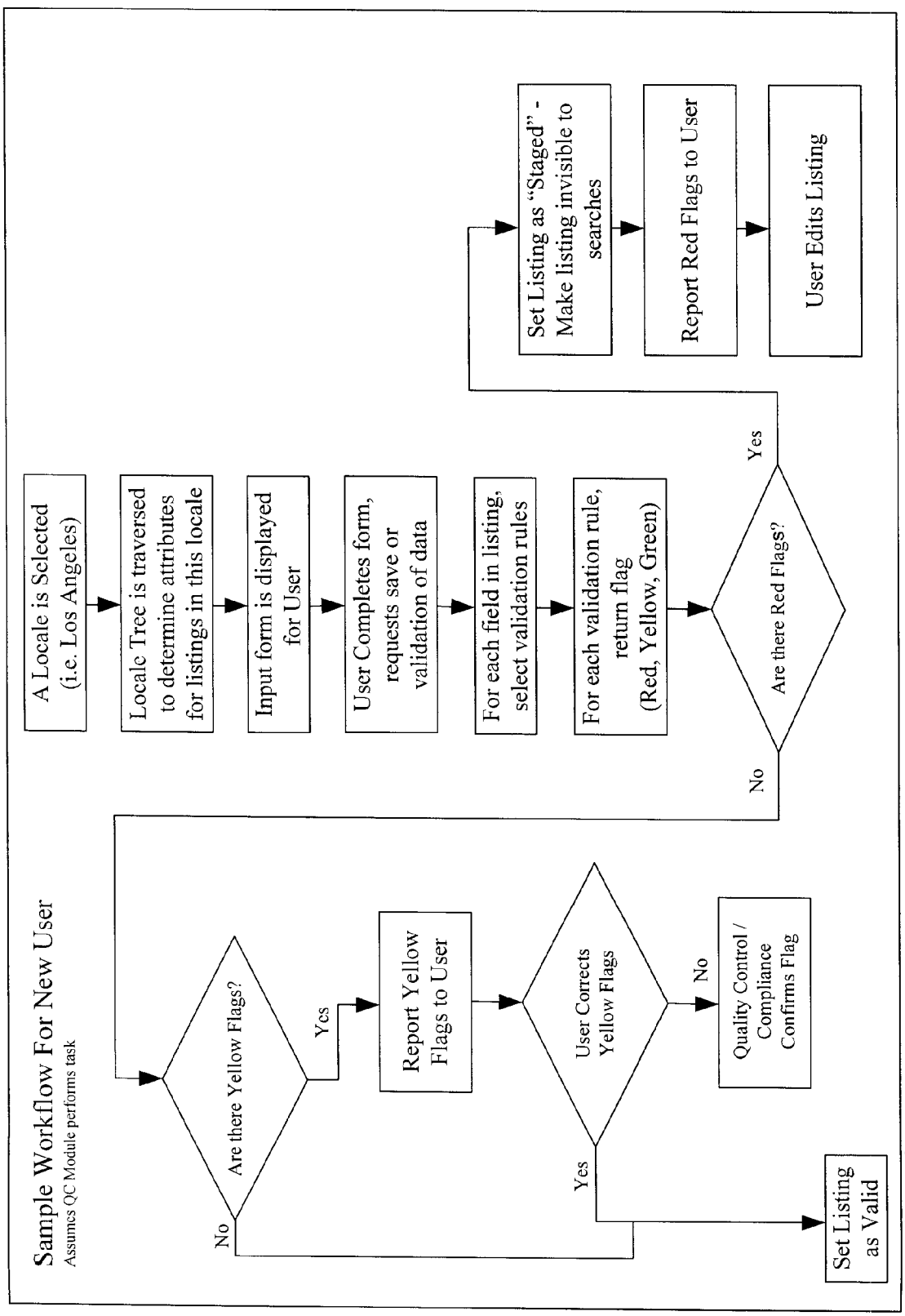
FIG. 54 shows an example flow diagram for new listing creation, in accordance with an embodiment of the present invention.

FIG. 54 presents a sample flow diagram for new listing creation in accordance with an embodiment of the present invention.

Figure 55:
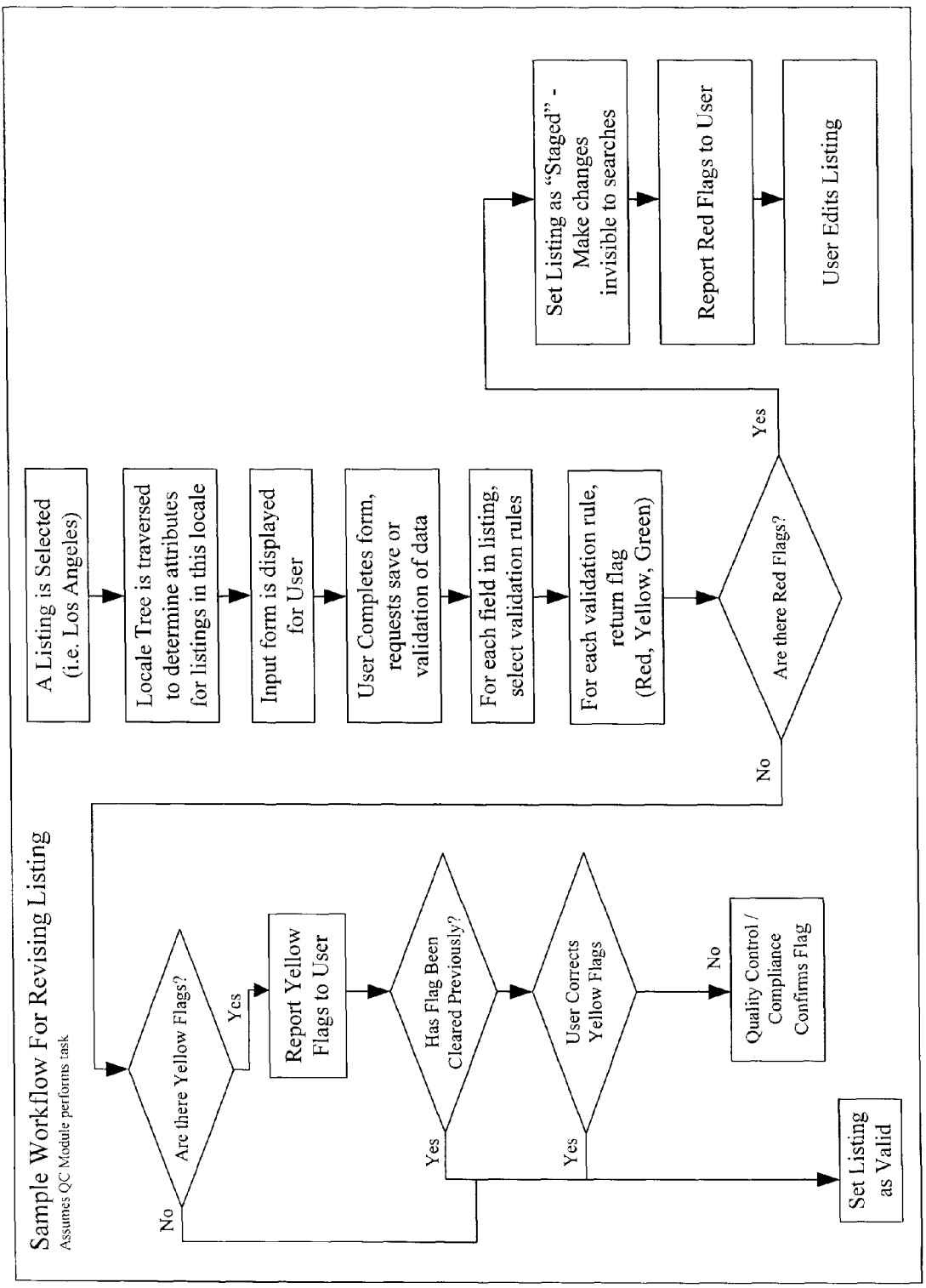
FIG. 55 is an example flow diagram for revised listing, in accordance with an embodiment of the present invention.

FIG. 55 shows an example flow diagram for revised listing, in accordance with an embodiment of the present invention.

Several additional functions performable in accordance with embodiments of the present invention will now be discussed using example scenarios.

In the first scenario, a User traverses the locale tree to select a specific locale, as follows: 1) User starts at Locale Root "Core"; 2) Server searches for locales whose parent is root; 3) Server returns the matching locales; 4) Client displays matching locales; 5) User selects locale; 6) Client submits locale I.D. to server; 7) Server returns the matching locales whose parent locale is locale I.D.; 8) Client displays matching locale; and 9) Return to step four (4) and repeat until desired locale has been selected or leaf node has been reached.

In a second scenario, an Administrator adds a column to a given locale: 1) the user performs functions indicated for the first scenario until desired locale is reached (Requirement: Locale Hierarchy) (e.g., User Selects "Washington D.C."); 2) In a front end Interface, the user indicates column name and column details, including Field Type (Requirement Locale Hierarchy); 3) (e.g., user Indicates "Soil Type" Type: Picklist, Single Value Option); 3) Data is transmitted to server; 4) Server analyzes field type, creates a list of possible rules, and returns rules list to client (Requirement: Business Rules) (e.g., Dependency Rules, State Rules and Picklist Rules are chosen); 5) If any rules already appear for this column, return existing rules to the client (for fields with multiple rules) (Requirement: Business Rules); 6) Client renders a Rule creation interface; 7) User selects a prototype rule to satisfy a requirement of the column. (Requirement: Rule Prototyping) (e.g., user selects "Column is required when another column has a certain value"); 8) Client Transmits prototype rule; 9) Server determines additional detail required based on the skeleton rule and returns detail requirements (Requirement: Rule Prototyping) (e.g., server selects "Column to compare to" and "Value to Compare to" as two required arguments for this rule); 10) Client Renders rule creation interface; 11) User provides detail to complete the rule (Requirement: Rule Instancing) (e.g., user provides "UnitedStates.County" as "Column to Compare to", and user provides "Washington D.C." as "Value to Compare to"); 12) Client Transmits rule details; 13) Server stores rule, and applies it to the column (Requirement: Rule Instancing); and 14) Repeat from step four (4).

In a third scenario, an administrator creates a new rule prototype. This scenario assumes that a code definition has been created, inserted into the database, and can be referenced. The example scenario proceeds as follows: 1) the user supplies code location, and rule name, and number of arguments the rule will require (e.g., user Supplies: "pkgRules.CurrencyWithinPercent", "Currency value must be within a certain percent of another currency value", and 3 Arguments); 2) System inserts:into Rule information into RuleType Table.; 3) System generates input form for number of arguments the rule will take; 4) System generates list of possible Argument Types to apply to this rule for each argument to populate the RuleArgumentList table; 5) User selects the appropriate arguments types for each argument (e.g., User Supplies: Currency Column, and Number); and 6) System inserts the argument_type_id for each argument and the order it was selected into the RuleArgumentList Table.

In a fourth scenario, an administrator edits an existing rule prototype. This example scenario assumes that the Argument name itself hasn't changed, nor the number of arguments, only that the existing arguments are incorrect, and need to be changed. This scenario proceeds as follows: 1) the end user selects a rule prototype to edit; 2) server retrieves the argument list for the prototype as it currently exists; 3) server transmits the current prototype, the current arguments, and complete argument lists to the client; and 4) the client displays the prototype, and lists, for the end user to make alterations.

In a fifth scenario, an administrator adds a new locale to the database; as follows: 1) User performs Locale Drill Down (LM001) until desired locale is reached (Requirement: Locale Hierarchy) (e.g., user Selects "Maryland"); 2) User is prompted to supply a name for the new locale (e.g., User supplies "Anne Arundel County"); 3) System inserts new locale name to locales table; 4) A Database-wide unique identifier is added to this locale; the Name is also inserted into the Display Names table, and a link created between the unique identifier and the Display Name (Requirement of the second scenario above: Display Value Customization); and 5) User performs Column Addition (Requirement: Locale Hierarchy—Custom Columns).

A general overview of the system architecture, in accordance with an embodiment of the present invention, will now be provided.

Figure 56:
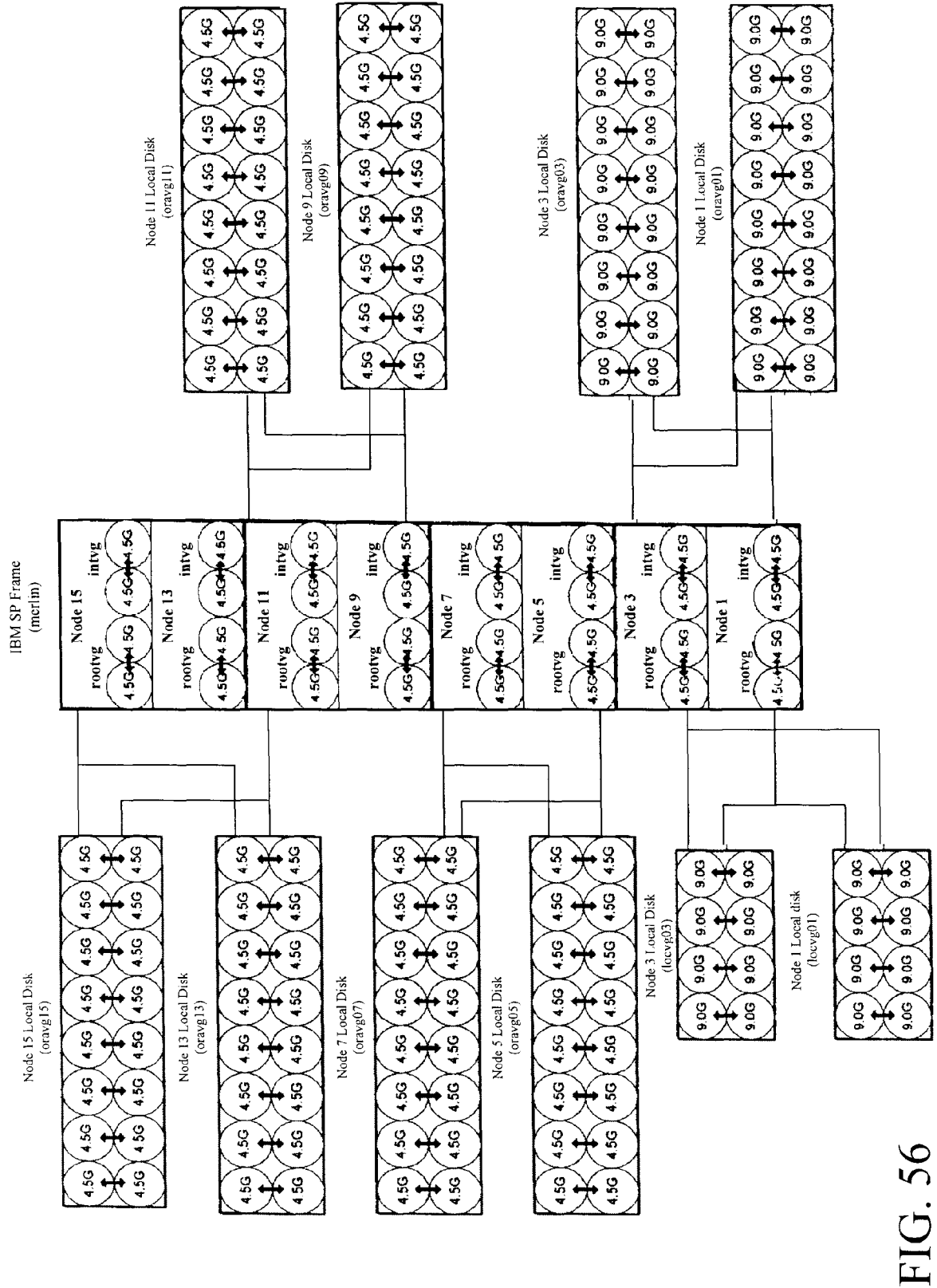
FIG. 56 contains a representative diagram of nodes and disks for an example system architecture for use in accordance with embodiments of the present invention.

The diagram of FIG. 56 illustrates how the IBM Development SP in accordance with one embodiment of the present invention is organized in terms of nodes and disks. Each circle in the diagram of FIG. 56 is a disk of specified size. Arrows between disks indicate that the disks are mirrored. Disks are shared by nodes as follows: 1-3, 5-7, 9-11, 13-15. Groups of disks are in a single volume group the name of which is in brackets. Nodes 1 and 3 have an additional set of disks which are used for exports, backups and a general large file storage area.

The disks in intvg01 are mounted as /u10 on Node 1. The disks in intvg03 are mounted as /u30 on Node 3. These mount points have been NFS mounted on all other nodes as /u110 and /u130. A symbolic link on Node 1 has been created called /u110 which points to the /u10 mount point. A symbolic link on Node 3 has been created called /u130 which points to the /u30 mount point.

In one embodiment of the present invention all disks in the oravgXX volume groups are used only for VSD's that are used with an Oracle OPS database. Having the VSD volume groups shared by the buddy nodes, allows the standard VSD failover to maintain a highly available system. Having Nodes shave volume groups used for JFS file systems allows them to be manually mounted on the buddy node in case the primary node fails and the files are urgently needed.

The database architecture of the system of an embodiment of the present invention includes two 8 Node SP complexes. Each SP complex has a single Oracle Parallel Server (OPS) database on it. The two databases are synchronized using Oracle 8 Symmetric Replication.

An embodiment of the present invention uses two databases, referred to as "WIZARD" and "JESTER." The WIZARD database will now be described in further detail. In this embodiment, the JESTER database is an exact duplicate of the WIZARD database with the exception of the database name and the names of the VSD's which the oracle tablespaces are using.

Following is the overall strategy for disk allocation for the system of one embodiment of the present invention:

1) System and General User data is located on disks 100 and 101 of each node. This includes Temp tablespaces and rollback segments.

2) The PLATINUM_MAIN tablespace is on disk 100 of each node and is spread over all nodes. This tablespace contains all tables that are specific to the system and are not to be partitioned.

3) The PLATINUM_MAIN_IDX tablespace is on disk 101 of each node and is spread over all nodes. This tablespace contains all indexes for tables stored in the PLATINUM_MAIN tablespace.

4) The DESIGNER tablespace is on disk 101 of each node and is spread over all nodes. The Oracle Designer repository is stored in this tablespace.

5) The DESIGNER_IDX tablespace is on disk 100 of each node and is spread over all nodes. The Oracle Designer repository indexes are stored in this tablespace.

6) There is one PLAT_GLOB_IDX tablespace for each node. This allows global indexes to be distributed in such a manner that each global index resides on only one disk on one node.

7) There is one PLAT_LOB tablespace for each node. This tablespace contains LOB objects. Having a single tablespace for each node, in accordance with one embodiment of the present invention, aids in the management of LOB and other specific tables. LOB tables are partitioned so that images inserted by each node go to a tablespace that is local to the machine in which the LOB is being inserted.

8) There is a series of PLAT_PRTX## table and index tablespaces. These tablespaces are designed to store the partitioned data for the system.

In the prior art, systems were designed to balance disk I/O by randomly distributing the data for the system over as many disks as possible. While this approach did succeed in equally balancing the disk I/O, it also had one major problem. The problem encountered was that each person that issued a query on the system was quite likely to cause a physical I/O on each disk in the system. This resulted in systems that were very I/O bound and so could not scale up in performance as much as needed.

For this reason, a radically different approach is used with the present invention. This approach is based, on the assumption that, in high multi-user systems, the chances for two consecutive I/O operations for a user being performed before the disk head moves to another part of the disk are very slim and probably approach zero.

For this reason, ensuring that a single user query hits one and only one disk improves scalability. This is only possible if the data in a system is partitioned in such a way that the I/O can still be balanced yet still achieve this goal. An additional caveat is that each disk is mirrored so that each query is evenly distributed over two disks.

In an embodiment of the present invention, the data in the system is partitioned by County. The amount of data for each county is taken into consideration when allocating each county to a partition. The end result is that nearly the same number of records are present on each disk. As a result, the data queried is approximately the same on each disk, since counties with more data generally have more queries and visa versa.

To achieve still more performance gains, in an embodiment of the present invention, the Middle Tier of the system sends all queries for a given county to the node that has that county disk local to it. The benefits of this approach include the following. First, all data for the queries and retrieved from a local disk which results in zero data transmissions across the SP High Speed Switch. This results in much faster I/O and leaves the switch free to perform operations on data that cannot be partitioned. Second, the SGA of each database performing the queries only has to cache data for an X number of counties. Thus, the database buffer cache is much more efficient, and the likelihood of finding data in the buffer cache is increased by a factor of the number of nodes over which the counties are divided. For example, if two 8 node IBM SP Complexes are available, the county specific queries can be spread across 16 different nodes. This means that each SGA only has to buffer 1/16 of the listing data in the system.

The architecture of the Middle Tier of an example system in accordance with an embodiment of the present invention will now be discussed.

An embodiment of the present invention uses a Java Application server for the Middle Tier portion of the system. A Java Application Server allows multiple users to access a set of Java objects in an efficient manner by allowing the efficient sharing of Java objects and data. This is accomplished, for example, through the use of Java Beans conforming to the J2EE standards.

One feature of Java Application Servers is that the code is reusable within each application server with no code changes.

Figure 57:
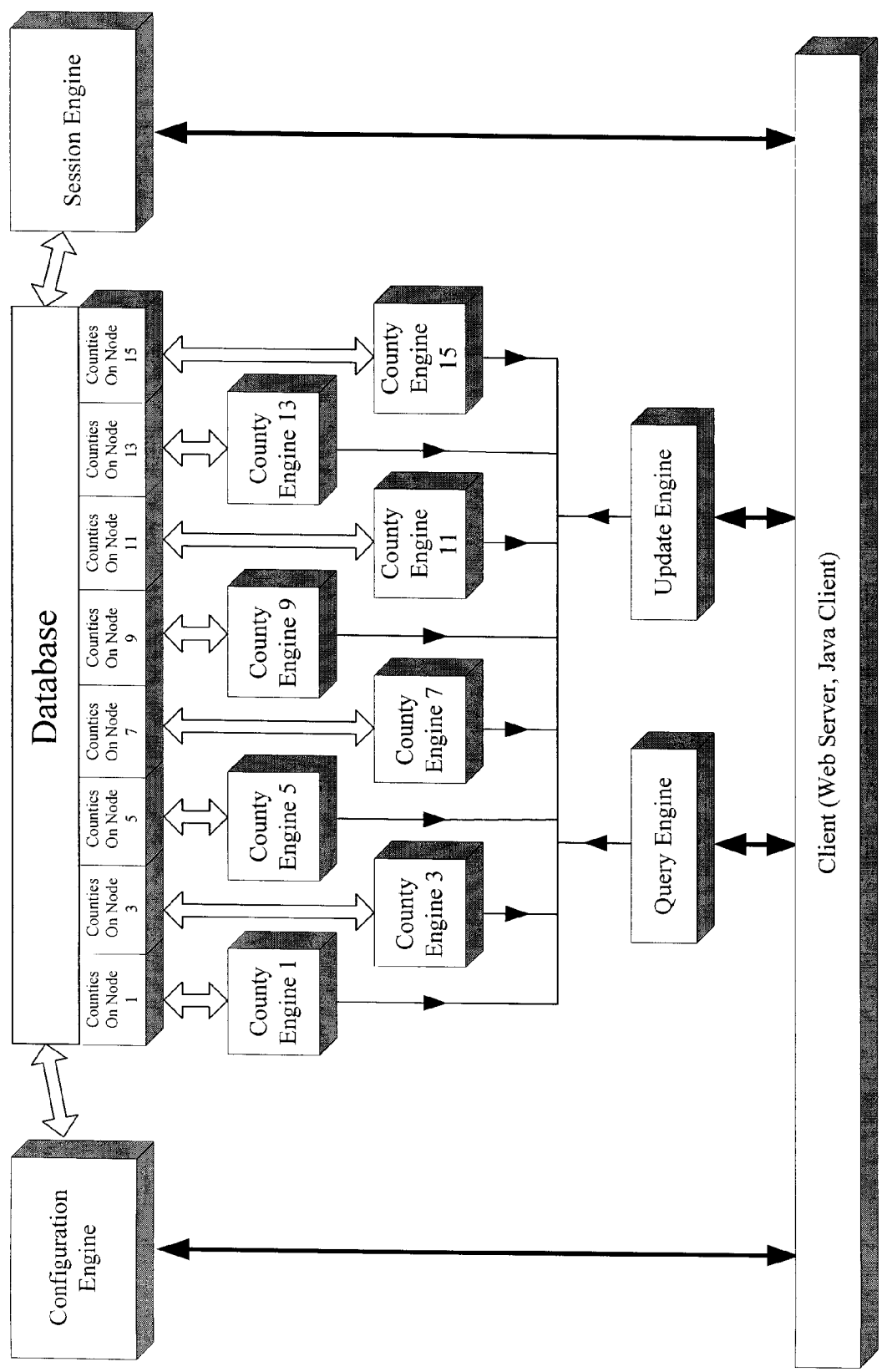
FIG. 57 presents a block diagram of the middle tier architecture, in accordance with an embodiment of the present invention.
Figure 58:
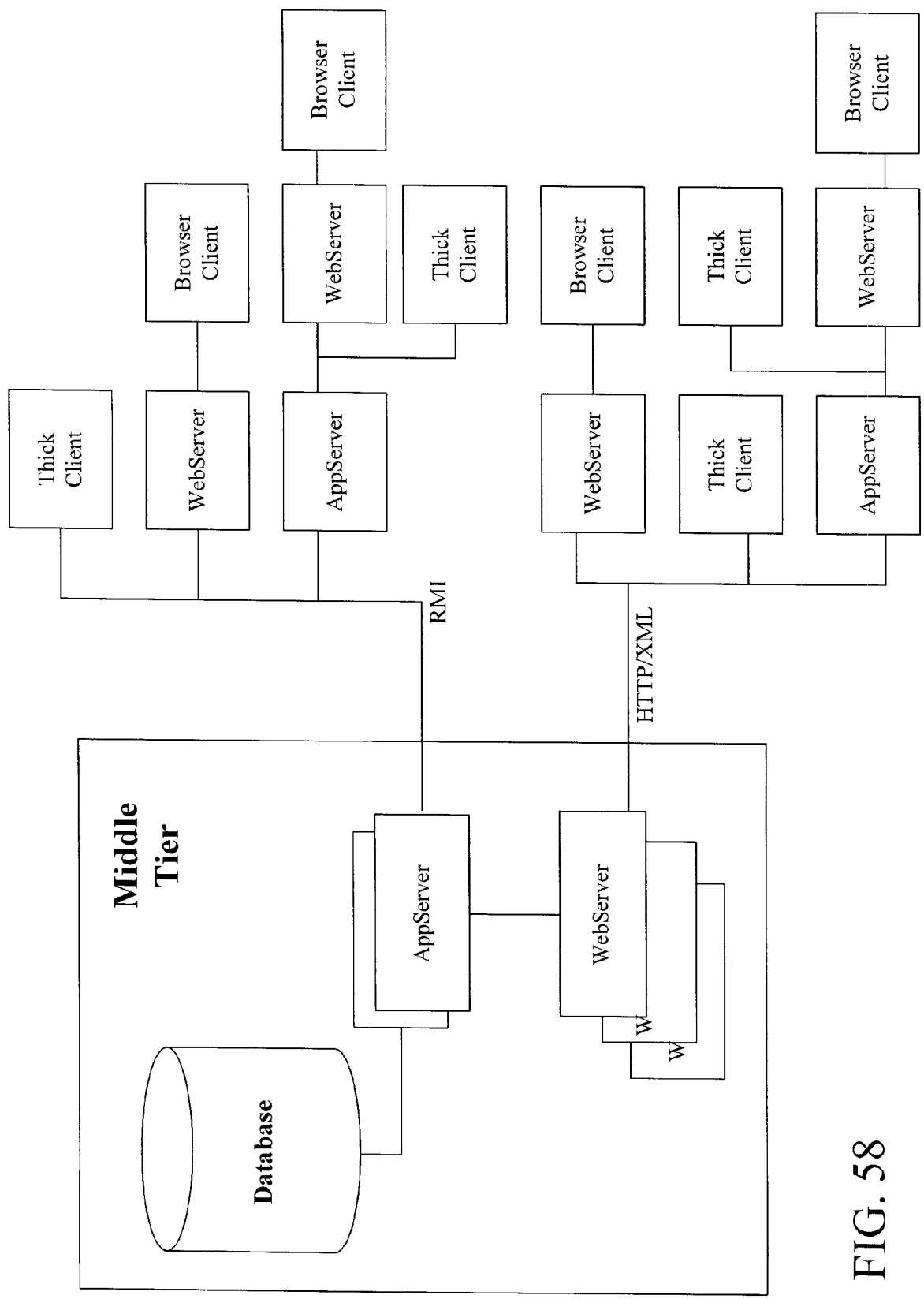
FIG. 58 shows a diagram of the middle tier components that illustrates how third parties and client software may access the middle tier, in accordance with an embodiment of the present invention.

FIGS. 57 and 58 illustrate the Middle Tier Architecture of one embodiment of the present invention. FIG. 57 shows the various software layers that are used in the middle tier. FIG. 58 illustrates how third parties and client software can access the middle tier.

There are two main components to the Application Program Interface (API), a Remote Method Invocation (RMI) component and an Extensible Markup Language (XML) component.

The RMI component provides a standard set of Java RMI calls to Session Beans that are running in the Application Server. These API calls provide all the functionality that is necessary to interact with the database. There are four classes of API calls: Session, Configuration, Query and Update.

The Session Interface provides all login, logout, password and session status information for clients that are using the Middle Tier.

The Configuration Interface provides all configuration information that a client may need when using the Query Interface. This information is anything from the data columns that are available to be queried to the sets of valid pick list values and their translations.

The Query Interface provides all method calls that allow data to be queried from the database. A query is passed to the Query interface using DMQL. This language allows for a list of columns to be requested in the result set as well as a standard way of formulating a boolean query. Data can be returned in many ways, such as the following: 1) a list of key values that satisfy the query; 2) the full result set that has already been decoded into printable values; and 3) the full result set that is in compressed format that can then be decoded into printable values by the requesting client using the Configuration data.

The Update Interface provides all method calls that allow data to be written to the database and to be validated before it is written. This interface provides methods that allow listings to be staged to the database before they are fully entered and ready to be written to the main database. This allows users to save partially entered listings to reduce data loss.

For updates, this interface provides methods that check out a given listing into the staging area for updates. For writing to the database, this interface provides methods that copy a listing from the staging area to the production database. Other methods are provided to validate the listing. If a listing fails validation, a result set is returned indicating which rules were violated. These violations can require that a user fix the data to comply with the rule or that the user simply enter a qualification to indicate acknowledgment of a possible data inconsistency.

The XML Component provides a standard set of XML calls that can be executed via Hypertext Markup Language (HTML) to interact with the Middle Tier. The XML calls are converted by the Web Server into the corresponding RMI calls. The returned results are then formatted into XML result sets and returned to the client.

Figure 59:
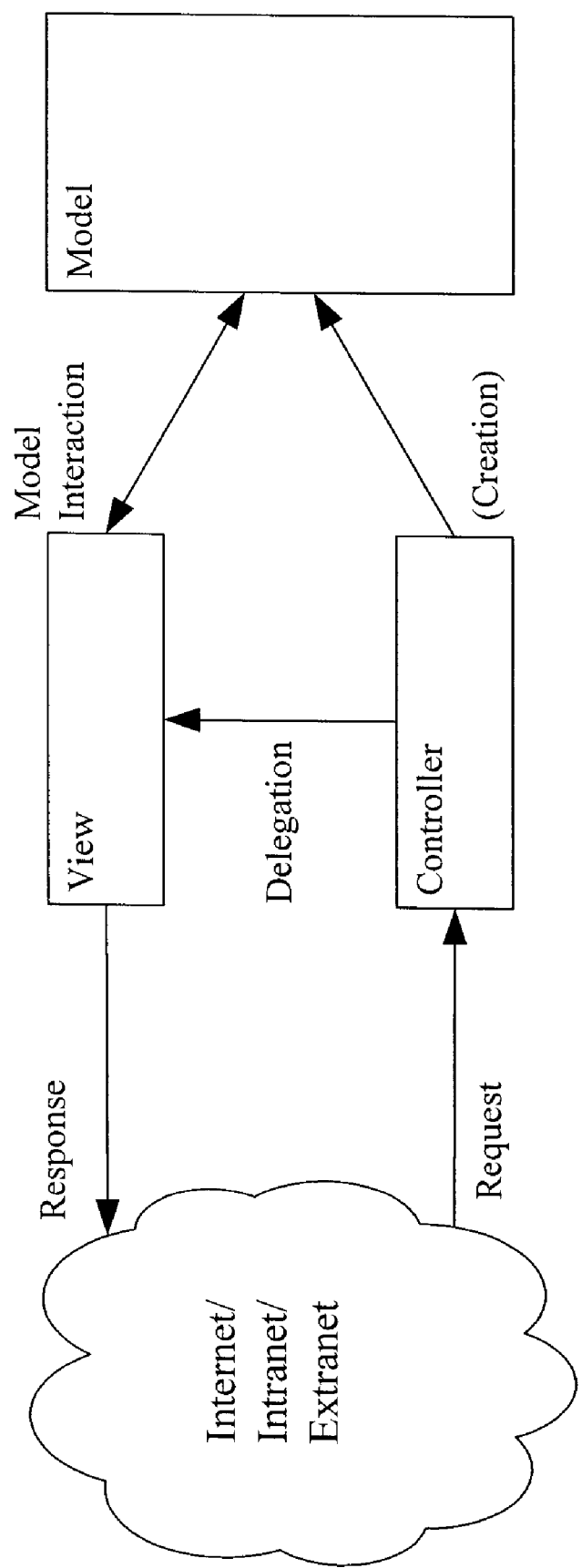
FIG. 59 is a representative diagram of the model-view-controller architectural implementation pattern of a system in accordance with an embodiment of the present invention.

In an embodiment of the present invention, the logical architecture is built around the Model-View-Controller (MVC) architectural implementation pattern and the multi-tier architectural deployment pattern. These patterns are, in turn, divided into several functional areas, as shown in FIG. 59.

The MVC pattern is used to isolate the result set (view) from the navigation (control) and the domain behavior and rules (model). Another way to describe this is that the solution is divided into an input (control), processing (model) and output (view) logical blocks. The benefit of this pattern is that changes to any one of the blocks can be made without impacting the other areas.

Figure 60:
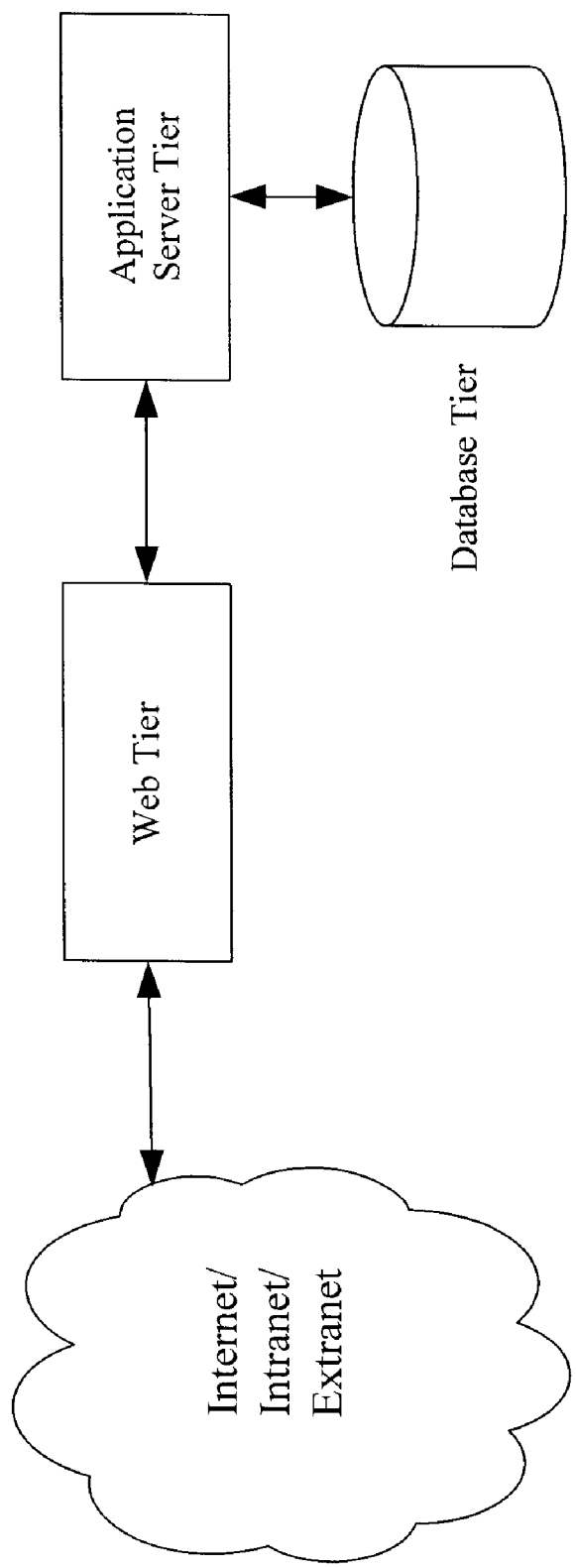
FIG. 60 contains a representative diagram of a multi-tier deployment architectural pattern of a system in accordance with an embodiment of the present invention.

The multi-tier deployment architecture pattern is shown in FIG. 60. This pattern represents the best-practices architecture seen in scalable Internet/Intranet systems.

In an embodiment of the present invention, each tier is implemented as a separate physical layer. Within each physical layer, multiple machines are used to handle the load, as appropriate. In small systems, all three tiers may be implemented on a single machine. In large systems, each tier may have a separate physical implementation, with many web tier machines feeding fewer application server machines talking to a database machine. Other, more complex embodiments have disparate databases connected together to provide enterprise information services. With this architecture, appropriately sized and configured machines can be deployed at each tier.

Another feature of an embodiment of the present invention is use of Class Identification. Class identification can be decomposed into several groups of related classes. A common scheme is to group objects by identifying classes that belong to one of Entity, Boundary, and Control groups. Example classes and related diagrams are provided below.

Entity or Domain classes are defined as the core business concepts that define the fundamental ideas behind a Real Estate information system. These classes reside in the Model section of the MVC pattern.

Figure 61:
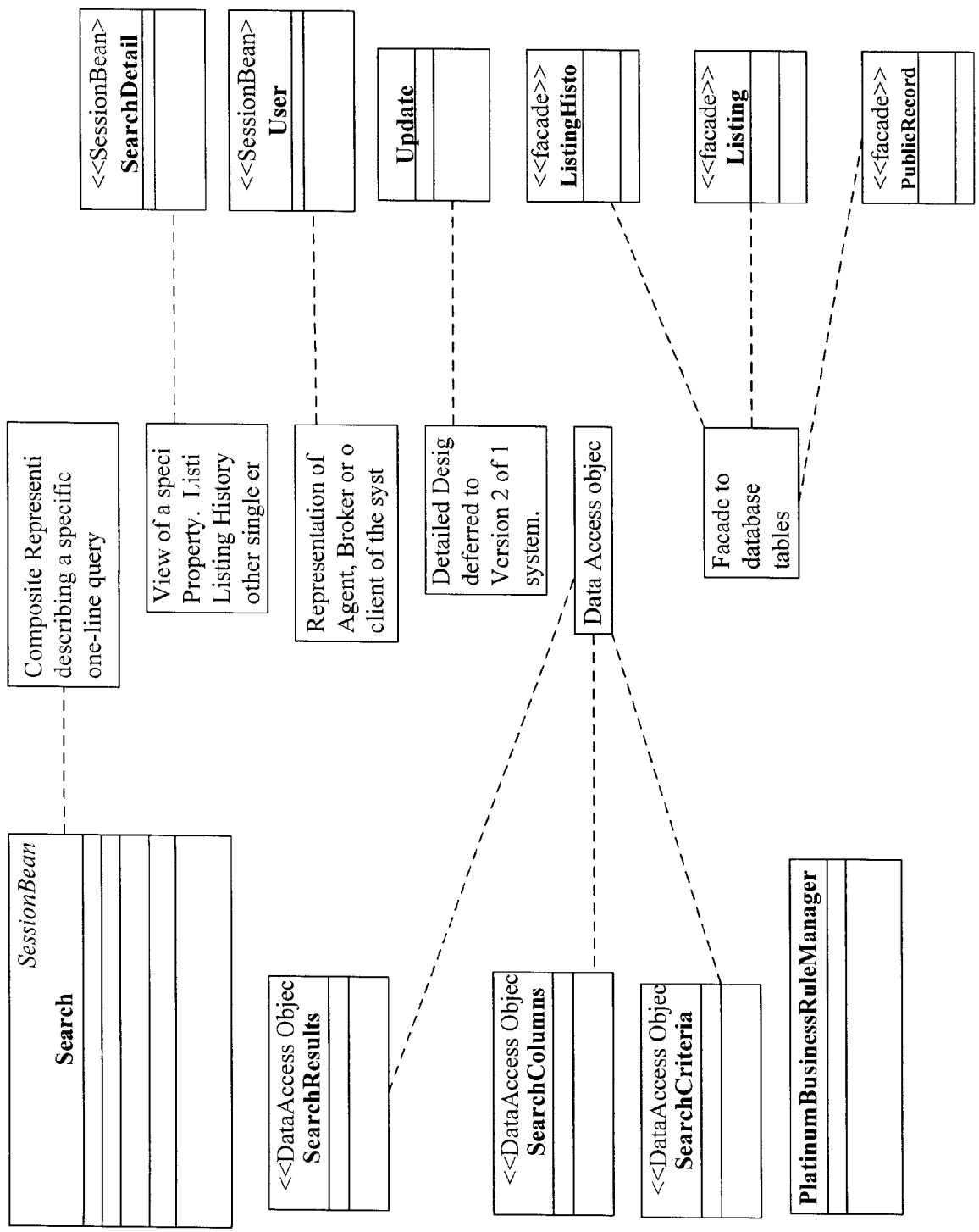
FIG. 61 presents a representative diagram of middle tier objects in a domain package, in accordance with an embodiment of the present invention.

Since one principle feature of the system is the retrieval of Real Estate information, many of the classes that can be identified are implemented as physical tables in the database system, as shown in FIG. 61.

Figure 62:
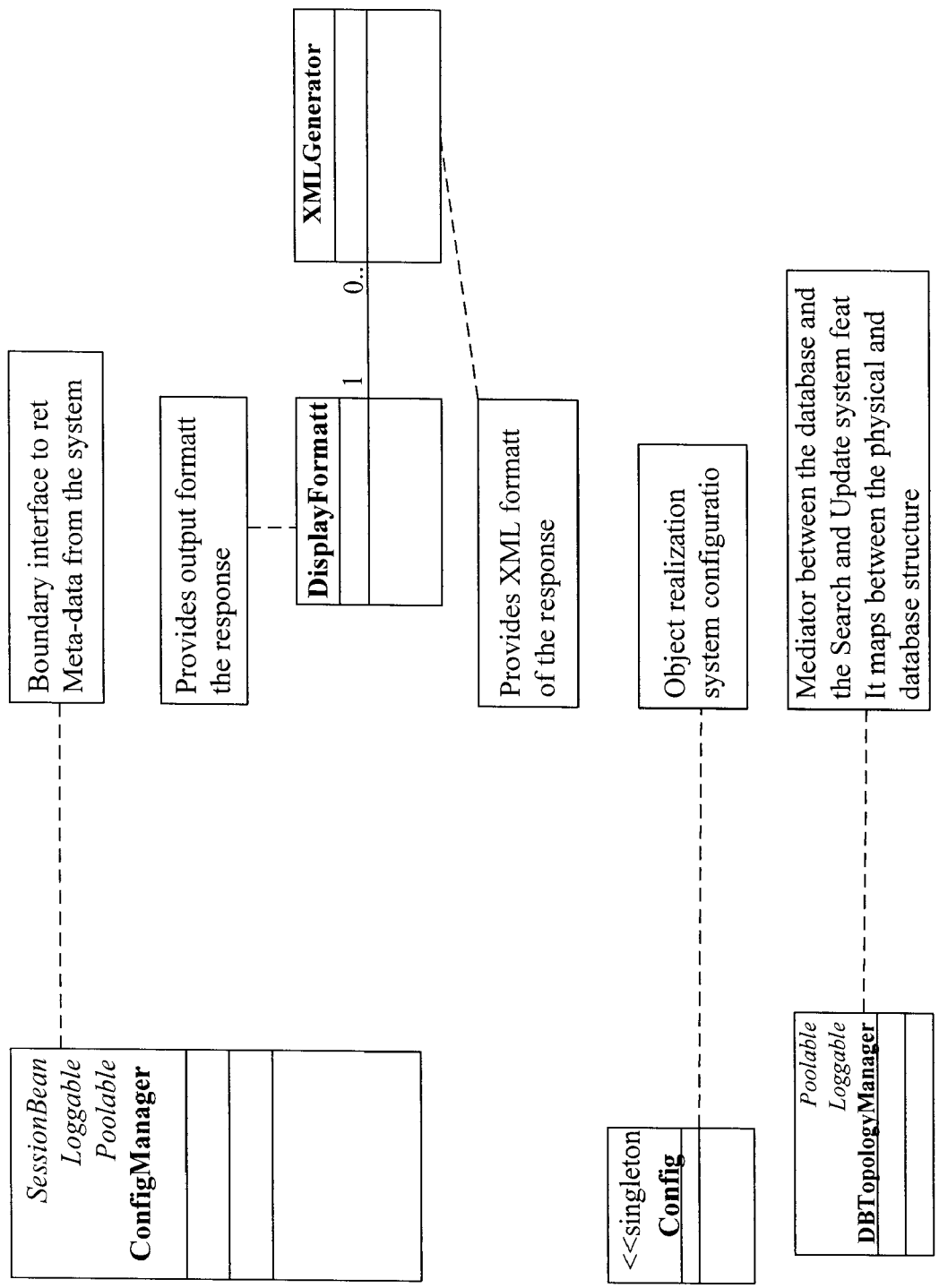
FIG. 62 shows a representative diagram of middle tier objects in a boundary package, in accordance with an embodiment of the present invention.

Boundary classes provide the communication channel from the actors and the system. These classes typically reside in the View section of the MVC pattern, as shown in FIG. 62.

Figure 63:
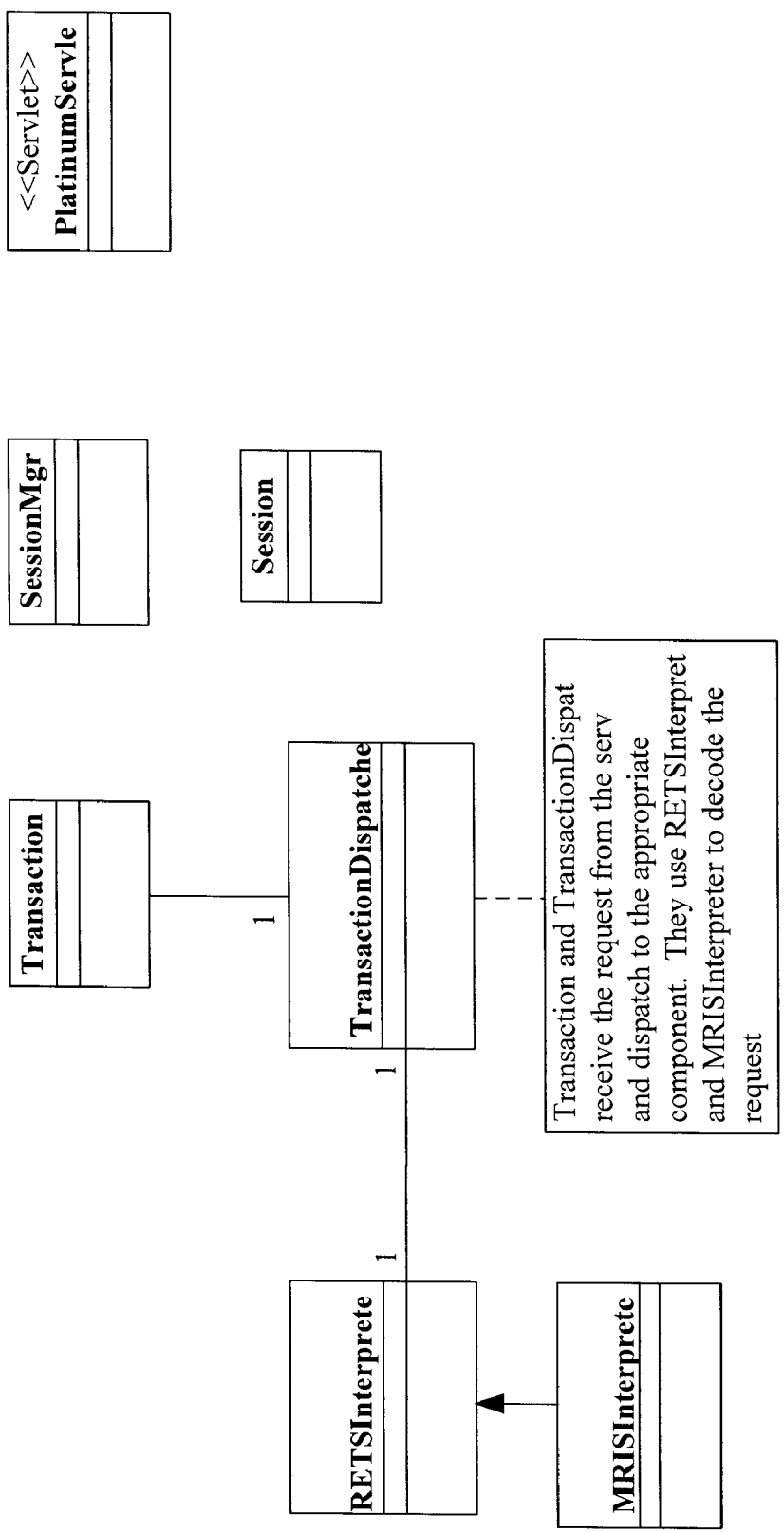
FIG. 63 is a representative diagram of middle tier objects in a control package, in accordance with an embodiment of the present invention.

Control classes describe the workflow or navigation of the system. Control classes reside in the Control section of the MVC pattern, as shown in FIG. 63.

Figure 64:
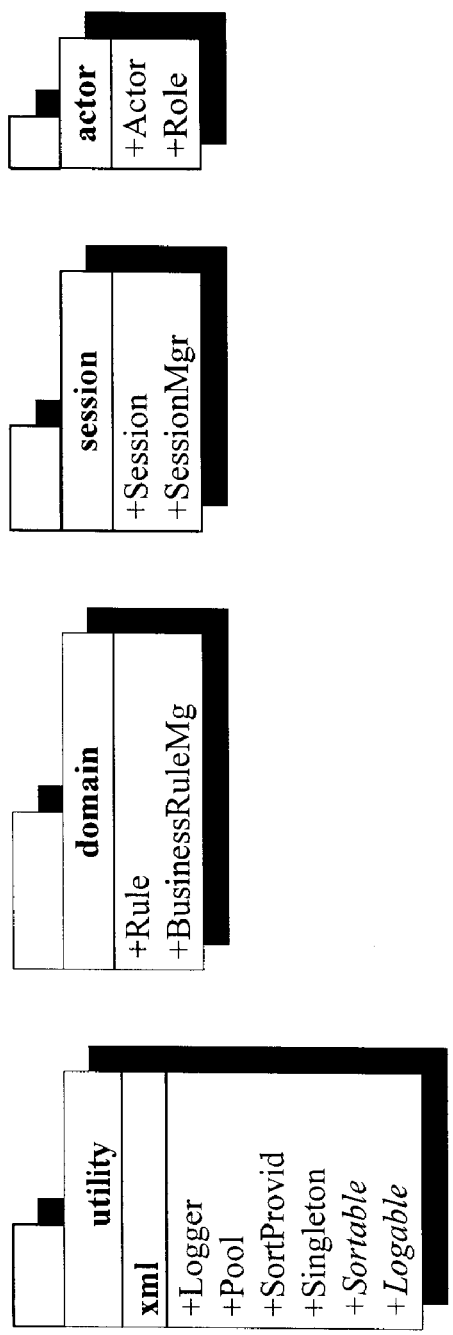
FIG. 64 contains a representative diagram of middle tier objects in a utility package, in accordance with an embodiment of the present invention.

An additional group of objects can be identified that support more general concepts. These objects are grouped under the title of utility. They represent more administrative concepts and are not directly related to the domain or problem space. These objects are shown in FIG. 64.

Enterprise Java, used in one embodiment of the present invention, will now be described in more detail. Enterprise Java is a series of services for creating highly scalable systems, while minimizing the platform dependencies. Enterprise Java provides a large number of API classes to simplify creating applications. The API classes hide the complexity required to implement robust threading (multiple users executing identical software independently), database connections, socket management, clustering, and additional services. J2EE provides access control to the method level, allowing for a very fine-grained security system.

The Public Record Module of an embodiment of the present invention will now be described further. The Public Record Module consists of the underlying legal, geographical, structural, and transactional data as obtained from various public information domains. This information is standardized and kept up to date to populate and validate real property data. This information consists of multiple data sets collected and processed separately, requiring a flexible, yet dynamically linked system.

With the congruence of multiple data sets, the Public Records Module permits storage, manipulation, quality review, and display/output of real property information. Because the data is collected and processed in several different data sets, with the continued integration of further multi media data sets, an open yet dynamically linked design is used with the present invention.

An embodiment of the present invention includes an expandable system designed to link and update data from Public Records dynamically. The Public Record Module, in an embodiment of the present invention, integrates tightly with the Listing Module. The Public Record Module is also available to all modules in the system for use, for example, in address verification, telephone number, geographical data, or any other data aspects within the module.

The Public Record Module portion of the system provides the legal and geographical information for the Listing Module. This portion of the system also interfaces with the Quality Control Module for confirmation of various legal and geographical data. The Public Records Module also heavily relies on the Localization Module to provide it with the ability to store and display each jurisdiction's data effectively. This system is also dependent on the collection and integration of multiple outside data sets and may require the ability to dynamically link to these sources.

For use with an embodiment of the present invention, each public record includes a primary, or core, set of attributes. Additional blocks of information may be attached to the public record in order to effectively describe it. The structure of the public records table mimics the structure of the listings table, in that it contains commonly searched elements of data, such as information about the entire lot and main structure on the property. Since data can vary greatly between jurisdictions, much of the information is stored as virtual data.

Each public record may contain one or more sales. With the update of sales information, address and party data may be affected as well. As a minimum, all sales must have a transfer date. Generally, they also have transfer price, deed book and page, grantee, and possibly grantor.

Some jurisdictions record the type of transfer: whether it is a refinance, a transfer between two unrelated parties ("arms length"), a gift, or an inheritance. The present invention is able to store and validate this data based upon the jurisdiction. Traditionally, jurisdictions maintain Deed Book and Deed Page numbers to aid in tracking sales information. Some also maintain Will Book and Will Page numbers for inheritances. The two sets of numbers are maintained as separate sequences. However, some jurisdictions are now using a single "instrument number" as a unique identifier. The present invention is able to store and display these various types of information.

Each public record may contain one or more sets of mortgage data. With the update of mortgage information, address and party data may be affected as well. The mortgage may be associated with a sale or it may be associated directly to the public record (e.g., refinancing).

For any public record, a property address should exist; however, data varies by jurisdiction greatly. In an embodiment of the present invention, these addresses are validated. The structure of the public record address table mimics that of the listings address table.

Several other types of addresses may exist (e.g., mailing address, mortgage company address, HOA address, builder's address), but they are tied to particular parties and are stored in the Party table.

For any public record, one or more parties may exist. Each party may be one of the following types: current owner, previous owner, care-of information, mortgage company, HOA, builder.

The structure of the public records party table mimics that of the party table for the listings. Owners fit into the personal relationship model, while organizations such as mortgage companies, HOA's and builders fall into the professional relationship model.

In addition, current and previous owner types maintain data source and timestamp information to enable effective updating of current owner/grantee information.

For any public record, there may exist one or more components. There are two component types: land and structure. Land types can be one of various types, as defined by the governing jurisdiction: residential, farm, commercial, vacant, etc. A structure type can be an entire structure, such as a house, barn, or shed; or a structure type may be a part of a structure, such as a patio, garage, basement, or attic.

Data about the main structure and lot is typically stored in the public record table. The component table of an embodiment of the present invention contains additional information about how the lot may be partitioned (e.g., farm, timber, commercial, residential), additional information about the main structure's components (e.g., basement, porch, garages), and information about additional structures on the property (e.g., sheds, barns, silos).

For additional information about the main structure (e.g., porches, attics, basements), the record is also linked back to the main structure. Each additional structure on the property receives its own comp_uid and its parent link that points to that comp_uid. If there is any additional information about the additional structure, it is also linked back to the str_uid.

Descriptive information included in the system about each component varies depending on the amount of data provided by the jurisdiction, and much of it is stored in virtual data. But all components share a set of common attributes, such as length, width, and/or area.

Also, in some embodiments, assessments and/or tax bills are tied to a component.

Each public record has at least one record stored in a table called Tax Link. This record contains at a minimum the tax class and tax year and is linked to either an individual component or to the main public record. If there is only one tax class for any given year, it is tied to the main public record. If there are multiple tax classes, they may either be linked to the main public record or to an individual component. Tax classes vary by locale, but some examples are: owner-occupied residential, non-owner-occupied residential, commercial, taxable, and exempt.

The present invention maintains history of assessment and bill information, so most records have multiple tax link records, simply because of the tax year changing. For each tax link, there is at least one tax assessment and one tax bill. All types of tax assessment/bill information share a set of common attributes, such as type and amount.

Assessment types may be land, improvement, land use, or total assessments.

Bill types may be total, state, county, municipality, refuse, or utility-related tax bills. There are also many types of tax bills that are particular to a given jurisdiction or local area within the jurisdiction, such as leaf collection, noise abatement, recreation, and storm drainage.

There are several types of multimedia that are stored for the public record system, such as photos, tax/plat maps, and structure diagrams. This data is typically stored with the virtual images data from the listings.

Since the Public Records portion of the system shares many functional similarities with the Listings portion of the system, there are many requirements that the Public Record system shares with the Listings system. Both portions have data that is stored, maintained, searched, and displayed. Both portions share the goals of flexibility, extensibility, and performance.

In an embodiment of the present invention, while there are many similarities, there are also major differences between the two sets of data. The greatest differences are the manner in which the data is input into the system and the sources of the data itself. A listing is entered in an interactive manner individually by an agent (or assistant to the agent). The listing data comes directly from the agent, who has personal knowledge of the property. Quality control is performed before the listing is entered into the live database, and any exception responses or future corrections to the listing are made individually, based on the listing agent's personal knowledge of the property.

In contrast, the public record information for an entire jurisdiction is entered into the system all at one time in large batches consisting of at least several thousand records. The original (or raw) data set has been collected and maintained by a local government agency or a vendor contracted by the local government. The data is stored in an area separate from the live database, and the converted data is not loaded to the system of the present invention until it has passed stringent quality control procedures. Each property record is processed automatically using a data conversion program written specifically for each jurisdiction's data. This program cannot take into account all individual discrepancies in the data. It must effectively process as many records as possible in a limited amount of time.

As with the listing system, the local business rules are also used in the QC process. In an embodiment of the present invention, public records utilize the QC module in much the same way as the listings portion of the system, but with the following differences.

The green/yellow/red flag concept is provided for QCing public record data. For example, the green flag indicates that a particular rule has been checked and validated. The yellow flag indicates that the data needs to be examined further to determine if corrections should be made. The red flag indicates that there are serious errors in the test data and it should not be loaded to the live system.

However, the public record QC process also varies somewhat from the listing process, in that public record information is processed in large batches by automated data conversion programs, versus manual data entry of a single listing by an individual. Thus, an interactive method of manually correcting individual records is used.

In an embodiment of the present invention, public records searching shares many of the same functions as described with regard to the Listings portion of the system. Public record searches rely on the concepts of meta data, searching by locale, query groups, syntax validation, saved searches, counts, and matching records.

An embodiment of the present invention includes searching tips: "If you can't find a record by its property address, search on . . . " and then fill in the blank with the locale-specific hint. For example, in Fairfax, "the first three parts of the Tax Map Number (e.g., 20-4-5*)". But in most of the Maryland counties, you'd need to say "the Map, Grid, and Parcel Numbers (e.g., 43, 28, 97)".

The types of public record searches of one embodiment of the present invention include the following: 1) Quick Search; 2) Global Search; 3) Detailed Search; 4) CMA Search; and 5) Sales Search. For the most part, the features of the system relating to these searches are very similar to those detailed regarding listings above. One exception is the Sales Search. This search is used to find transfer information. When searching on sales dates, the system provides the capability to search on the most recent sale date only or to search on all sale dates.

For the most part, with regard to business function, the public record return sets are similar to the listings return sets, as discussed above. In addition to one or more default sets for each locale, a few standard default return sets designed for a certain type of user are included. For example, an agent typically does not want the level of detail on structural information that an appraiser would. The agent may just want to see the taxes, sales and some of the core attributes. In contrast, the appraiser typically wants all the structural detail the system can provide. One embodiment of the present invention therefore provides the option of selecting the type of return set.

Figure 65:
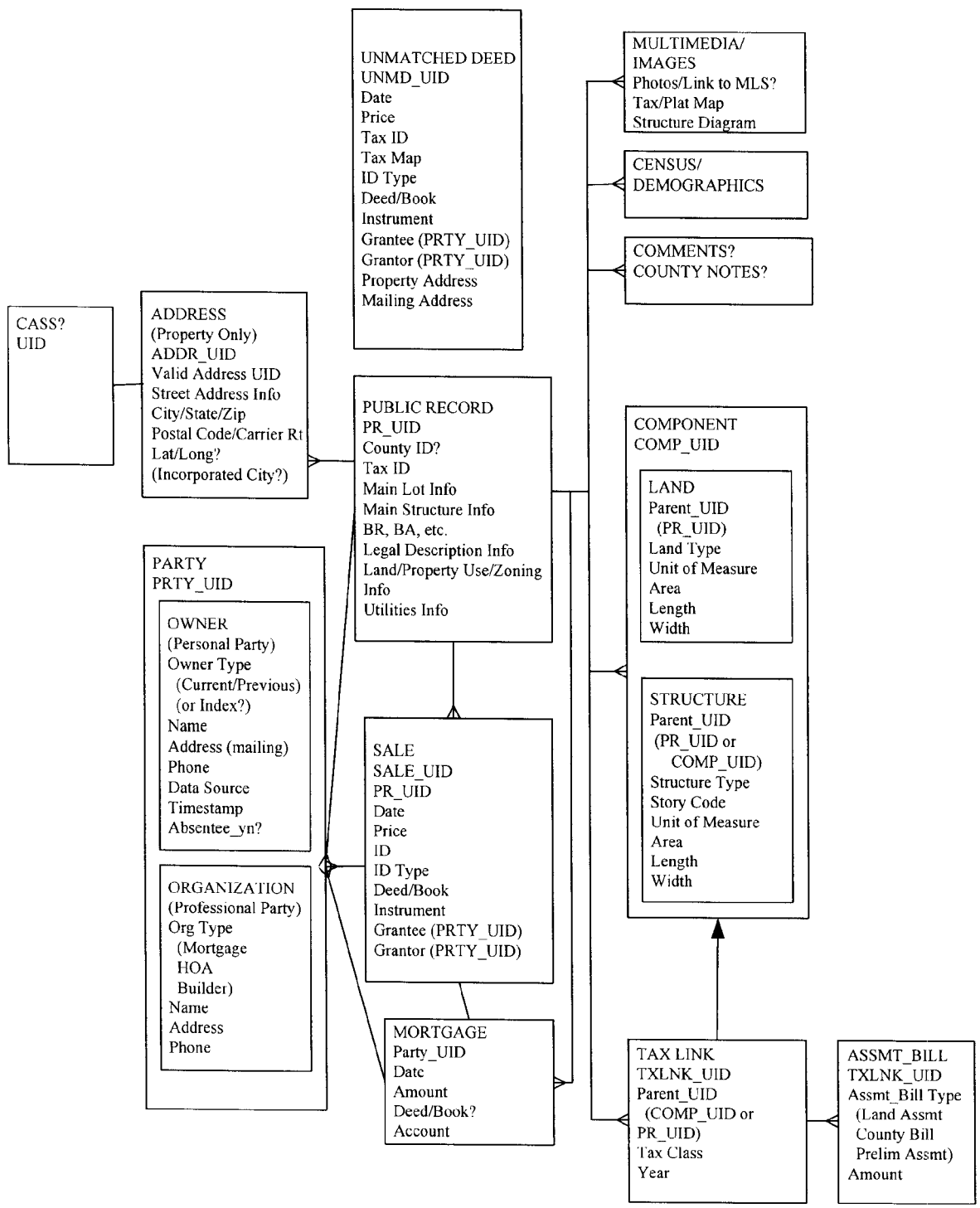
FIG. 65 presents an example system diagram relating to the public records portion of the system, in accordance with an embodiment of the present invention.

FIG. 65 illustrates an example system diagram relating to the public records portion of the system, in accordance with an embodiment of the present invention.

The Quality Control (QC) Module of an embodiment of the present invention will now be described. The present invention links the QC Module to the Listing Module, as well as the statistics and Call Tracking and accounting modules.

The process flow for QC used in an embodiment of the present invention is generally describable as follows: 1) a listing is input; 2) rules are processed; 3) an exception report is generated and the data is staged; 4) customer responds to each flag with the correct information or a response; 5) listing is saved; 6) a case is opened for each flag and stored on a call tracking or QC database; 7) any future contact or fines for this case are stored in call tracking or a QC database so that reports may be run indicating statistics about agents, fines, time to resolution of cases, number of notifications required, or other items that might be desired; 8) if the listing is fixed by the customer, the case is marked as closed; 9) for every QC case there may be many call tracking or QC Database entries; and 10) only yellow flags are typically tracked.

In an embodiment of the present invention, every business rule provides a flag indicating its enforcement. When a field is validated, a flag is returned indicating success or strength of failure. The following additional features are included in an embodiment of the present invention. Every business rule provides exception strength. Metaphorically, this is represented with three flags: a Red, Yellow, and Green flag.

A Green Flag indicates that the data in the listing conforms to the business rule. A Yellow Flag indicates that the data in the listing, while possibly accurate, is outside the normal boundaries for that field. For example, a list price of $100,000,000 may raise a yellow flag. It is possible for a property to be listed at one hundred million dollars, however, this is unlikely, and should be confirmed. This flag is used to reduce user-input error by confirming unusual values. This is a medium strength exception. A Red Flag indicates that the data provided is outside of normal boundaries, and the listing cannot be saved. This flag indicates, for example, that a required value is missing, or text is provided where a number is expected. This is the highest strength exception.

In order to assure highest possible quality control, a "Validator" is included in an embodiment of the present invention. The validator checks a listing for conformance to quality control business rules, and generates exceptions, if any. The report indicates the exception strength of the flag (red, yellow, green), and the reason the flag was raised. It may also offer ways to make the data conform to the rule to the end user. ("A Soil Type is required, and the listing cannot be activated without this information. Please indicate the Soil Type for this property.") A Front-end system optionally validates (or may require validation of) a listing without committing it to the database.

In an embodiment of the present invention, an exception report allows the listing agent to respond to the flags that should be accepted. This report is triggered on input or modification of a listing or by request of a front end to validate a listing prior to committing it to the database for change or input.

In order to generate a listing history, and to provide an audit trail of activity for a listing, in an embodiment of the present invention, a complete log of activity is kept for a listing. When a listing is changed, each validation rule, and flag returned is tracked. For each flag returned, a disposition of that flag is tracked.

Every time a listing is changed or input, all yellow flags are logged. Also, any flags that have been cleared are also noted.

The following example illustrates use of Flags in accordance with an embodiment of the present invention: 1) a new listing is input, with a list price of $100,000,000; 2) the validation rules are executed; 3) a Yellow Flag is raised, logged, and reported back to the user; 4) the list price is confirmed as accurate; this disposition, is logged; 5) the agent changes the number of bedrooms for the property; 6) the validation rules are executed; 7) a yellow flag is raised, on list price; 8) this list price has previously been confirmed as accurate—therefore the flag is "lowered" and not logged or reported to the user; 9) the user edits the listing, and changes the list price to $90,000,000; 10) the validation rules are executed; 11) a Yellow Flag is raised, logged, and reported back to the user; and 12) the list price is confirmed as accurate, and this disposition is logged.

An embodiment of the present invention also utilizes user response in the exception process, as illustrated in the following example: 1) a new valid listing is input, with a list price of $40,000; 2) the listing is revised to change status to sold, with a sold price of $1 (one dollar); 3) the validation rules are executed; 4) a yellow flag is raised; 5) user confirms sales price, and provides the following response: "This property located in Baltimore, was condemned and sold under the Urban Housing Authority Plan as a 'shell'"; and 6) quality Control Personnel, dispose of the flag with an Override.

Figure 67:
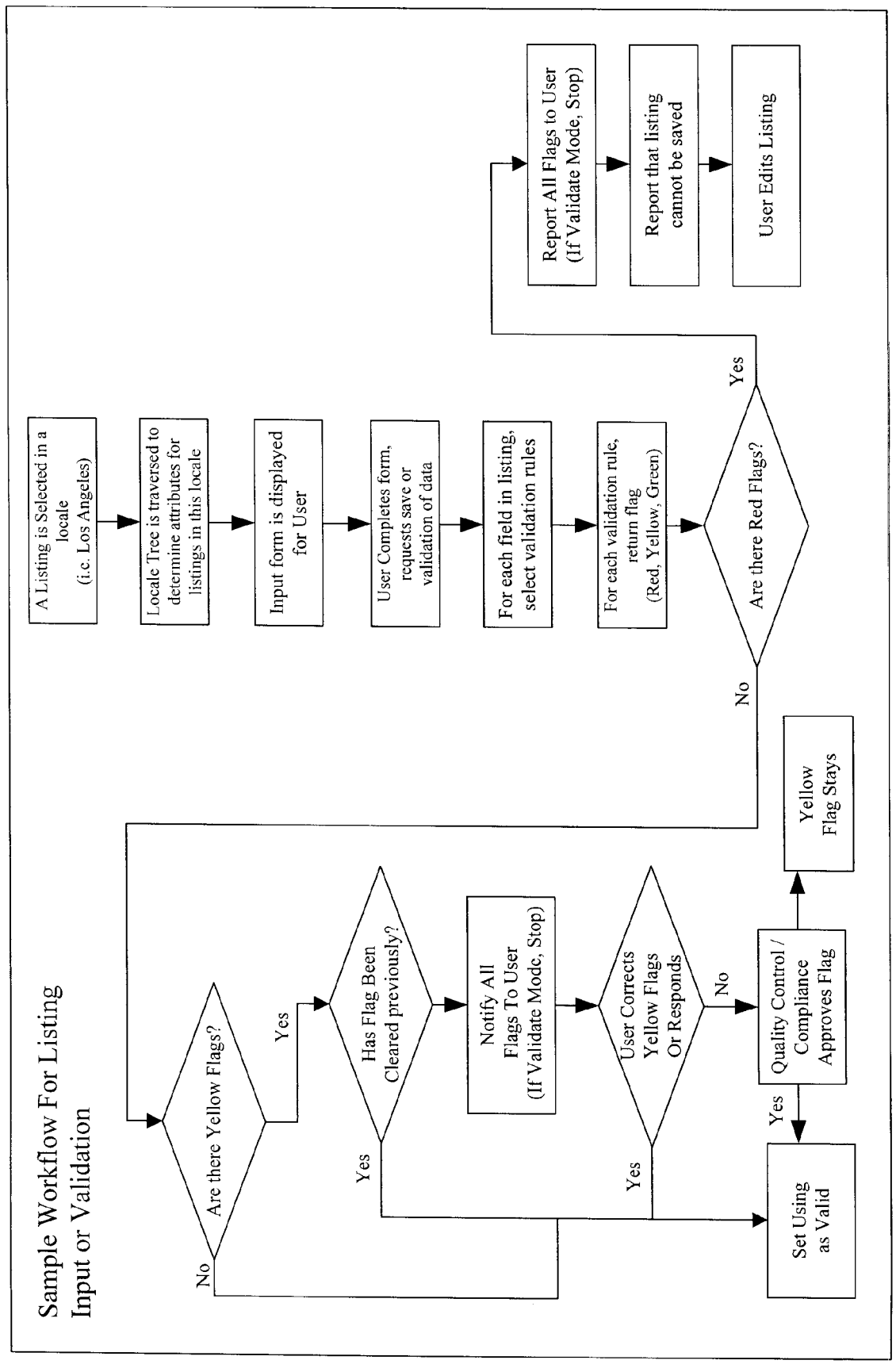
FIG. 67 is a flow diagram for listing input or validation, in accordance with an embodiment of the present invention.
Figure 68:
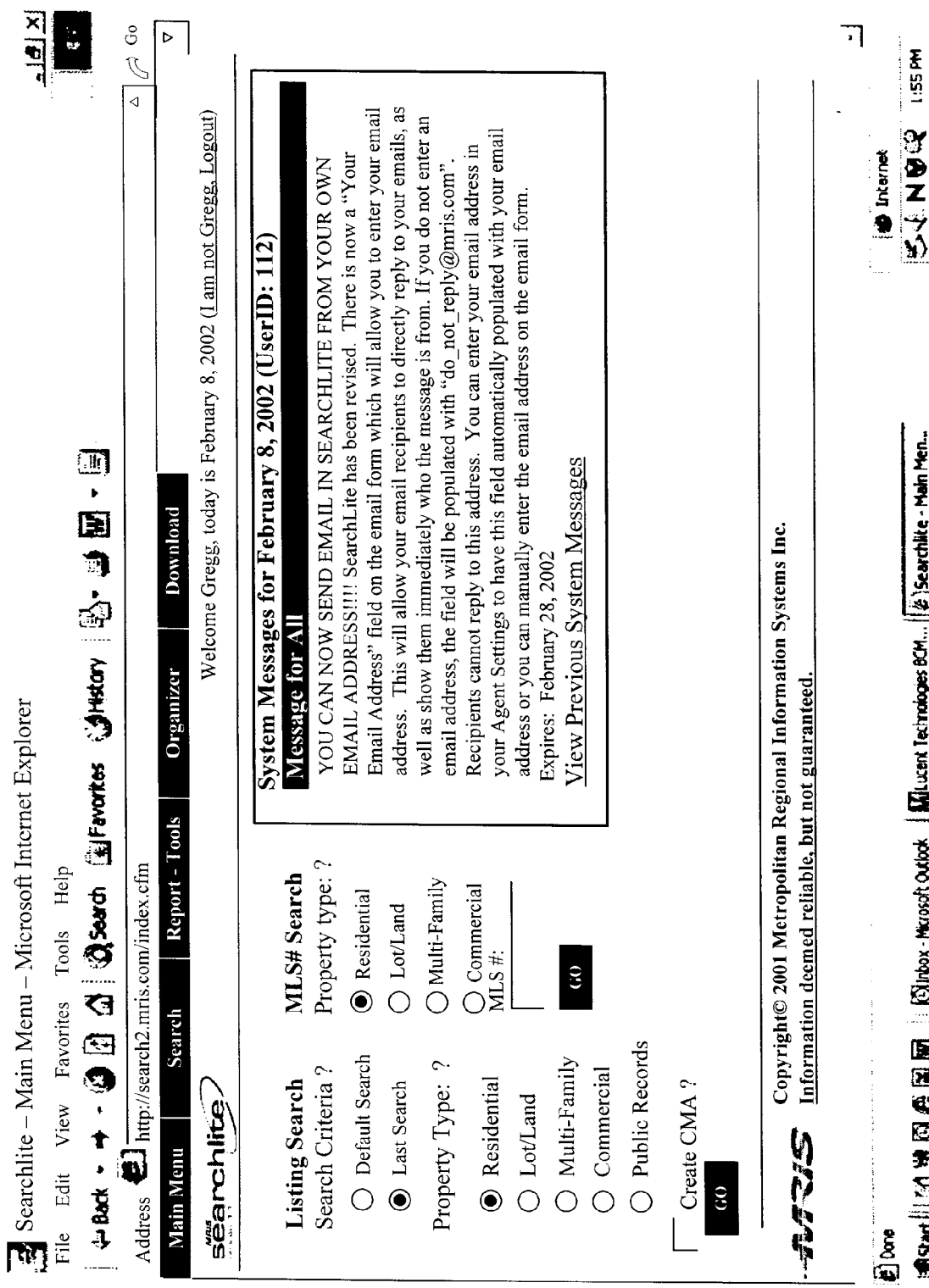
Figure 74:
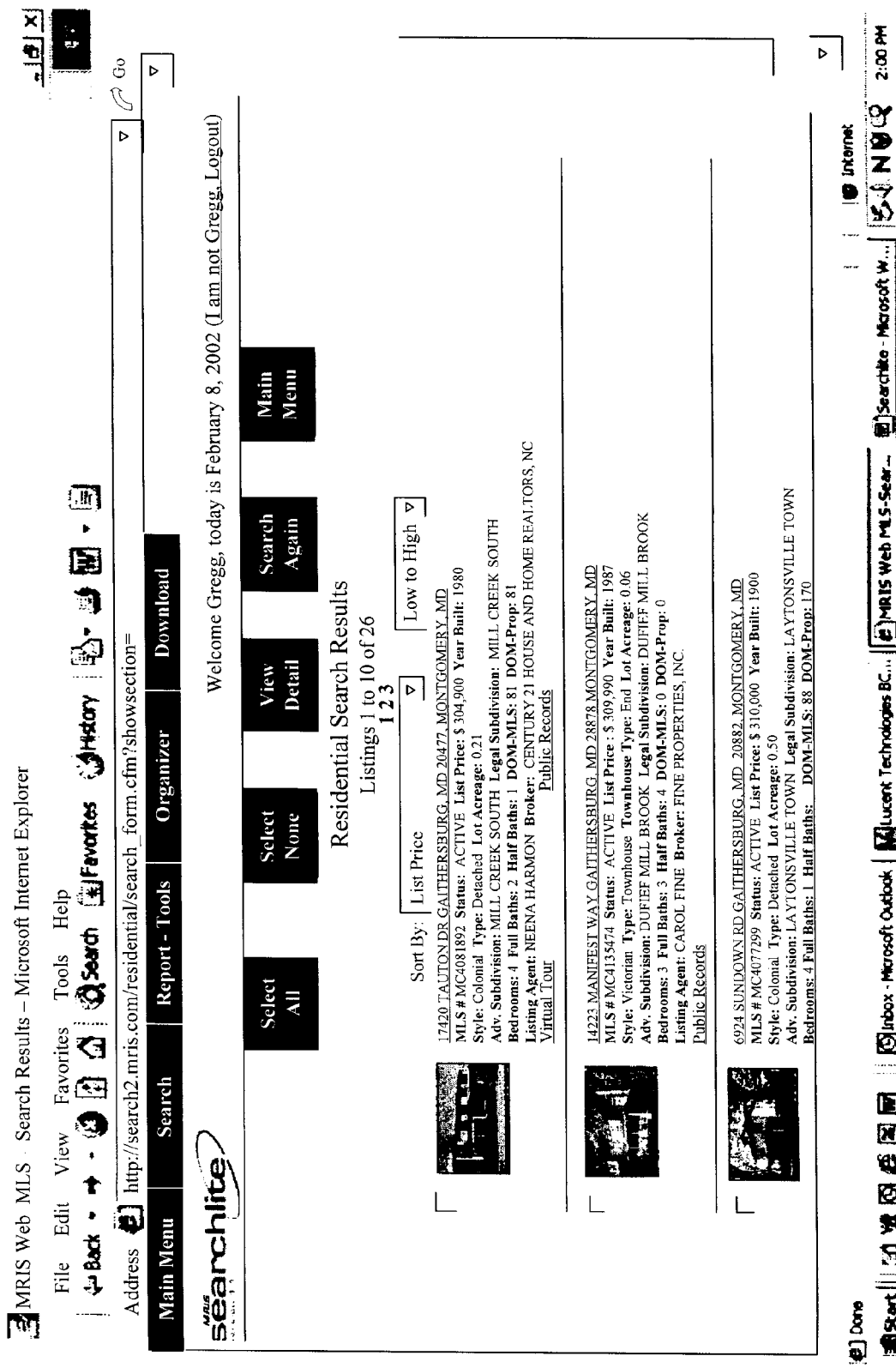

An example of exception report information provided in a graphical user interface screen is presented in FIG. 66. Upon presentation of the exception report after an input or modification of a listing, the user is allowed to enter responses for each yellow flag. FIG. 67 shows a sample workflow for listing input or validation in accordance with an embodiment of the present invention.

The Statistics Generation portion of the system of the present invention will now be described. The statistics portion of the present invention is designed to generate accurate statistical information for distribution to third parties. Generally this information is generated one-time, in report form, and distributed on a periodic basis. There are two types of statistics. First are the statistics that are generated by agents in the normal course of using the system. Second, there are published statistics. These are generated by MRIS and given to third parties locally and nationally (e.g., National Association of Relators (NAR), newspapers, government agencies).

In general, in an embodiment of the present invention, all statistics are generated from live data after the quality control process has been performed, and only listings marked as statistically valid are included in the stats. All other listings, for example, may be counted and included as a footnote in the final published report (e.g., there are 23 listings for DC that were deemed statistically invalid, for various reasons, and therefore not included in this report).

The statistics are generated from the history logs as of a given date. The logs are detailed enough to recreate the listing as it appeared on a given date. A temporary table is created in order to run the various reports. Users are able to select which columns to include in the pull and, for each column, limit the values (e.g., only residential sold properties in Montgomery County). Users are also able to enter a single date or a date range for each locale and status. Both statistically valid and invalid listings are included in the creation of the temporary table, as well as the statistically valid flag and reason if it is invalid, so that information may be included in the report.

In some locales the date determined for representing the data in its most complete form may vary. For example, in the MRIS locale, the agents don't enter all their status changes on time, so the system waits until the $7^{th}$ of the month to generate sold statistics. Failure to do this would result in inaccurate data when comparing the sold data with last year's sold data, which is complete because enough time has passed. Given this, the "date as of" would be the $7^{th}$, but the sold date range pulled would be December. So if a listing sold on the $6^{th}$ with a date in December, it should get included in the pull. Once the data is captured, a number of reports can be written to use that data.

An embodiment of the present invention includes an interface to allow users to choose columns and date ranges. Users are able to select which columns to include in the pull and for each column limit the values. (e.g., only residential sold properties in Montgomery County). Users are able to enter a single date or a date range for each locale and status.

FIGS. 68-77 present sample graphical user interface screens for use with a system in accordance with one embodiment of the present invention.

Example embodiments of the present invention have now been described in accordance with the above advantages. It will be appreciated that these examples are merely illustrative of the invention. Many variations and modifications will be apparent to those skilled in the art.

GLOSSARY

For the purposes of this document, business functions are the more concrete features with which a customer interacts. It is necessary for the listing system to support many of these, such as detailed searching and market updates.

System functions, on the other hand, are processes that are performed automatically with no user intervention required. Many system functions, such as the calculation of time on market, are included in the system. These items are discussed further below.

Listings, transactions—These two words are used synonymously herein. A listing is the collective description of real property being offered for sale or rent through an agreement between a seller and a real estate agent.

Listing Attributes—Listing attributes are defined as descriptive details that together paint a picture of a given real property listing. Attributes are sometimes referred to as logical or virtual columns, fields, elements, or data.

Core Database—The attributes of the database that are common to all listings.

Locale—A geographically specific location with common attributes. A locale may represent a Nation, a State, a County, or a city. These locations should share common attributes for describing real property.

Rule—A test performed on data to ensure it conforms to expected value.

SaveTime—The point at which a user requests that a listing be saved. Usually corresponds to a listing creation or edit.

Stats, statistics, Statistical Information—For the purpose of this document, the preceding terms will refer to fixed, periodic statistics generated by the system.

Clean Listings—Listings, which have passed quality-control measures.

Statistically Valid Listings—Listings reviewed by a data integrity process, and deemed valid. This includes listings with values outside of the acceptable quality control limits, but are deemed accurate by some quality control process.

Published statistics—These are statistics that are generated by MRIS on a periodic basis, usually monthly, quarterly, semi-annually, or annually, for distribution to third parties locally and nationally (e.g., NAR, newspapers, government agencies). They are used for tracking the trends in the real estate industry.

What is claimed is:

1. A computer-implemented method for receiving location specific information relating to real estate property via a network, comprising:
   receiving property criteria related to a property listing, the property criteria comprising a core attribute field and a locale attribute field linked to the core attribute field, the core attribute field comprising attributes relating to a large number of locations, the locale attribute field comprising attributes specific to a certain location, and the locale attribute field being nested under the core attribute field as part of a hierarchy in a single database schema;
   storing the core attribute field and the locale attribute field related to the property listing in the single database schema;
   selecting, by a processor, location specific information relevant to one or more property listings having attributes matching the stored core attribute field and local attribute field in response to a request;
   customizing, by the processor, the location specific information according to user-specific locale information;
   generating, by the processor, an input form containing the customized location specific information; and
   displaying the generated input form.

2. The method of claim 1, wherein the property criteria further comprises a locale adjustable display name, the locale adjustable display name allowing the property listing to be labeled in more than one way depending on the locale attribute field.

3. A property management system for receiving location specific information relating to real estate property via a network, comprising:
   one or more servers coupled to a network;
   a single database schema accessible by the one or more servers;
   one or more computing devices coupled to the network; and
   one or more processors coupled to the one or more servers, the one or more processors configured to:
   receive property criteria related to a property listing, the property criteria comprising a core attribute field and a locale attribute field linked to the core attribute field, the core attribute field comprising attributes relating to a large number of locations, the locale attribute field comprising attributes specific to a certain location, and the locale attribute field being nested under the core attribute field as part of a hierarchy in a single database schema;
   store the core attribute field and the locale attribute field related to the property listing in the single database schema;
   select location specific information relevant to one or more property listings having attributes matching the stored core attribute field and local attribute field in response to a request;
   customize the location specific information according to user-specific locale information;
   generate an input form containing the customized location specific information; and
   display the generated input form.

4. The property management system of claim 3, wherein the property criteria further comprises a locale adjustable display name, the locale adjustable display name allowing the property listing to be labeled in more than one way depending on the locale attribute field.

* * * * *